United States Patent
Obrecht et al.

(10) Patent No.: US 10,500,578 B2
(45) Date of Patent: Dec. 10, 2019

(54) CATALYST COMPOSITIONS AND THEIR USE FOR HYDROGENATION OF NITRILE RUBBER

(71) Applicant: LANXESS DEUTSCHLAND GMBH, Cologne (DE)

(72) Inventors: Werner Obrecht, Moers (DE); Sarah David, Dormagen (DE); Qingchun Liu, Qingdao Shandong (CN); Zhenli Wei, Qingdao Shandong (CN)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 47 days.

(21) Appl. No.: 15/867,347

(22) Filed: Jan. 10, 2018

(65) Prior Publication Data

US 2018/0297022 A1    Oct. 18, 2018

Related U.S. Application Data

(62) Division of application No. 14/352,071, filed as application No. PCT/EP2012/070815 on Oct. 19, 2012, now abandoned.

(30) Foreign Application Priority Data

Oct. 21, 2011 (WO) ................. PCT/CN2011/001753

(51) Int. Cl.
| | | |
|---|---|---|
| *C08C 19/02* | (2006.01) | |
| *B01J 31/22* | (2006.01) | |
| *B01J 31/02* | (2006.01) | |
| *B01J 31/18* | (2006.01) | |
| *B01J 31/24* | (2006.01) | |
| *C08C 19/00* | (2006.01) | |

(52) U.S. Cl.
CPC ....... *B01J 31/2295* (2013.01); *B01J 31/0204* (2013.01); *B01J 31/1805* (2013.01); *B01J 31/2208* (2013.01); *B01J 31/2273* (2013.01); *B01J 31/2278* (2013.01); *B01J 31/2404* (2013.01); *C08C 19/02* (2013.01); *B01J 2231/543* (2013.01); *B01J 2231/641* (2013.01); *B01J 2231/645* (2013.01); *B01J 2531/821* (2013.01); *B01J 2531/825* (2013.01); *B01J 2540/22* (2013.01); *B01J 2540/34* (2013.01); *B01J 2540/62* (2013.01); *C08C 2019/09* (2013.01)

(58) Field of Classification Search
CPC ...... C08C 19/02; C08F 236/12; C08F 220/42; B01J 31/2269; B01J 31/2273; B01J 31/2278; B01J 2231/645; C07C 43/16
See application file for complete search history.

(56) References Cited

U.S. PATENT DOCUMENTS

| | | | | |
|---|---|---|---|---|
| 6,867,303 B2 * | 3/2005 | Grela | ................ | C07F 15/0046 548/101 |
| 2006/0211827 A1 * | 9/2006 | Rempel | ................ | C08C 19/02 525/329.1 |

FOREIGN PATENT DOCUMENTS

| | | | | |
|---|---|---|---|---|
| WO | WO-2011029732 A1 * | 3/2011 | ......... | B01J 31/2278 |
| WO | WO-2011079799 A1 * | 7/2011 | ......... | B01J 31/2269 |

* cited by examiner

*Primary Examiner* — Robert C Boyle
(74) *Attorney, Agent, or Firm* — Norris McLaughlin P.A.

(57) ABSTRACT

This invention relates to novel catalyst compositions based on Ruthenium- or Osmium-based complex catalysts of the Grubbs-Hoveyda, Grela or Zhan type and specific co-catalysts comprising at least one vinyl group, pref. ethyl vinyl ether, and to a process for selectively hydrogenating nitrile rubbers in the presence of such catalyst compositions, preferably with a preceding metathesis step using the same complex catalyst as in the hydrogenation step.

16 Claims, 5 Drawing Sheets

Fig. 1: FT-IR spectra of (H)NBR samples before and during hydrogenation in Ex.1
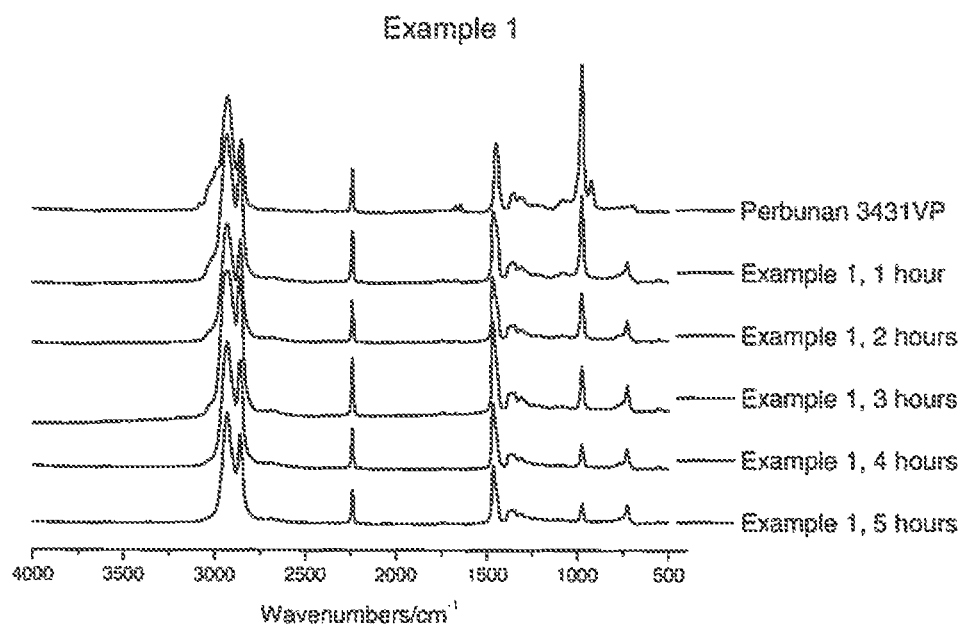
Fig. 2: FT-IR spectra of (H)NBR samples before and during hydrogenation in Ex.2
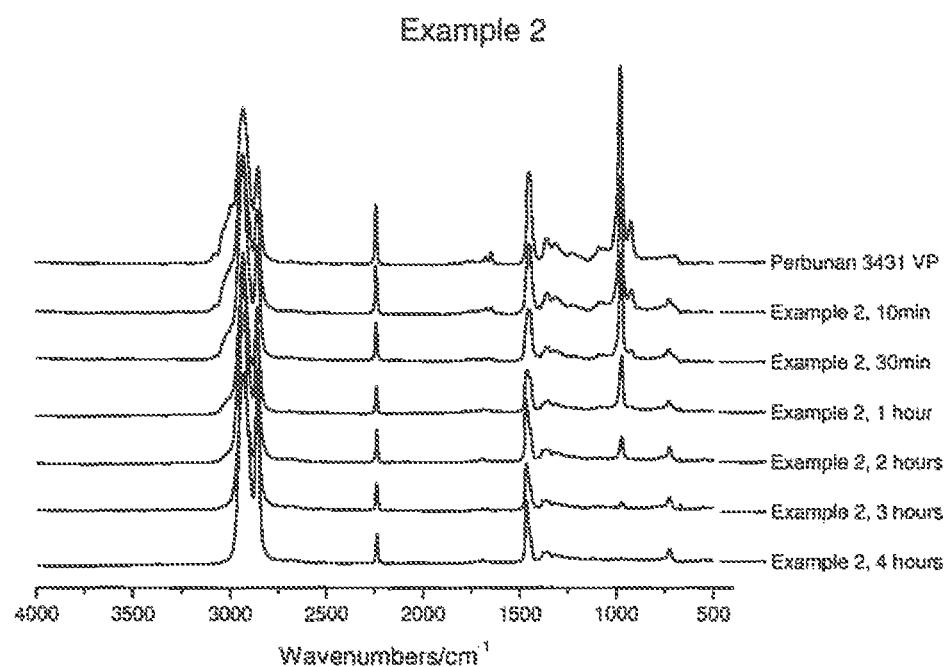

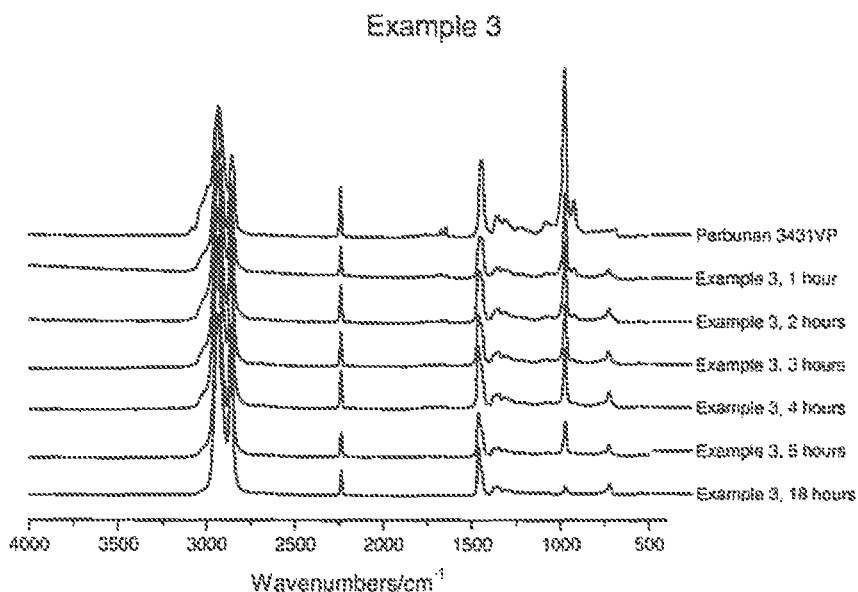
Fig. 3: FT-IR spectra of (H)NBR samples before and during the hydrogenation in Ex. 3
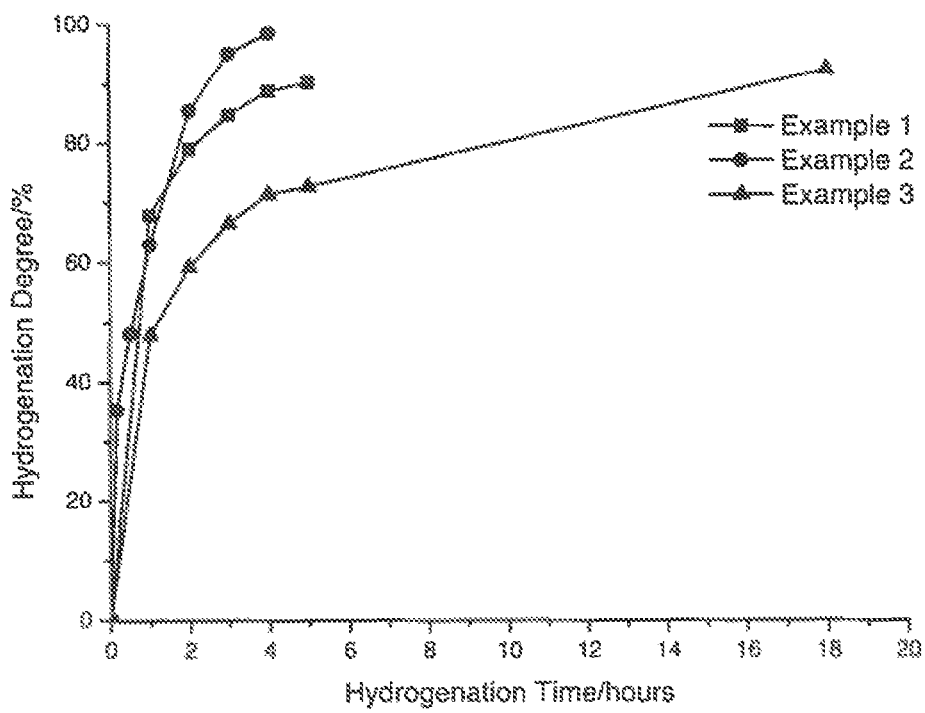
Fig. 4: The hydrogenation degree of (H)NBR samples before and during the hydrogenation process in Examples 1-3.

Fig. 5: FT-IR spectra of (H)NBR samples before and during hydrogenation in Ex. 5
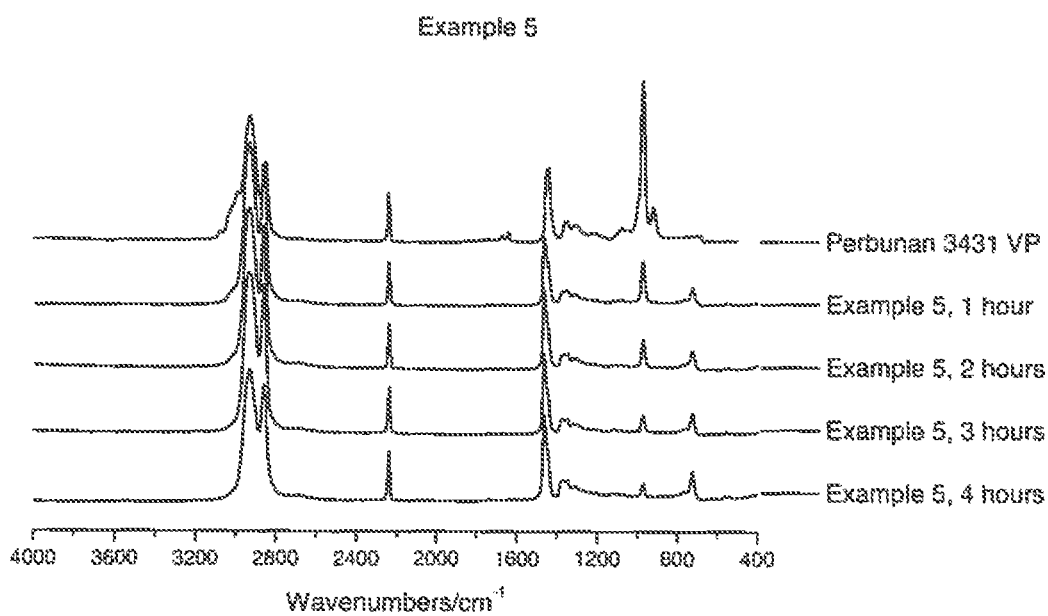
Fig. 6: The hydrogenation degree of (H)NBR samples during the hydrogenation in Ex. 5
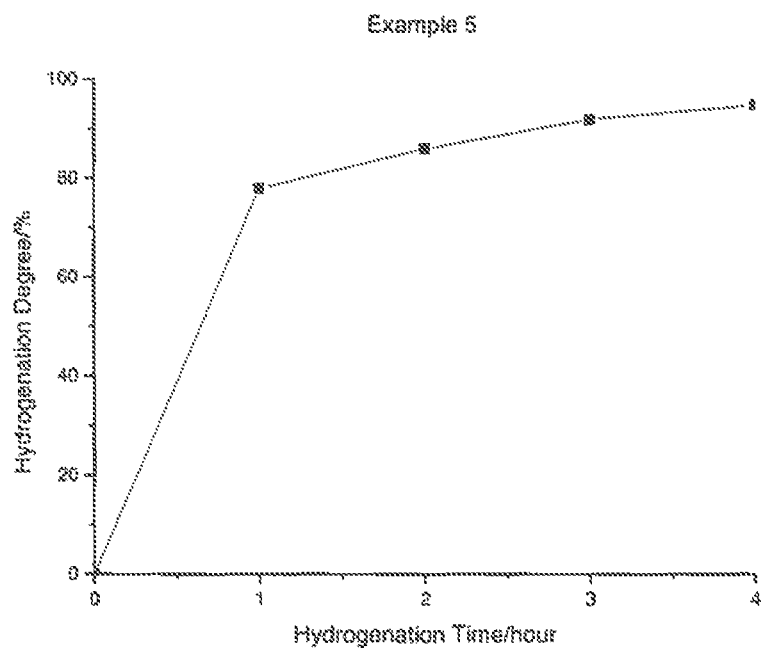

Fig. 7: FT-IR spectra of (H)NBR samples before and after hydrogenation in Ex. 6
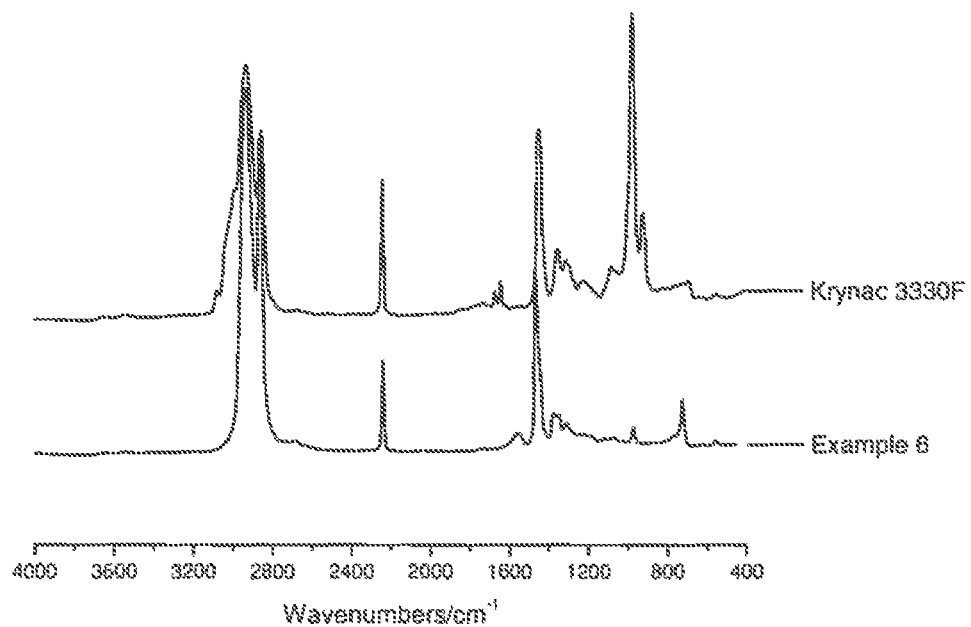
Fig. 8: FT-IR spectra of (H)NBR samples before and after hydrogenation in Ex. 7
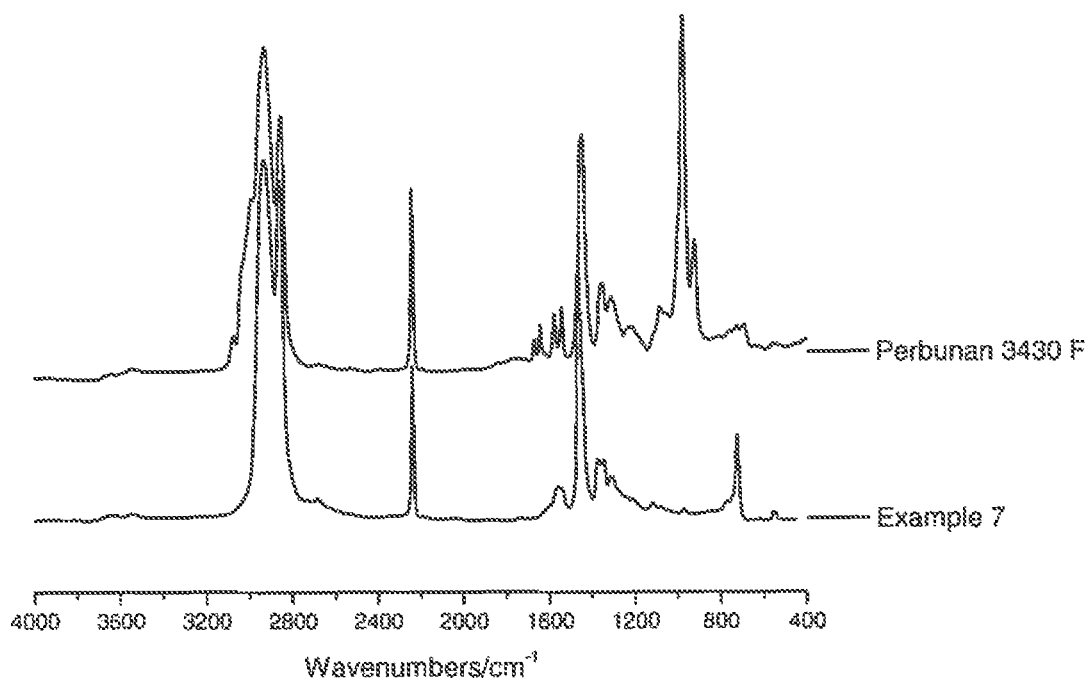

Fig. 9: FT-IR spectra of (H)NBR samples before and after hydrogenation in Ex. 8
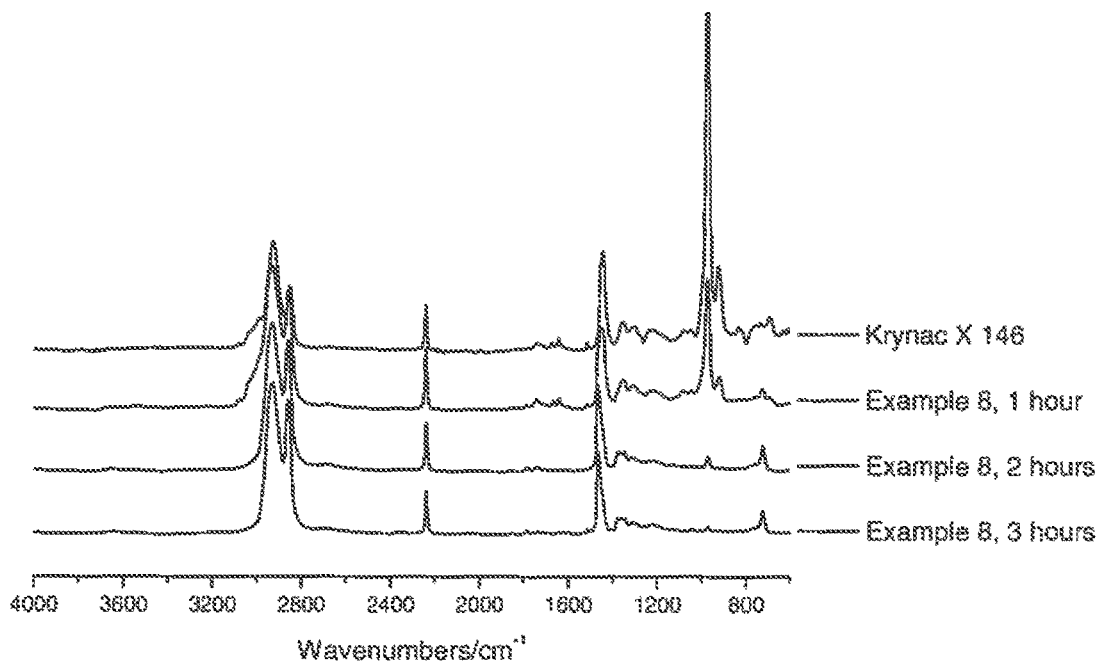
Fig. 10: Hydrogenation degree of (H)NBR samples during the hydrogenation in Ex. 8
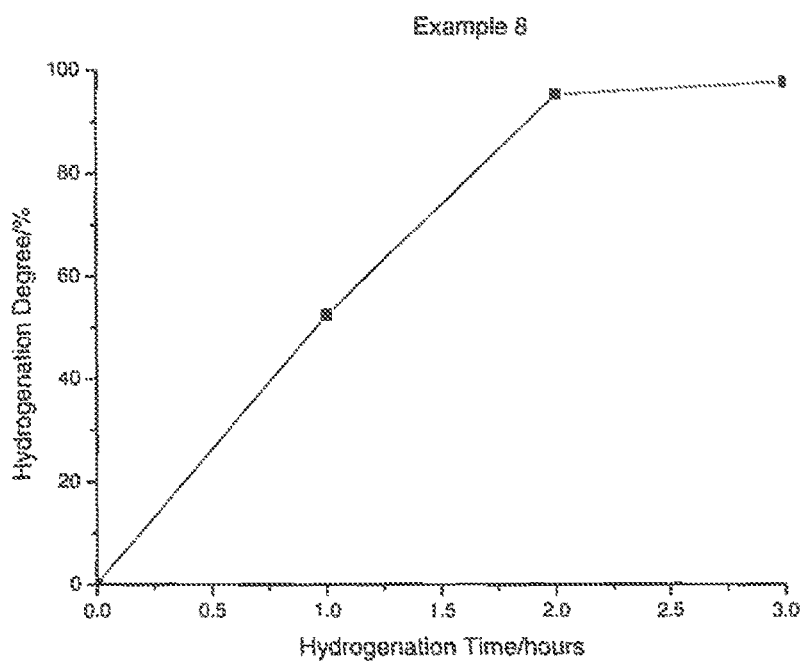

ions in the presence of such novel catalyst compositions.
CATALYST COMPOSITIONS AND THEIR USE FOR HYDROGENATION OF NITRILE RUBBER This application is a divisional of pending U.S. patent application Ser. No. 14/352,071 filed Apr. 16, 2014, entitled "CATALYST COMPOSITIONS AND THEIR USE FOR HYDROGENATION OF NITRILE RUBBER", which claims the right of priority under 35 U.S.C. § 119(a)-(d) and 35 U.S.C. § 365 of International Application No. PCT/EP2012/070815, filed Oct. 19, 2012, which is entitled to the right of priority of International Patent Application No. PCT/CN/2011/001753 filed Oct. 21, 2011, the contents of which are hereby incorporated by reference in their entirety.

FIELD OF THE INVENTION

This invention relates to novel catalyst compositions based on Ruthenium- or Osmium-based complex catalysts with metathetic activity and specific co-catalysts in a certain molar ratio and to a process for selectively hydrogenating nitrile rubbers in the presence of such novel catalyst compositions.

BACKGROUND OF THE INVENTION

The term "acrylonitrile-butadiene rubber" or "nitrile rubber", also named as "NBR" for short, shall be interpreted broadly and refers to rubbers which are copolymers or terpolymers of at least one α, β-unsaturated nitrile, at least one conjugated diene and, if desired, one or more further copolymerizable monomers.

Hydrogenated NBR, also referred to as "HNBR" for short, is produced commercially by hydrogenation of NBR. Accordingly, the selective hydrogenation of the carbon-carbon double bonds in the diene-based polymer must be conducted without affecting the nitrile groups and other functional groups (such as carboxyl groups when other copolymerizable monomers were introduced into the polymer chains) in the polymer chains.

HNBR is a specialty rubber which has very good heat resistance, an excellent resistance to ozone and chemicals and also an excellent oil resistance. The abovementioned physical and chemical properties of HNBR are associated with very good mechanical properties, in particular a high abrasion resistance. For this reason, HNBR has found wide use in a variety of applications. HNBR is used, for example, for seals, hoses, belts and damping elements in the automobile sector, also for stators, oil well seals and valve seals in the field of oil exploration and also for numerous parts in the aircraft industry, the electronics industry, mechanical engineering and shipbuilding. A hydrogenation conversion higher than 95%, or a residual double bond (RDB) content<5%, without cross-linking during the hydrogenation reaction and a gel level of less than about 2.5% in the resultant HNBR is a threshold that ensures high-performance applications of HNBR in these areas and guarantees excellent processability of the final product.

The degree of hydrogenation of the copolymerized diene units in HNBR may vary in the range from 50 to 100%, however, the desired hydrogenation degree is from about 80 to about 100%, preferably from about 90 to about 99.9%. Commercial grades of HNBR typically have a remaining level of unsaturation below 18% and a content of acrylonitrile of roughly up to about 50%.

It is possible to carry out the hydrogenation of NBR either with homogeneous or with heterogeneous hydrogenation catalysts. The catalysts used are usually based on rhodium, ruthenium or palladium, but it is also possible to use platinum, iridium, rhenium, osmium, cobalt or copper either as metal or preferably in the form of metal compounds (see e.g. U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat Nos. 4,464,515 and 4,503,196). Suitable catalysts and solvents for a hydrogenation in the homogeneous phase are known from DE-A-25 39 132 and EP-A-0 471 250.

Also for commercial purposes the production of HNBR by hydrogenation of NBR is performed in organic solvents by using either a heterogeneous or a homogeneous transition metal catalyst often based on rhodium or palladium. Such processes suffer from drawbacks such as high prices for the catalyst metals and the cost involved in catalyst metal removal/recycle. This has led to research and development of alternative catalysts based on cheaper noble metals, such as osmium and ruthenium.

Alternative NBR hydrogenation processes can be performed using Os-based catalysts. One catalyst excellently suited for NBR hydrogenation is $OsHCl(CO)(O_2)(PCy_3)_2$ as described in Ind. Eng. Chem. Res., 1998, 37(11), 4253-4261). The rates of hydrogenation using this catalyst are superior to those produced by Wilkinson's catalyst ($RhCl(PPh_3)_3$) over the entire range of reaction conditions studied.

Ru-based complexes are also good catalysts for polymer solution hydrogenation, and the price for Ru metal is even cheaper. Ru—$PPh_3$ complexes and $RuHCl(CO)L_2$ (L is a bulky phosphine) catalyst systems lead to quantitative hydrogenation of NBR as disclosed in Journal of Molecular Catalysis A: Chemical, 1997, 126(2-3), 115-131). During such hydrogenation it is not necessary to add a free phosphine ligand to maintain the catalyst activity. However, they are prone to gel formation and may cause a certain degree of cross-linking during hydrogenation.

However, these above mentioned Os or Ru catalysts are active catalysts for hydrogenation only, not for metathesis reactions. Therefore, these types of Os or Ru catalysts can not be used for NBR metathesis/degradation to produce NBR with reduced molecular weight.

Another problem of the HNBR production is that HNBR with a low Mooney viscosity is difficult to manufacture by the direct hydrogenation of commercially available NBR. The relatively high Mooney viscosity places restrictions on the processability of HNBR. Many applications would ideally use HNBR grades with a lower molecular weight and a lower Mooney viscosity. This would give a decisive improvement in processability.

For a long time, it has not been possible to produce HNBR on a large scale having a low molar mass corresponding to a Mooney viscosity (ML1+4 at 100° C.) in the range below 55 or with a weight average molecular weight of about Mw<200,000 g/mol by means of the established direct NBR hydrogenation processes mainly for two reasons: Firstly a sharp increase in the Mooney viscosity occurs during hydrogenation of NBR which means that a HNBR polymer with substantially increased Mooney viscosity is obtained. The Mooney Increase Ratio (MIR) is generally around 2 or even above, depending upon the NBR grade, hydrogenation level and nature of the NBR feedstock. Thus, the Mooney viscosity range of marketed HNBR is limited by the lower limit of the Mooney viscosity of the NBR starting material. Secondly, the molar mass of the NBR feedstock to be used for the hydrogenation cannot be reduced at will since otherwise work-up in the NBR industrial plants available is no longer possible because the rubber becomes too sticky.

The lowest Mooney viscosity of an NBR feedstock which can be worked up without difficulties in an established industrial plant is in a range of about 30 Mooney units (ML1+4 at 100° C.). The Mooney viscosity of the hydrogenated nitrile rubber obtained using such an NBR feedstock is in the order of 55 Mooney units (ML1+4 at 100° C.). The Mooney viscosity is determined in accordance with ASTM standard D 1646.

In the more recent prior art, this problem is solved by reducing the molecular weight of the nitrile rubber before hydrogenation by degradation to a Mooney viscosity (ML1+4 at 100° C.) of less than 30 Mooney units or a weight average molecular weight of Mw<200000 g/mol. The reduction in the molecular weight is achieved by metathesis of the NBR in the presence of metathesis catalysts. WO-A-02/100905 and WO-A-02/100941 describe for example a process which comprises degradation of nitrile rubber starting polymers by olefin metathesis and subsequent hydrogenation. A nitrile rubber is reacted in a first step in the presence of a coolefine and a specific catalyst based on osmium, ruthenium, molybdenum or tungsten complexes and hydrogenated in a second step. The hydrogenated nitrile rubbers obtained may have a weight average molecular weight (Mw) in the range from 30 000 to 250 000, a Mooney viscosity ML 1+4 at 100° C.) in the range from 3 to 50 and a polydispersity index PDI of less than 2.5. The metathesis reaction is advantageously carried out in the same solvent as the subsequent hydrogenation so that the degraded nitrile rubber does not have to be necessarily isolated from the solvent after the degradation reaction is complete. Well-known for metathesis of nitrile rubber are a number of Ru-based metathesis catalysts like e.g. Grubbs I (benzylidene bis (tricyclohexylphosphine) dichloro ruthenium), Grubbs II (benzylidene [1,3-bis(2,4,6-trimethylphenyl)-2-imidazolidi-nyliden]tricyclohexylphosphin dichloro ruthenium), Grubbs III (benzylidene [1,3-bis(2,4,6-trimethylphenyl)-2-imidazolidin-ylidene]dichloro-bis(3-bromopyridine)ruthenium), Hoveyda-Grubbs II ([1,3-bis-(2,4,6-trimethylphenyl)-2-imidazoli-dinyliden]dichloro(o-isopropoxyphenylmethylen) ruthenium) (see e.g. US-A-2008/0064882) and a number of fluorenyliden-based complex catalysts (see e.g. US-A-2009/0076226)

EP A4 905 777 discloses ruthenium complex catalysts having the general structure

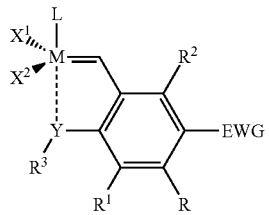

wherein
M is ruthenium,
$X^1$ and $X^2$ are each chloro or RCOO with R in such RCOO being $C_1$-$C_{20}$ alkyl or a derivative thereof,
L is an electron donating complex ligand, which could be linked or not linked with $X^1$ to form a cyclic structure
Y is oxygen, sulfur, nitrogen or phosphorus;
R is H, halogen atom, nitro, cyano, $C_1$-$C_{20}$ alkyl, $C_1$-$C_{20}$ alkoxy, $C_1$-$C_{20}$ alkylthio, $C_1$-$C_{20}$ silanyl, $C_1$-$C_{20}$ silanyloxy, $C_6$-$C_{20}$ aryl, $C_6$-$C_{20}$ aryloxy, $C_2$-$C_{20}$ heterocyclic, $C_2$-$C_{20}$ heterocyclic aryl, sulfinyl, sulfonyl, formyl, $C_1$-$C_{20}$ carbonyl, $C_1$-$C_{20}$ ester, $C_1$-$C_{20}$ amido, $C_1$-$C_{20}$ uramido or derivatives or $C_1$-$C_{20}$ sulfonamido group;
$R^1$ and $R^2$ are each H, bromo (Br), iodo (I), $C_1$-$C_{20}$ alkyl or derivatives, $C_1$-$C_{20}$ alkoxy, $C_1$-$C_{20}$ alkylthio, $C_1$-$C_{20}$ silanyloxy, $C_6$-$C_{20}$ aryloxy, $C_6$-$C_{20}$ aryl, $C_2$-$C_{20}$ heterocyclic, $C_2$-$C_{20}$ heterocyclic aryl, $C_1$-$C_{20}$ ester, $C_1$-$C_{20}$ amide, $C_1$-$C_{20}$ uramido or derivatives or $C_1$-$C_{20}$ sulfonamido group;
$R^3$ is H, $C_1$-$C_{20}$ alkyl or derivatives, $C_1$-$C_{20}$ alkoxy, $C_1$-$C_{20}$ alkylthio, $C_1$-$C_{20}$ silanyl, $C_1$-$C_{20}$ silanyloxy, $C_6$-$C_{20}$ aryl, $C_6$-$C_{20}$ aryloxy, $C_2$-$C_{20}$ heterocyclic, $C_2$-$C_{20}$ heterocyclic aryl, sulfinyl, sulfonyl, $C_1$-$C_{20}$ carbonyl, $C_1$-$C_{20}$ ester, $C_1$-$C_{20}$ amido, $C_1$-$C_{20}$ uramido or derivatives or $C_1$-$C_{20}$ sulfonamido group; and
EWG is $C_1$-$C_{20}$ aminosulfonyl ($SO_2NR_2$), formyl, $C_1$-$C_{20}$ carbonyl, $C_1$-$C_{20}$ ester, $C_1$-$C_{20}$ aminocarbonyl ($CONR_2$), amido, chloro, fluoro, $C_1$-$C_{20}$ uramido or derivatives or $C_1$-$C_{20}$ sulfonamido group.

EP-A-1 905 777 further states that these catalysts can be used in olefin metathesis reactions including ring-closing olefin metathesis reactions, intermolecular olefin metathesis reactions, and olefin metathesis polymerization reactions. The examples show the preparation of low molecular weight substances by intramolecular ring closing metathesis in the presence of certain of the generally disclosed catalysts. EP-A-1 905 777 does neither provide any disclosure that these catalysts can be used to degrade the molecular weight of polymers, in particular nitrile rubbers nor that they show any hydrogenation activity.

Furtheron processes for simultaneous metathesis and hydrogenation are known from prior art. In WO-A-2005/080456 the preparation of hydrogenated nitrile rubber polymers having low molecular weights and narrower molecular weight distributions than those known in the art is carried out by simultaneously subjecting the nitrile rubber to a metathesis reaction and a hydrogenation reaction. The reaction takes place in the presence of a Ruthenium- or Osmium-based pentacoordinated complex catalyst, in particular 1,3-bis(2,4,6-trimethylphenyl)-2-imidazolidinylidene) (tricyclohexylphosphine) ruthenium (phenylmethylene) dichloride (also called Grubbs $2^{nd}$ generation catalyst). However, WO-A-2005/080456 does not provide any disclosure or teaching how to influence the two simultaneously occurring reactions, i.e. metathesis and hydrogenation or how to control the activity of the respective catalysts regarding metathesis and hydrogenation.

WO-A-2011/023788 also discloses a process for subjecting a nitrile rubber in the presence of hydrogen to a combined and simultaneous metathesis and hydrogenation reaction in the presence of specifically defined hexacoordinated Ruthenium- or Osmium based catalysts in order to prepare hydrogenated nitrile rubbers having lower molecular weights and narrower molecular weight distributions than those known in the art. Such process is performed by using at least one catalyst of general formula (I) to (III)

(I)

(II)

-continued

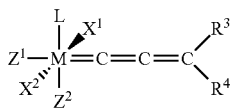
(III)

where
M is ruthenium or osmium,
$X^1$ and $X^2$ are identical or different ligands, preferably anionic ligands,
$Z^1$ and $Z^2$ are identical or different and neutral electron donor ligands,
$R^3$ and $R^4$ are each independently H or a substituent selected from the group consisting of alkyl, cycloalkyl, alkenyl, alkynyl, aryl, carboxylate, alkoxy alkenyloxy, alkynyl-oxy, aryloxy, alkoxycarbonyl, alkylamino, alkylthio, arylthio, alkylsulphonyl and alkylsulphinyl radical, each of which may optionally be substituted by one or more alkyl, halogen, alkoxy, aryl or heteroaryl moieties, and
L is a ligand.

WO-A-2011/029732 also discloses an alternative process for subjecting a nitrile rubber in the presence of hydrogen to a combined and simultaneous metathesis and hydrogenation reaction in the presence of specifically defined pentacoordinated Ruthenium- or Osmium based catalysts in order to prepare hydrogenated nitrile rubbers having low molecular weights and a narrow molecular weight distribution. Such process is performed in the presence of at least one compound of the general formula (I).

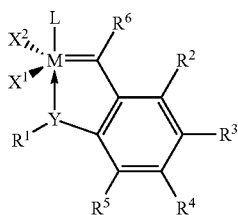
(I)

where
M is ruthenium or osmium,
Y is oxygen (O), sulfur (S), an N—$R^1$ radical or a P—$R^1$ radical,
$X^1$ and $X^2$ are identical or different ligands,
$R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl, $CR^{13}C(O)$ $R^{14}$ or alkylsulphinyl moiety, each of which may optionally be substituted by one or more alkyl, halogen, alkoxy, aryl or heteroaryl moiety,
$R^{13}$ is hydrogen or alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl moiety, each of which may optionally be substituted by one or more alkyl, halogen, alkoxy, aryl or heteroaryl moiety;
$R^{14}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl moiety, each of which may optionally be substituted by one or more alkyl, halogen, alkoxy, aryl or heteroaryl moiety;

$R^2$, $R^3$, $R^4$ and $R^5$ are identical or different and are each H, organic or inorganic radicals,
$R^6$ is H or an alkyl, alkenyl, alkynyl or aryl radical and L is a ligand.

However, neither WO-A-2011/023788 nor WO-A-2011/029732 provide any disclosure or teaching how to influence the two simultaneously occurring reactions, i.e. metathesis and hydrogenation or how to control the two-fold activity of the respective catalysts for metathesis and hydrogenation.

WO-A-2011/079799 discloses a broad variety of catalysts the general structure of which is shown hereinafter

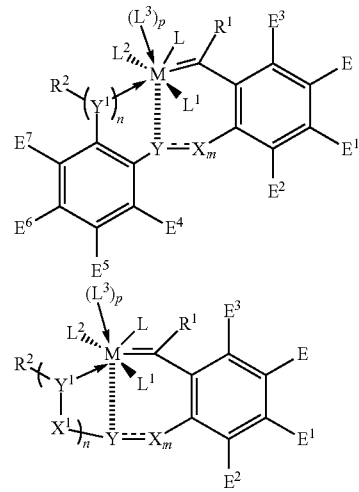

It is stated that such catalysts can be used to provide modified nitrile butadiene rubber (NBR) or styrene-butadiene rubber (SBR) by depolymerisation. It is further stated that the catalysts can be used in a method of making a depolymerized HNBR or styrene-butadiene rubber by adding one or more of those catalysts first to carry out depolymerisation of NBR, followed by adding hydrogen into the reactor under high pressure for hydrogenation. In another embodiment it is disclosed to prepare HNBR by adding hydrogen under high pressure first, then followed by adding one or more of the above catalysts. However, WO-A-2011/079799 does not provide any disclosure or teaching how to influence the different catalytic activities of the catalysts for depolymerisation (metathesis) and hydrogenation. It is accepted that while hydrogenation takes place simultaneously metathesis leads to a degradation of the molecular weight in uncontrolled manner.

A number of references describe the use of metathesis catalysts in two step reactions starting with a ring-opening metathesis polymerisation (ROMP) first which is followed by a hydrogenation reaction (so called "tandem polymerization/hydrogenation reactions").

According to Organometallics, 2001, 20(26), 5495-5497 the metathesis catalyst Grubbs I can be used for ROMP of cyclooctene or a norbornene derivative first, then followed by a hydrogenation of the polymers. It is reported that the addition of a base like $NEt_3$ increases the catalytic activity in the hydrogenation reaction.

J. Am. Chem. Soc 2007, 129, 4168-9 also relates to tandem ROMP-hydrogenation reactions starting from functionalized norbornenes and compares the use of three Ruthenium-based catalysts, i.e. Grubbs I, Grubbs II and Grubbs III catalysts in such tandem reactions. It is described that the Ruthenium-based catalyst on the end of the polymer backbone is liberated and transformed into a hydrogenation-active species through reaction with $H_2$, base ($NEt_3$), and methanol.

EP-A-1 197 509 discloses a process for preparing a hydrogenated polymer by polymerizing a cycloolefine in the presence of an organo ruthenium or osmium compound and subsequently subjecting the unsaturated polymer obtained during polymerization to a hydrogenation under addition of a hydrogenation catalyst. EP-A-1 197 509 does not describe any cross-metathesis and does not relate to any degradation of the polymer via metathesis Inorg. Chem 2000, 39, 5412-14 also explores tandem ROMP polymerization/hydrogenation reactions. The focus lies on the mechanism of the hydrogenolysis of the ruthenium-based metathesis catalyst Grubbs I. It is shown that such catalyst is transformed into dihydride, dihydrogen and hydride species under conditions relevant to hydrogenation chemistry. However, there is no disclosure at all about polymer degradation via metathesis or hydrogenation of unsaturated polymers.

In further references the quenching of metathesis reactions with vinyl compounds is described:

Numerous patent applications like US-A-2007/0049700, US-A-2008/0064882, US-A-2007/0208206, US-A-2008/0076881, US-A-2009/054597, US-A-2009/0069516, US-A-2009/0076227 US-A-2009/0076226 US-A-2010/0087600 US-A-2010/0093944 and two not yet published patent applications with the serial numbers EP 11153437.6 and PCT/EP2011/063570 referring to the molecular weight degradation of nitrile rubbers by a methathesis reaction contain experiments in which the reaction mixture is treated with vinylethylether after the metathesis reaction in order to destroy the metathesis catalyst. The molar ratio of vinylethylether to the metathesis catalysts used is very high in order to efficiently stop the metathesis reaction by deactivation of the catalyst. In the aforementioned applications such molar ratio lies in a range of from 567:1 to more than 17,000:1. None of those patent applications provides any disclosure or hint that by choosing lower ratios of the deactivating reagent to the metathesis catalyst a catalyst composition is obtained which is excellently suited for a selective hydrogenation, i.e. without continuing to catalyse the metathetic degradation.

In J. Am. Chem. Soc. 2001, 123, 6543-54 the mechanism of ruthenium based catalysts for olefin metathesis is disclosed. Furtheron it is described that the reaction of ruthenium carbenes with ethylvinylether can be utilized as a method for quenching ring opening metathesis polymerization. As shown in the following scheme a so-called Fischer-carbene complex is reported to be built.

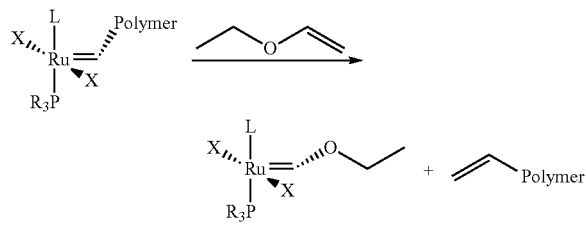

In Tetrahedron Letters 50 (2009), 6103-5 it is disclosed that di (ethylene glycol) vinyl ether and amine derivatives thereof can also be used as deactivating reagents for olefin metathesis catalysts. It is experimentally shown that the use of 4 equivalents of di (ethylene glycol) vinyl ether based on the metathesis catalyst are sufficient to efficiently deactivate the metathesis catalyst. Even 2 equivalents are reported to be sufficient. However, this reference does not deal with hydrogenation processes subsequently to olefin metathesis at all.

In Macromol. Symp. 2010, 297, 25-32 it is shown that polyisobutylene ("PIB") terminally functionalized with a vinyl ether group may serve to sequester a complex catalyst by conversion of a reactive ruthenium alkylidene complex into a phase-immobilized Fischer carbine complex. Additionally kinetic studies are presented on the reaction of 2 equivalents PIB vinyl ether and 6 as well as 15 equivalents of ethyl vinyl ether with Grubbs II catalyst.

It can be seen from the above that:
(1) up to now, hydrogenation catalysts which are very active for the selective hydrogenation of nitrile rubbers are known and Rh- and Pd-based catalysts are already used in industrial hydrogenation processes; however, cheaper Ru-based hydrogenation catalysts are still facing the gel formation problem when used for NBR hydrogenation. Most importantly, only HNBR with high molecular weight can be produced by using these catalysts which can only catalyse the NBR hydrogenation. The molecular weight of the final HNBR is determined by the molecular weight of the raw NBR, not by the hydrogenation catalysts;
(2) the degradation of nitrile rubber by metathesis is known using ruthenium- or osmium-based metathesis catalysts followed by a hydrogenation of the degraded nitrile rubber to afford hydrogenated nitrile rubber; if the same catalyst is used for metathesis and for hydrogenation, such catalysts are highly active for NBR metathesis while not so active for NBR hydrogenation; and
(3) catalysts which possess both, i.e. catalytic activity for both, metathesis and hydrogenation, cannot be used in a controlled manner.

Therefore, in current commercial production processes, a separate hydrogenation catalyst is added into the reaction system for the NBR hydrogenation after the NBR metathesis step. In this way, HNBR with controlled molecular weight can be produced, but two catalysts (one for metathesis and one for hydrogenation) are required to achieve high reaction efficiency.

However, hitherto there is not a single literature reporting the preparation of hydrogenated nitrile rubber with controlled molecular weight and therefore controllable Mooney viscosity only using one kind of ruthenium- or osmium-based catalyst which is otherwise known for its metathetic activity. Also, up to now, there is no hydrogenation catalyst which can be used at a very low concentration for NBR hydrogenation to high conversion. So far the catalyst removal or recycle step is required after the hydrogenation.

Accordingly it was the object of the present invention to provide an improved catalyst composition allowing a selective hydrogenation of nitrile rubber at low catalyst concentrations. Additionally such improved catalyst composition should be designed in a way to allow an upstream metathesis reaction, if desired, using the same catalyst as contained in the catalyst composition.

SUMMARY OF THE INVENTION

The catalyst composition according to the present invention is obtainable by contacting a complex catalyst with at least one co-catalyst in a molar ratio of the complex catalyst to the co-catalyst in a range of from 1:(1-550), preferably 1:(20-550) wherein the co-catalyst must contain at least one vinyl group and wherein the complex catalyst has the general formula (A)

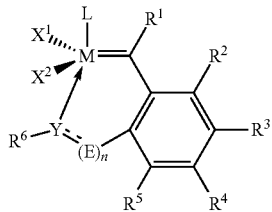

where
M is ruthenium or osmium,
X$^1$ and X$^2$ are identical or different ligands,
L is an electron donating ligand, which can be linked or not linked with X$^1$ to form a cyclic structure,
R$^1$ is hydrogen, alkyl, cycloalkyl, alkenyl, alkynyl, aryl or heteroaryl and
R$^2$, R$^3$, R$^4$ and R$^5$ are identical or different and are each hydrogen or an organic or inorganic substituent,
R$^6$ is H, alkyl, cycloalkyl, alkenyl, alkynyl, aryl, heteroaryl, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)$_2$R, —S(=O)R or a group containing either a C=O or a C=S structural element adjacent to a carbon atom which is bound to Y,
n is 0 or 1,
wherein if n=1, then the element

shall mean that Y and (E)$_n$ are linked either by a single bond or by a double bond, wherein
  (i) if Y and (E)$_n$ are linked by a single bond, then
    Y is oxygen (O), sulfur (S), N—R or P—R and
    E is CH$_2$ or
  (ii) if Y and (E)$_n$ are linked by a double bond, then
    Y is N or P
    E is CH,
wherein if n=0, then
  Y is oxygen (O), sulfur (S), N—R or P—R and directly linked by a single bond to the phenyl moiety depicted above in formula (A)
and wherein in all above occurrences of general formula (A)
  R is hydrogen or alkyl, cycloalkyl, alkenyl, alkynyl, aryl or heteroaryl.

The invention furtheron relates to a process of hydrogenating a nitrile rubber comprising
  a) contacting a complex catalyst according to general formula (A) with at least one co-catalyst in a molar ratio of complex catalyst to co-catalyst in the range of 1:(20-550) wherein the co-catalyst must contain at least one vinyl group in order to form a catalyst composition and thereafter
  b) hydrogenating the nitrile rubber in the presence of the novel catalyst composition formed in step a).

A specific embodiment of the present invention relates to an alternative process which comprises firstly subjecting a nitrile rubber to a molecular weight degradation in a metathesis reaction by contacting the nitrile rubber in the absence or presence of a co-olefin with a complex catalyst according to general formal (A) then
  a) contacting the complex catalyst which is present in the reaction mixture after the metathesis reaction with at least one co-catalyst in a molar ratio of complex catalyst to co-catalyst in the range of 1:(1-550), preferably 1:(20-550) wherein the co-catalyst must contain at least one vinyl group in order to form a catalyst composition and thereafter
  b) hydrogenating the nitrile rubber in the presence of the novel catalyst composition formed in step a).

Advantageously the novel catalyst composition allows for the first time to perform a hydrogenation reaction of nitrile rubber without a simultaneous metathetic degradation of the nitrile rubber. This means that the hydrogenation of nitrile rubbers using a transition-metal based metathesis catalyst can be carried out in a controlled manner, i.e. under formation of hydrogenated nitrile rubber with a controllable molecular weight. It is possible to keep the molecular weight of the nitrile rubber constant during hydrogenation. In the alternative it is also possible to adjust and regulate the molecular weight of the nitrile rubber in a desired manner by controlling and choosing the molar ratio between the metathesis catalyst and the co-catalyst when preparing the novel catalyst composition. In particular the present process allows in a specific embodiment to take advantage of using one and the same catalyst for a metathesis reaction in a first step, then adding the co-catalyst to the reaction mixture of the metathesis reaction, thereby preparing the novel catalyst composition and thereafter hydrogenating the metathesized nitrile rubber in a second step. The co-catalyst can be added at any degree of metathesis to the reaction mixture containing the transition-metal based metathesis catalyst and therefore allows to prepare tailor-made hydrogenated nitrile rubbers in a commercially attractive fashion. Additionally the hydrogenation process of the present invention allows to use the transition metal based catalyst in a very low concentration, so that there is no need to remove or recycle the transition metal based catalyst after the hydrogenation.

The catalyst composition prepared and used according to the present invention is characterized by its high hydrogenation activity. High hydrogenation degrees may be achieved in short reaction times.

BRIEF DESCRIPTION OF THE FIGURES

The above and other aspects, features and advantages of the invention will become apparent from the following detailed description in conjunction with the accompanying drawings showing the following:
  FIG. 1: FT-IR spectra of the (H)NBR samples during the hydrogenation in Example 1.
  FIG. 2: FT-IR spectra of the (H)NBR samples during the hydrogenation in Example 2.
  FIG. 3: FT-IR spectra of the (H)NBR samples during the hydrogenation in Example 3.
  FIG. 4: Hydrogenation degree of the (H)NBR samples during the hydrogenation in Examples 1-3.
  FIG. 5: FT-IR spectra of the (H)NBR samples before and after hydrogenation in Example 5.
  FIG. 6: Hydrogenation degree of the (H)NBR samples during the hydrogenation in Example 5.
  FIG. 7: FT-IR spectra of the (H)NBR samples before and after hydrogenation in Example 6.
  FIG. 8: FT-IR spectra of the (H)NBR samples before and after hydrogenation in Example 7.

FIG. 9: FT-IR spectra of the (H)NBR samples before and after hydrogenation in Example 8.

FIG. 10: Hydrogenation degree of the (H)NBR samples during the hydrogenation in Example 8.

DETAILED DESCRIPTION OF THE INVENTION

The term "substituted" used for the purposes of the present patent application means that a hydrogen atom on an indicated radical or atom has been replaced by one of the groups indicated in each case, with the proviso that the valency of the atom indicated is not exceeded and the substitution leads to a stable compound.

For the purposes of the present patent application and invention, all the definitions of moieties, parameters or explanations given above or below in general terms or in preferred ranges can be combined with one another in any way, i.e. including combinations of the respective ranges and preferred ranges.

Definition Co-Catalyst:

In a preferred embodiment the co-catalyst has the general formula (1)

$$CH_2=CRR' \qquad (1)$$

in which R and R' are identical or different and shall mean hydrogen,
$OR^1$ wherein $R^1$ shall mean alkyl, cycloalkyl, alkenyl, alkynyl, aryl, or heteroaryl, $C(=O)(R^2)$, $-C(=O)N(R^2)_2$, $-[(CH_2)_n-X]_mR^2$, $-[(CH_2)_n-X]_m-CH=CH_2$, or $-(CH_2)_p-C(R^3)_2R^4$
wherein
X is identical or different and means oxygen (O) or $NR^2$,
$R^2$ are identical or different and represent H, alkyl, cycloalkyl, alkenyl, alkynyl, aryl, or heteroaryl,
$R^3$ are identical or different and represent $C_1$-$C_8$ alkyl or $-(CH_2)_n-O-CH=CH_2$,
$R^4$ represents $(CH_2)_p-O-CH=CH_2$,
n is in the range of from 1 to 5,
m is in the range of from 1 to 10,
p is in the range of from 0 to 5,
or where in the alternative, if R and R' both represent a group $OR^1$, both $R^1$ may be linked to each other and together represent a divalent group $-(C(R^2)_2)_q-$ with q being 2, 3 or 4 and $R^2$ being identical or different and having the above defined meanings,
$SR^5$, $SOR^5$, $SO_2R^5$
wherein $R^5$ represents alkyl, cycloalkyl, alkenyl, alkynyl, aryl, or heteroaryl,
$N(R^6R^7)$, $P(R^6R^7)$
wherein $R^6$ and $R^7$ are identical or different and shall mean alkyl, cycloalkyl, alkenyl, alkynyl, aryl, heteroaryl, $-C(=O)(R^2)$, or
where in the alternative $R^6$ and $R^7$ may form together with such N or P atom to which they both are linked at the same time a saturated, unsaturated or aromatic cyclic structure with 4 to 7 carbon atoms in the cyclic structure wherein one, two or three of said carbon atoms can be replaced by a moiety selected from oxygen, sulfur, nitrogen, $N-R^8$ or $P-R^8$ wherein $R^8$ shall mean alkyl, cycloalkyl, alkenyl, alkynyl, aryl, or heteroaryl, or
$P(=O)(OR^9)_2$
in which $R^9$ are identical or different and shall mean alkyl, cycloalkyl, alkenyl, alkynyl, aryl, heteroaryl, however, under the proviso that R and R' must not both represent hydrogen at the same time.

In the co-catalysts according to general formula (1) all alkyl, cycloalkyl, alkenyl, alkynyl, aryl, or heteroaryl moieties in $R^1$, $R^2$, $R^3$, $R^4$, $R^5$, $R^6$, $R^7$, $R^8$ or $R^9$ may optionally be further substituted by one or more alkyl, halogen, alkoxy, alkenyloxy, aryl or heteroaryl substituents. All aforementioned moieties, in particular the alkyl, alkenyl and/or alkynyl moieties can be either straight chain or branched to the extent chemically plausible. Of course, the above proviso that the valency of the atom indicated is not exceeded and the substitution leads to a stable compound shall be fulfilled.

If R and R' represent $OR^1$, both such $R^1$ can be linked to each other and together represent a divalent group $-(C(R^2)_2)_q-$ with q being 2, 3, 4 or 5 and $R^2$ being identical or different and having the meanings defined regarding formula (1) above. In such case a cyclic structure is formed by the divalent group together with the two oxygen atoms to which it the divalent group is bound and the adjacent vinylic carbon atom.

In another embodiment of the present invention the catalyst composition is obtained using at least one, preferably one, co-catalyst having the general formula (1)

$$CH_2=CRR' \qquad (1)$$

in which R is hydrogen and R' shall mean,
$OR^1$ wherein $R^1$ shall mean $C_1$-$C_{16}$-alkyl, $C_3$-$C_{10}$-cycloalkyl, $C_2$-$C_{16}$-alkenyl, $C_2$-$C_{20}$-alkynyl, $C_6$-$C_{24}$-aryl, $C_6$-$C_{24}$-heteroaryl, $-C(=O)(R^2)$, $-C(=O)N(R^2)_2$, $-[(CH_2)_nX]_mR^2$, $-[(CH_2)_nX]_m-CH=CH_2$, or $-(CH_2)_p-C(R^3)_2R^4$,
wherein
X is identical or different and oxygen (O) or $NR^2$,
$R^2$ are identical or different and represent H, $C_1$-$C_{16}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_3$-$C_{20}$-heteroaryl,
$R^3$ are identical or different and represent $C_1$-$C_4$ alkyl or $-(CH_2)_n-O-CH=CH_2$,
$R^4$ represents $(CH_2)_p-O-CH=CH_2$,
n is in the range of from 1 to 4,
m is in the range of from 1 to 5,
p is in the range of from 0 to 5,
$SR^5$, $SOR^5$, $SO_2R^5$
wherein $R^5$ represents $C_1$-$C_{16}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_6$-$C_{24}$-heteroaryl,
$N(R^6R^7)$, $P(R^6R^7)$
wherein $R^6$ and $R^7$ are identical or different and shall mean $C_1$-$C_{16}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_6$-$C_{24}$-heteroaryl, $-C(=O)(R^2)$, or
where in the alternative $R^6$ and $R^7$ may form together with such N or P atom to which they both are linked at the same time a saturated, unsaturated or aromatic cyclic structure with 4 to 7 carbon atoms in the cyclic structure wherein one, two or three of said carbon atoms can be replaced by a moiety selected from oxygen, sulfur, nitrogen, $N-R^8$ or $P-R^8$ wherein $R^8$ shall mean $C_1$-$C_{16}$-alkyl, $C_3$-$C_{10}$-cycloalkyl, $C_2$-$C_{16}$-alkenyl, $C_2$-$C_{20}$-alkynyl, $C_6$-$C_{24}$-aryl, $C_6$-$C_{24}$-heteroaryl, or
$P(=O)(OR^9)_2$
in which $R^9$ are identical or different and shall mean $C_1$-$C_{16}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_6$-$C_{24}$-heteroaryl.

In another embodiment of the present invention the catalyst composition is obtained using at least one, preferably one, co-catalyst having the general formula (1)

$$CH_2=CRR' \quad (1)$$

in which R and R' are identical or different and shall mean $OR^1$ wherein $R^1$ shall mean $C_1$-$C_{16}$-alkyl, $C_3$-$C_{10}$-cycloalkyl, $C_2$-$C_{16}$-alkenyl, $C_2$-$C_{20}$-alkynyl, $C_6$-$C_{24}$-aryl, $C_6$-$C_{24}$-heteroaryl, —C(=O)($R^2$), —C(=O)N($R^2$)$_2$, —[(CH$_2$)$_n$X]$_m$R$^2$, —[(CH$_2$)$_n$X]$_m$—CH=CH$_2$, or —(CH$_2$)$_p$—C($R^3$)$_2$R$^4$,
wherein
X is identical or different and oxygen (O) or NR$^2$,
$R^2$ are identical or different and represent H, $C_1$-$C_{16}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_3$-$C_{20}$-heteroaryl,
$R^3$ are identical or different and represent $C_1$-$C_4$ alkyl or —(CH$_2$)$_n$—O—CH=CH$_2$,
$R^4$ represents (CH$_2$)$_p$—O—CH=CH$_2$,
n is in the range of from 1 to 4,
m is in the range of from 1 to 5,
p is in the range of from 0 to 5,
or where in the alternative, if R and R' both represent a group $OR^1$, both $R^1$ may be linked to each other and together represent a divalent group —(C($R^2$)$_2$)$_q$— with q being 2, 3 or 4 and $R^2$ being identical or different and having the above defined meanings,
$SR^5$, $SOR^5$, $SO_2R^5$
wherein $R^5$ represents $C_1$-$C_{16}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_6$-$C_{24}$-heteroaryl,
N($R^6R^7$), P($R^6R^7$)
wherein $R^6$ and $R^7$ are identical or different and shall mean $C_1$-$C_{16}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_6$-$C_{24}$-heteroaryl, —C(=O)($R^2$), or
where in the alternative $R^6$ and $R^7$ may form together with such N nr P atom to which they both are linked at the same time a saturated, unsaturated or aromatic cyclic structure with 4 to 7 carbon atoms in the cyclic structure wherein one, two or three of said carbon atoms can be replaced by a moiety selected from oxygen, sulfur, nitrogen, N—$R^8$ or P—$R^8$ wherein $R^8$ shall mean $C_1$-$C_{16}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_6$-$C_{24}$-heteroaryl, or
P(=O)(OR$^9$)$_2$
in which $R^9$ are identical or different and shall mean $C_1$-$C_{16}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_6$-$C_{24}$-heteroaryl.

In another preferred embodiment of the present invention the catalyst composition is obtained using at least one, preferably one, co-catalyst having the above depicted general formula (1) wherein $$CH_2=CRR' \quad (1)$$

in which R is hydrogen and R' shall mean
$OR^1$ wherein $R^1$ shall mean $C_1$-$C_{12}$-alkyl, $C_5$-$C_8$-cycloalkyl, $C_2$-$C_{12}$-alkenyl, $C_2$-$C_{12}$-alkynyl, $C_6$-$C_{14}$-aryl, $C_6$-$C_{14}$-heteroaryl, —C(=O)($R^2$), —C(=O)N($R^2$)$_2$, —[(CH$_2$)$_n$X]$_m$R$^2$, —[(CH$_2$)$_n$X]$_m$—CH=CH$_2$, or —(CH$_2$)$_p$—C($R^3$)$_2$R$^4$,
wherein
X is identical or different and oxygen (O) or NR$^2$,
$R^2$ are identical or different and represent H, $C_1$-$C_{12}$-alkyl, $C_5$-$C_8$-cycloalkyl, $C_2$-$C_{12}$-alkenyl, $C_2$-$C_{12}$-alkynyl, $C_6$-$C_{14}$-aryl, or $C_3$-$C_{14}$-heteroaryl,
$R^3$ are identical or different and represent methyl, ethyl or —(CH$_2$)$_n$—O—CH=CH$_2$,
$R^4$ represents (CH$_2$)$_p$—O—CH=CH$_2$,
n is 1, 2 or 3,
m is 1, 2, 3, or 4,
p is 0, 1, 2, 3 or 4,
$SR^5$, $SOR^5$, $SO_2R^5$
wherein $R^5$ represents $C_1$-$C_{12}$-alkyl, $C_5$-$C_8$-cycloalkyl, $C_2$-$C_{12}$-alkenyl, $C_2$-$C_{12}$-alkynyl, $C_6$-$C_{14}$-aryl, or $C_3$-$C_{14}$-heteroaryl,
N($R^6R^7$), P($R^6R^7$)
wherein $R^6$ and $R^7$ are identical or different and shall mean $C_1$-$C_{12}$-alkyl, $C_5$-$C_8$-cycloalkyl, $C_2$-$C_{12}$-alkenyl, $C_2$-$C_{12}$-alkynyl, $C_6$-$C_{14}$-aryl, or $C_6$-$C_{14}$-heteroaryl, —C(=O)($R^2$), or
where in the alternative $R^6$ and $R^7$ may form together with such N or P atom to which they both are linked at the same time a saturated, unsaturated or aromatic cyclic structure with 4 to 5 carbon atoms in the cyclic structure wherein one or two of said carbon atoms can be replaced by a moiety selected from oxygen, sulfur, nitrogen, N—$R^8$ or P—$R^8$ wherein $R^8$ shall mean $C_1$-$C_{12}$-alkyl, $C_5$-$C_8$-cycloalkyl, $C_2$-$C_{12}$-alkenyl, $C_2$-$C_{12}$-alkynyl, $C_6$-$C_{14}$-aryl, or $C_3$-$C_{14}$-heteroaryl, or
P(=O)(OR$^9$)$_2$
in which $R^9$ are identical or different and shall mean $C_1$-$C_{12}$-alkyl, $C_5$-$C_8$-cycloalkyl, $C_2$-$C_{12}$-alkenyl, $C_2$-$C_{12}$-alkynyl, $C_6$-$C_{14}$-aryl, or $C_6$-$C_{14}$-heteroaryl.

In another preferred embodiment of the present invention the catalyst composition is obtained using at least one, preferably one, co-catalyst having the above depicted general formula (1) wherein $$CH_2=CRR' \quad (1)$$

in which R and R' are identical or different and shall mean $OR^1$ wherein $R^1$ shall mean $C_1$-$C_{12}$-alkyl, $C_5$-$C_8$-cycloalkyl, $C_2$-$C_{12}$-alkenyl, $C_2$-$C_{12}$-alkynyl, $C_6$-$C_{14}$-aryl, $C_6$-$C_{14}$-heteroaryl, —C(=O)($R^2$), —C(=O)N($R^2$)$_2$, —[(CH$_2$)$_n$X]$_m$R$^2$, —[(CH$_2$)$_n$X]$_m$—CH=CH$_2$, or —(CH$_2$)$_p$—C($R^3$)$_2$R$^4$,
wherein
X is identical or different and oxygen (O) or NR$^2$,
$R^2$ are identical or different and represent H, $C_1$-$C_{12}$-alkyl, $C_5$-$C_8$-cycloalkyl, $C_2$-$C_{12}$-alkenyl, $C_2$-$C_{12}$-alkynyl, $C_6$-$C_{14}$-aryl, or $C_3$-$C_{14}$-heteroaryl,
$R^3$ are identical or different and represent methyl, ethyl or —(CH$_2$)$_n$—O—CH=CH$_2$,
$R^4$ represents (CH$_2$)$_p$—O—CH=CH$_2$,
n is 1, 2 or 3,
m is 1, 2, 3, or 4,
p is 0, 1, 2, 3 or 4,
or where in the alternative, if R and R' both represent a group $OR^1$, both $R^1$ may be linked to each other and together represent a divalent group —(C($R_2$)$_2$)$_q$— with q being 2, or 3 and $R^2$ being identical or different and representing hydrogen or $C_1$-$C_4$ alkyl,
$SR^5$, $SOR^5$, $SO_2R^5$
wherein $R^5$ represents $C_1$-$C_{12}$-alkyl, $C_5$-$C_8$-cycloalkyl, $C_2$-$C_{12}$-alkenyl, $C_2$-$C_{12}$-alkynyl, $C_6$-$C_{14}$-aryl, or $C_3$-$C_{14}$-heteroaryl,
N($R^6R^7$), P($R^6R^7$)
wherein $R^6$ and $R^7$ are identical or different and shall mean $C_1$-$C_{12}$-alkyl, $C_5$-$C_8$-cycloalkyl, $C_2$-$C_{12}$-alkenyl, $C_2$-$C_{12}$-alkynyl, $C_6$-$C_{14}$-aryl, or $C_6$-$C_{14}$-heteroaryl, —C(=O)($R^2$), or where in the alternative $R^6$ and $R^7$ may form together with such N or P atom to which they both are linked at the same time a saturated, unsaturated or aromatic cyclic structure with 4 to 5 carbon atoms in the cyclic structure wherein one or two of said carbon atoms can be replaced by a moiety selected from oxygen, sulfur, nitrogen, N—$R^8$ or P—$R^8$ wherein $R^8$ shall mean $C_1$-$C_{12}$-alkyl, $C_5$-$C_8$-cycloalkyl, $C_2$-$C_{12}$alkenyl, $C_2$-$C_{12}$-alkynyl, $C_6$-$C_{14}$-aryl, or $C_3$-$C_{14}$-heteroaryl, or $P(=O)(OR^9)_2$ in which $R^9$ are identical or different and shall mean $C_1$-$C_{12}$-alkyl, $C_5$-$C_8$-cycloalkyl, $C_2$-$C_{12}$-alkenyl, $C_2$-$C_{12}$-alkynyl, $C_6$-$C_{14}$-aryl, or $C_6$-$C_{14}$-heteroaryl.

In another more preferred embodiment of the present invention the catalyst composition is obtained using one co-catalyst having the above depicted general formulae (1) in which R is hydrogen and R' represents $OR^1$ wherein $R^1$ shall mean $C_1$-$C_6$-alkyl, $C_5$-$C_6$-cycloalkyl, $C_2$-$C_6$-alkenyl, $C_2$-$C_6$-alkynyl, phenyl, imidazolyl, triazolyl, or pyridinyl, —C(=O)($R^2$), —C(=O)N($R^2$)$_2$, —[(CH$_2$)$_n$O]$_m$$R^2$, —[(CH$_2$)$_n$O]$_m$—CH=CH$_2$, or —(CH$_2$)$_p$—C($R^3$)$_2$$R^4$ wherein $R^2$ are identical or different and represent H, $C_1$-$C_6$-alkyl, $C_5$-$C_8$-cycloalkyl, $C_2$-$C_8$-alkenyl, $C_2$-$C_8$-alkynyl, phenyl, imidazolyl, triazolyl, or pyridinyl, $R^3$ are identical or different and represent methyl, ethyl or —(CH$_2$)$_n$—O—CH=CH$_2$, $R^4$ represents (CH$_2$)$_p$—O—CH=CH$_2$, n is 1, or 2, m is 1, 2, or 3, and p is 0, 1, or 3.

In all the above mentioned preferred, more preferred and most preferred embodiments of the co-catalysts according to general formula (1) the alkyl, cycloalkyl, alkenyl, alkynyl, aryl, or heteroaryl moieties in $R^1$, $R^2$, $R^3$, $R^4$, $R^5$, $R^6$, $R^7$, $R^8$ or $R^9$ may optionally be further substituted by one or more $C_1$-$C_6$-alkyl, $C_5$-$C_6$-cycloalkyl, $C_2$-$C_6$-alkenyl, $C_2$-$C_6$-alkynyl, phenyl, imidazolyl, triazolyl, or pyridinyl moieties. All aforementioned substituents, in particular the alkyl, alkenyl and/or alkynyl moieties can be either straight chain or branched to the extent chemically plausible.

In an even more preferred embodiment of the present invention one or more co-catalysts are used for the preparation of the novel catalyst compositions which have the following formulae:

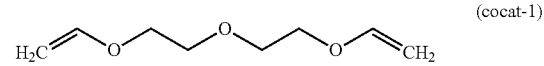
(cocat-1)

(cocat-2)

(cocat-3)

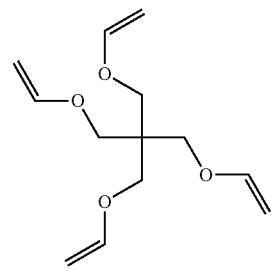
(cocat-4)

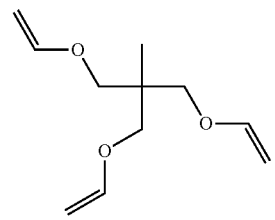
(cocat-5)

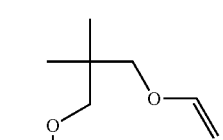
(cocat-6)

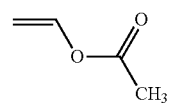
(cocat-7)

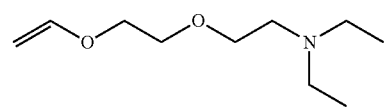
(cocat-8)

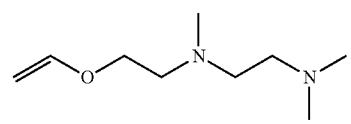
(cocat-9)

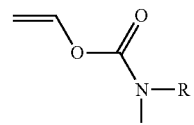
(cocat-10)

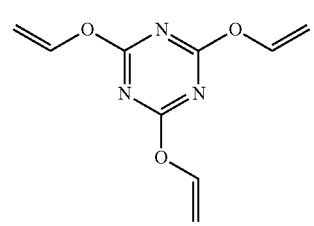
(cocat-11)

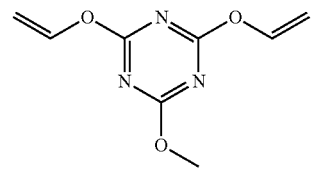
(cocat-12)

(cocat-13) 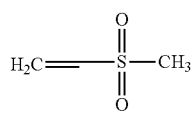

(cocat-14) 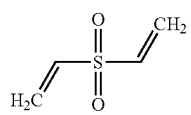

(cocat-15) 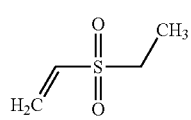

(cocat-16) 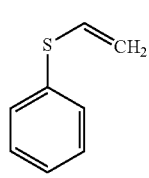

(cocat-17) 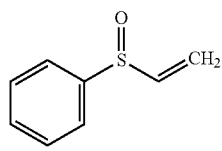

(cocat-18) 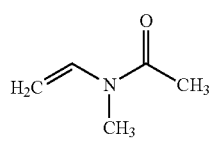

(cocat-19) 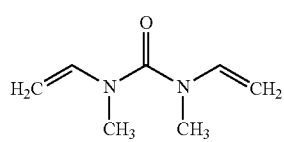

(cocat-20) 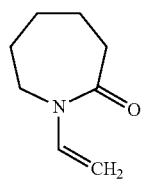

(cocat-21) 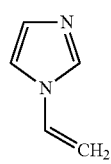

(cocat-22) 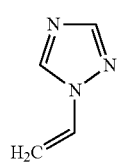

(cocat-23) 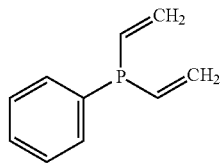

(cocat-24) 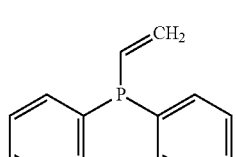

(cocat-25) 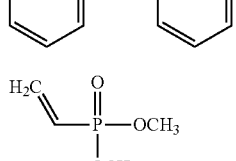

(cocat-26) 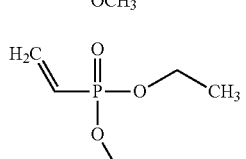

(cocat-27) 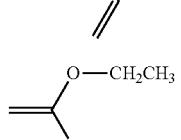

(cocat-28) 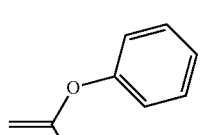

(cocat-29) 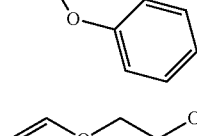

(cocat-30) 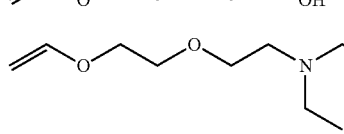

(cocast-31) 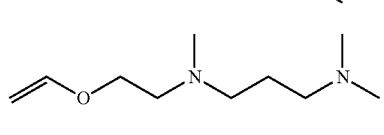

(cocat-32) 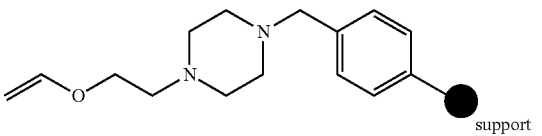

In another also preferred embodiment of the present invention a co-catalyst is used for the preparation of the novel catalyst compositions in which R and R' both represent $OR^1$ where such $R^1$ together form a divalent group as defined above, wherein such specific co-catalysts have the following formulae with $R^6$ having the same meaning as outlined for general formula (1).

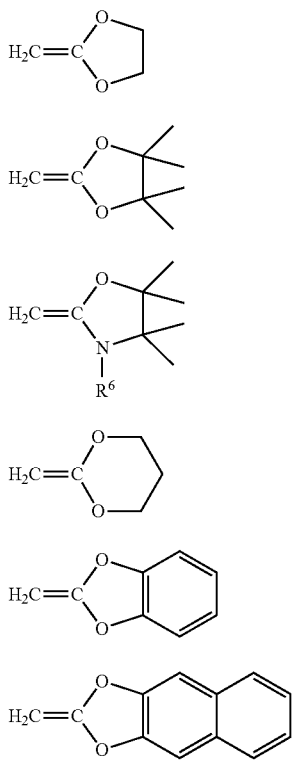

(cocat-33)

(cocat-34)

(cocat-35)

(cocat-36)

(cocat-37)

(cocat-38)

Catalysts:

The catalyst compositions according to the invention are obtained by using a catalyst of the general formula (A).

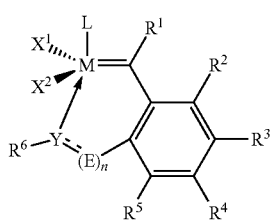

(A)

where

M is ruthenium or osmium, $X^1$ and $X^2$ are identical or different ligands,

L is an electron donating ligand, which can be linked or not linked with $X^1$ to form a cyclic structure, $R^1$ is hydrogen, alkyl, cycloalkyl, alkenyl, alkynyl, aryl or heteroaryl and $R^2$, $R^3$, $R^4$ and $R^5$ are identical or different and are each hydrogen or an organic or inorganic substituent, $R^6$ is H, alkyl, cycloalkyl, alkenyl, alkynyl, aryl, heteroaryl, —C(═O)R, —C(═O)OR, —C(═O)N(R)$_2$, —C(═S)R, —C(═S)SR, —C(═S)OR, —C(═S)N(R)$_2$, —S(═O)$_2$N(R)$_2$, —S(═O)$_2$R, —S(═O)R or a group containing either a C═O or a C═S structural element adjacent to a carbon atom which is bound to Y, n is 0 or 1, wherein if n=1, then the element $$Y\text{---}(E)_n$$

shall mean that Y and (E)$_n$ are linked either by a single bond or by a double bond, wherein (i) if Y and (E)$_n$ are linked by a single bond, then
Y is oxygen (O), sulfur (S), N—R or P—R and
E is CH$_2$ or (ii) if Y and (E)$_n$ are linked by a double bond, then
Y is N or P
E is CH, wherein if n=0, then Y is oxygen (O), sulfur (S), N—R or P—R and directly linked by a single bond to the phenyl moiety depicted above in formula (A)

and wherein in all above occurrences of general formula (A)

R is hydrogen or alkyl, cycloalkyl, alkenyl, alkynyl, aryl or heteroaryl.

In all the above mentioned and further down defined preferred, more preferred and most preferred embodiments of the catalysts according to general formula (A) the alkyl, cycloalkyl, alkenyl, alkynyl, aryl, or heteroaryl moieties in the respective moieties may optionally be further substituted by one or more $C_1$-$C_6$-alkyl, $C_5$-$C_6$-cycloalkyl, $C_1$-$C_6$-alkoxy, $C_2$-$C_6$-alkenyl, $C_2$-$C_6$-alkynyl, halogen, aryl, preferably phenyl, heteroaryl, preferably pyridinyl, imidazolyl, or triazolyl substituents. All aforementioned substituents, in particular the alkyl, alkenyl and/or alkynyl moieties can be straight-chain or branched to the extent chemically plausible.

The catalysts of the general formula (A) are known in principle. Representatives of this class of compounds are e.g. the catalysts described by Hoveyda et al. in US 2002/0107138 A1 and Angew Chem. Int. Ed. 2003, 42, 4592, and the catalysts described by Grela in WO-A-2004/035596, Eur. J. Org. Chem 2003, 963-966 and Angew. Chem. Int. Ed. 2002, 41, 4038 and also in J. Org. Chem. 2004, 69, 6894-96 and Chem. Eur. J 2004, 10, 777-784. Further representatives of this class of catalysts are the catalysts described in EP-A-1 905 777. These catalysts are either commercially available or can be prepared as described in the literature references cited.

To the extent any of the following general, preferred, more preferred or most preferred definitions of the catalyst according to general formal (A) mention the meaning "$C_2$-$C_{20}$ heterocyclic" and "$C_2$-$C_{20}$ heteroaryl" this shall always imply that the respective heterocyclic ring or heteroaryl ring contains besides the number of carbon atoms given such an additional number of hetero atoms that a stable heterocyclic or heteroaryl structure is formed: A stable "$C_2$ heterocyclic" would e.g. be a triazolyl moiety comprising two carbon atoms in the ring and three nitrogen atoms.

Definition of L:

In the general formula (A), L is an electron donating ligand. In one embodiment of the catalysts of general formula (A) L is a phosphine, sulfonated phosphine, phosphate, phosphinite, phosphonite, arsine, stibine, ether, amine, amide, sulfonate, sulfoxide, carboxyl, nitrosyl, pyridine, thioether, imidazoline or imidazolidine ligand (the latter two also being jointly referred to as "Im" ligand(s)).

The term "phosphinite" includes, for example, phenyl diphenylphosphinite, cyclohexyl dicyclohexylphosphinite, isopropyl diisopropylphosphinite and methyl diphenylphosphinite.

The term "phosphite" includes, for example, triphenyl phosphite, tricyclohexyl phosphite, tri-tert-butyl phosphite, triisopropyl phosphite and methyl diphenyl phosphite.

The term "stibine" includes, for example, triphenylstibine, tricyclohexylstibine and trimethylstibine.

The term "sulfonate" includes, for example, trifluoromethanesulfonate, tosylate and mesylate.

The term "sulfoxide" includes, for example, $(CH_3)_2S(=O)$ and $(C_6H_5)_2S=O$.

The term "thioether" includes, for example, $CH_3SCH_3$, $C_6H_5SCH_3$, $CH_3OCH_2CH_2SCH_3$ and tetrahydrothiophene.

For the purposes of the present application, the term "pyridine" is used as a collective term for all nitrogen-containing ligands as are mentioned by, for example, Grubbs in WO-A-03/011455. Examples are: pyridine, picolines (including α-, β- and γ-picoline), lutidines (including 2,3-, 2,4-, 2,5-, 2,6-, 3,4- and 3,5-lutidine), collidine (2,4,6-trimethylpyridine), trifluoromethylpyridine, phenylpyridine, 4-(dimethylamino)pyridine, chloropyridines, bromopyridines, nitropyridines, quinoline, pyrimidine, pyrrole, imidazole and phenylimidazole.

If L is an imidazoline or imidazolidine ligand (also jointly referred to as "Im" in this application unless indicated otherwise), this usually has a structure corresponding to the general formulae (IIa) or (IIb),

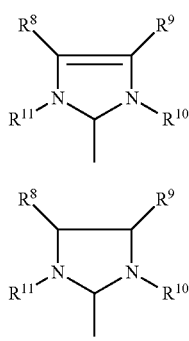

where
$R^8$, $R^9$, $R^{10}$ and $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, —Si(R)$_3$, —O—Si(R)$_3$, —O—C(=O)R, C(=O)R, —C(=O)N(R)$_2$, —NR—C(=O)—N(R)$_2$, —SO$_2$N(R)$_2$, —S(=O)R, —S(=O)$_2$R, —O—S(=O)$_2$R, halogen, nitro or cyano; wherein in all above occurrences relating to the meanings of $R^8$, $R^9$, $R^{10}$ and $R^{11}$ the group R is identical or different and represents hydrogen, alkyl, cycloalkyl, alkenyl, alkynyl, aryl or heteroaryl.

If appropriate, one or more of $R^8$, $R^9$, $R^{10}$, and $R^{11}$ can independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, $C_2$-$C_{20}$ heteroaryl, $C_2$-$C_{20}$ heterocyclic, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, where these abovementioned substituents, to the extent chemically possible, may in turn be substituted by one or more substituents, preferably selected from the group consisting of halogen, in particular chlorine or bromine, $C_1$-$C_5$-alkyl, $C_1$-$C_5$-alkoxy and phenyl.

Merely in the interest of clarity, it may be added that the structures of the imidazoline and imidazolidine ligand depicted in the general formulae (IIa) and (IIb) in the present patent application are equivalent to the structures (IIa') and (IIb') which are frequently also found in the literature for this imidazoline and imidazolidine ligand, respectively, and emphasize the carbene character of the imidazoline and imidazolidine. This applies analogously to the associated preferred structures (IIIa)-(IIIu) depicted below.

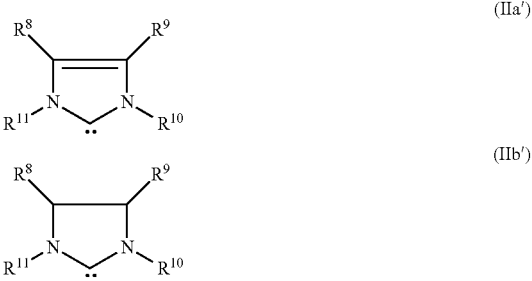

If L is an imidazoline or imidazolidine ligand in the catalysts of the general formula (A)
$R^8$ and $R^9$ are identical or different and preferably represent hydrogen, $C_6$-$C_{24}$-aryl, straight-chain or branched $C_1$-$C_{10}$-alkyl, or form a cycloalkyl or aryl structure together with the carbon atoms to which they are bound.

More preferably
$R^8$ and $R^9$ are identical and are selected from the group consisting of hydrogen, methyl, propyl, butyl and phenyl.

The preferred and more preferred meanings of $R^8$ and $R^9$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

If L is an imidazoline or imidazolidine ligand in the catalysts of the general formula (A)
$R^{10}$ and $R^{11}$ are identical or different and preferably represent straight-chain or branched $C_1$-$C_{10}$-alkyl, $C_3$-$C_{10}$-cycloalkyl, $C_6$-$C_{24}$-aryl, particularly preferably phenyl, $C_1$-$C_{10}$-alkylsulfonate, $C_6$-$C_{10}$-arylsulfonate.

More preferably
$R^{10}$ and $R^{11}$ are identical and are selected from the group consisting of i-propyl, neopentyl, adamantyl, phenyl, 2,6-diisopropylphenyl, 2,6-dimethylphenyl or 2,4,6-trimethylphenyl.

These preferred meanings of $R^{10}$ and $R^{11}$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

Particularly preferred imidazoline and imidazolidine ligands have the following structures (IIIa) to (IIIu), where "Ph" means in each case phenyl, "Bu" means butyl, "Mes" represents in each case 2,4,6-trimethylphenyl, "Dipp" means in all cases 2,6-diisopropylphenyl and "Dimp" means 2,6-dimethylphenyl.

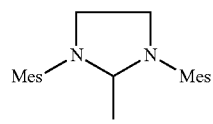
(IIIa)

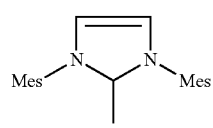
(IIIb)

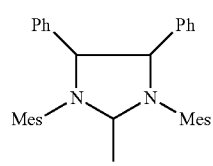
(IIIc)

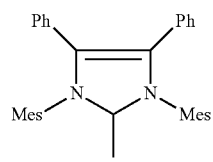
(IIId)

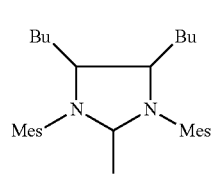
(IIIe)

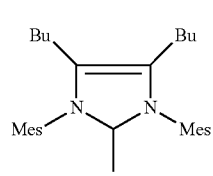
(IIIf)

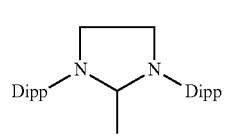
(IIIg)

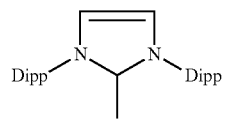
(IIIh)

-continued

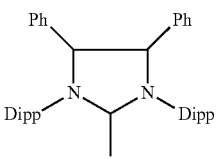
(IIIj)

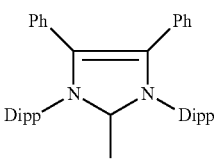
(IIIk)

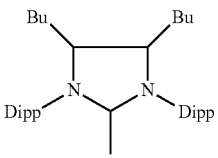
(IIIm)

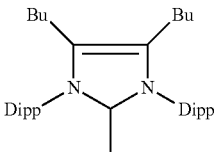
(IIIn)

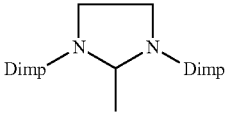
(IIIp)

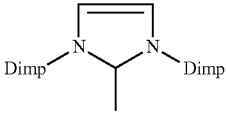
(IIIq)

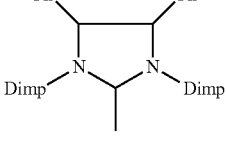
(IIIr)

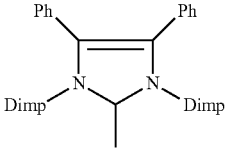
(IIIs)

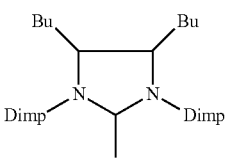
(IIIt)

(IIIu)

In a further preferred embodiment L may have the general formula (IIc) and (IId)

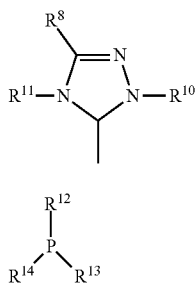

wherein
- R⁸, R⁹ and R¹⁰ may have all general, preferred, more preferred and most preferred meanings as defined above in relation to general formulae (IIa) and (IIb), and
- R¹², R¹³ and R¹⁴ are identical or different and may represent alkyl, cycloalkyl, alkoxy, aryl, aryloxy, or a heterocyclic group.

In general formulae (IIc) and (IId) $R^8$, $R^9$, $R^{10}$, $R^{12}$, $R^{13}$ and $R^{14}$ may be substituted also by one or more further substituents selected from the group consisting of straight-chain or branched $C_1$-$C_5$-alkyl, in particular methyl, $C_1$-$C_5$-alkoxy, aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a more preferred embodiment the ligand L has the general formula (IId) wherein
- $R^{12}$, $R^{13}$ and $R^{14}$ are identical or different, even more preferably identical, and can represent $C_1$-$C_{20}$ alkyl, $C_3$-$C_8$-cycloalkyl, $C_1$-$C_{20}$ alkoxy, $C_6$-$C_{20}$ aryl, $C_6$-$C_{20}$ aryloxy, $C_2$-$C_{20}$ heteroaryl or a $C_2$-$C_{20}$ heterocyclic group;

In an even more preferred embodiment the ligand L has the general formula (IId) wherein
- $R^{12}$, $R^{13}$ and $R^{14}$ are identical and each selected from the group consisting of methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, neophenyl, cyclopropyl, cyclobutyl, cyclopentyl, cyclohexyl, cycloheptyl cyclooctyl, phenyl, biphenyl, naphthyl, phenanthrenyl, anthracenyl, tolyl, 2,6-dimethylphenyl, and trifluoromethyl.

In case the ligand L possesses general formula (IId) it most preferably represents $PPh_3$, $P(p-Tol)_3$, $P(o-Tol)_3$, $PPh(CH_3)_2$, $P(CF_3)_3$, $P(p-FC_6H_4)_3$, $P(p-CF_3C_6H_4)_3$, $P(C_6H_4—SO_3Na)_3$, $P(CH_2C_6H_4—SO_3Na)_3$, P(isopropyl)$_3$, $P(CHCH_3(CH_2CH_3))_3$, P(cyclopentyl)$_3$, P(cyclohexyl)$_3$, P(neopentyl)$_3$ or P(neophenyl)$_3$.

Definition of $X^1$ and $X^2$

In the catalysts of the general formula (A), $X^1$ and $X^2$ are identical or different ligands, preferably anionic ligands.

In one embodiment of the catalysts of general formula (A), $X^1$ and $X^2$ are identical or different and represent hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthio, $C_6$-$C_{24}$-arylthio, $C_1$-$C_{20}$-alkylsulfonyl or $C_1$-$C_{20}$-alkylsulfinyl.

The abovementioned moieties listed as meanings for $X^1$ and $X^2$ can also be substituted by one or more further substituents, for example by halogen, preferably fluorine, $C_1$-$C_{10}$-alkyl, $C_1$-$C_{10}$-alkoxy or $C_6$-$C_{24}$-aryl, where these groups, too, may in turn also be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthio, $C_6$-$C_{24}$-arylthio, $C_6$-$C_{24}$-aryl or $C_1$-$C_5$-alkylsulfonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate ($p$-$CH_3$—$C_6H_4$—$SO_3$), mesylate ($CH_3SO_3$) or trifluoromethanesulfonate ($CF_3SO_3$).

Definition of $R^1$

In the general formula (A), $R^1$ shall mean hydrogen, alkyl, alkenyl, alkynyl or aryl. $R^1$ preferably represents hydrogen, $C_1$-$C_{30}$-alkyl, $C_2$-$C_{20}$-alkenyl, $C_2$-$C_{20}$-alkynyl or $C_6$-$C_{24}$-aryl. $R^6$ is particularly preferably hydrogen.

Definition of $R^6$

In the general formula (A) $R^6$ shall mean H, alkyl, cycloalkyl, alkenyl, alkynyl, aryl, hetero-aryl, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)R, —S(=O)R or a group containing either a C=O or a C=S structural element adjacent to a carbon atom which is bound to Y in formula (A), wherein R in all occurrences is identical or different and represents hydrogen, alkyl, cycloalkyl, alkenyl, alkynyl, aryl or heteroaryl. The meanings given for $R^6$ as well as R may in each case optionally be substituted by one or more alkyl, halogen, alkoxy, aryl or heteroaryl substituents.

$R^6$ is typically $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_2$-$C_{20}$ heteroaryl, —C(=O)R, —C(=O)OR, —C(=O)N(R)$_2$, —C(=S)R, —C(=S)SR, —(=S)OR, —C(=S)N(R)$_2$, S(=O)$_2$N(R)$_2$, —S(=O)$_2$R, —S(=O)R, —CH(R$^{61}$)—C(=O)(R$^{62}$) or —CH(R$^{61}$)—C(=S)(R$^{62}$), wherein $R^{61}$ and $R^{62}$ are identical or different and represent alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, or wherein $R^{61}$ may represent in the alternative also hydrogen, or where in the alternative $R^{61}$ and $R^{62}$ can form a saturated or unsaturated cyclic structure together with the carbon atoms to which they are bound, and wherein in all occurrences R is identical or different and represents hydrogen, alkyl, cycloalkyl, alkenyl, alkynyl, aryl or heteroaryl.

The preferred meanings given for $R^6$, R, $R^{61}$ and $R^{62}$ may in each case optionally be substituted by one or more $C_1$-$C_{30}$ alkyl, fluoro, chloro, $C_1$-$C_{20}$ alkoxy, $C_6$-$C_{24}$ aryl or $C_2$-$C_{20}$ heteroaryl substituents.

In one preferred embodiment $R^6$ is selected from the group consisting of
- $C_3$-$C_8$-cycloalkyl,
- $C_6$-$C_{24}$-aryl,
- straight-chain or branched $C_1$-$C_{12}$-alkyl, with the latter being able, if appropriate, to be interrupted by one or more double or triple bonds or one or more heteroatoms, preferably oxygen or N—R with R as defined above for formula (A), and
- —CH(R$^{61}$)—C(=O)(R$^{62}$), or —CH(R$^{61}$)—C(=S)(R$^{62}$), wherein $R^{61}$ and $R^{62}$ are identical or different and represent alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, halogen, alkoxy, aryl or heteroaryl substituents, wherein $R^{61}$ may represent in the alternative also hydrogen or where in the alternative $R^{61}$ and $R^{62}$ can form a cyclic structure together with the carbon atoms to which they are bound.

$C_3$-$C_8$-cycloalkyl encompasses cyclopropyl, cyclobutyl, cyclopentyl, cyclohexyl, cycloheptyl and cyclooctyl.

$C_6$-$C_{24}$-aryl shall mean an aromatic moiety having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

$C_1$-$C_{12}$-alkyl can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl.

$R^6$ is particularly preferably straight-chain or branched $C_1$-$C_{12}$-alkyl, most preferably methyl or isopropyl.

Definition of $R^2$, $R^3$, $R^4$ and $R^5$

In the general formula (B) $R^2$, $R^3$, $R^4$ and $R^5$ are identical or different and can each be hydrogen or an organic or inorganic moiety.

In an appropriate embodiment, $R^2$, $R^3$, $R^4$, $R^5$ are identical or different and are each hydrogen, halogen, nitro, cyano, alkyl, cycloalkyl, alkenyl, alkynyl, aryl, heterocyclyl, heteroaryl, alkoxy, alkenyloxy, alkynyloxy, aryloxy, alkoxycarbonyl, alkylthio, arylthio, $—N(R)_2$, $—Si(R)_3$, $—O—Si(R)_3$, $—C(=O)R$, $—C(=O)OR$, $—C(=O)N(R)_2$, $—C(=S)R$, $—C(=S)SR$, $—C(=S)OR$, $—C(=S)N(R)_2$, $—S(=O)_2N(R)_2$, $—S(=O)R$, or $—S(=O)_2R$ wherein R is identical or different and represents hydrogen, alkyl, cycloalkyl, alkenyl, alkynyl, aryl or heteroaryl or if two substituents R are bound to the same atom, such two substituents R may also form a saturated or unsaturated cyclic structure together with the atoms to which they are bound. These meanings given for $R^2$, $R^3$, $R^4$, $R^5$ may be in each case optionally be substituted by one or more alkyl, alkoxy, halogen, aryl or heteroaryl moieties.

In a preferred embodiment $R^2$, $R^3$, $R^4$, $R^5$ are identical or different and may represent hydrogen, fluorine, chlorine, bromine, iodine, nitro, cyano, $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_2$-$C_{20}$ heterocyclyl, $C_2$-$C_{20}$ heteroaryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $—N(R)_2$, $—Si(R)_3$, $—O—Si(R)_3$, $—C(=O)R$, $—C(=O)OR$, $—C(=O)N(R)_2$, $—C(=S)R$, $—C(=S)SR$, $—C(=S)OR$, $—C(=S)N(R)_2$, $—S(=O)_2N(R)_2$, $—S(=O)R$, or $—S(=O)_2R$ wherein R is identical or different and shall mean H, $C_1$-$C_{20}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_2$-$C_{24}$-heteroaryl, or if two substituents R are bound to the same atom, such two substituents R may also form a saturated or unsaturated cyclic structure together with the atoms to which they are bound. These preferred meanings given for $R^2$, $R^3$, $R^4$, $R^5$ may in each case optionally be substituted by one or more $C_1$-$C_{30}$-alkyl, $C_1$-$C_{20}$-alkoxy, halogen, $C_6$-$C_{24}$-aryl or heteroaryl moieties.

In a particularly preferred embodiment, $R^2$, $R^3$, $R^4$, $R^5$ are identical or different and are each nitro, straight-chain or branched $C_1$-$C_{10}$-alkyl, $C_5$-$C_8$-cycloalkyl, straight-chain or branched $C_1$-$C_{10}$-alkoxy or $C_6$-$C_{24}$-aryl, most preferably phenyl or naphthyl. The $C_1$-$C_{10}$-alkyl and $C_1$-$C_{10}$-alkoxy moieties may optionally be interrupted by one or more double or triple bonds and/or one or more heteroatoms, preferably oxygen or $—N(R)—$ with R being as defined above.

Furthermore, two or more of $R^2$, $R^3$, $R^4$ or $R^5$ can also be bridged via aliphatic or aromatic structures. For example, $R^3$ and $R^4$ together with the carbon atoms to which they are bound in the phenyl ring of the formula (B) can form a fused-on phenyl ring so that, overall, a naphthyl structure results.

Suitable catalyst compositions are also obtained using a catalyst of general formula (A1),

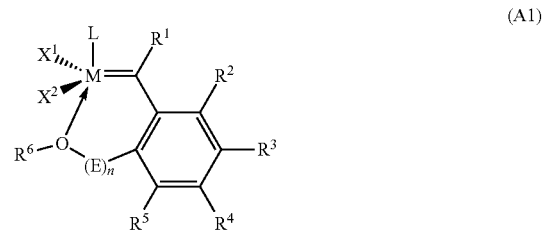

(A1)

where M, L, $X^1$, $X^2$, $R^2$, $R^3$, $R^4$, $R^5$, $R^6$, n and E can have the general, preferred and particularly preferred meanings mentioned for the general formula (A).

The catalysts of the general formula (A1) are known in principle from e.g., US 2002/0107138 A1 (Hoveyda et al.) and can be obtained by preparative methods indicated there.

Particular preference is given to catalyst systems comprising catalysts of the general formula (A1) in which
M is ruthenium,
$X^1$ and $X^2$ are both halogen, in particular both chlorine,
$R^6$ is a straight-chain or branched $C_1$-$C_{12}$-alkyl radical,
$R^2$, $R^3$, $R^4$, $R^5$ have the general, preferred and more preferred meanings mentioned for the general formula (A),
L has the general, preferred and more preferred meanings mentioned for the general formula (A)
E is $CH_2$ and
n is 0 or 1, more preferably 0.

Special preference is given to catalyst systems comprising catalysts of general formula (A1) in which
M is ruthenium,
$X^1$ and $X^2$ are both chlorine,
$R^6$ is an isopropyl radical,
$R^2$, $R^3$, $R^4$, $R^5$ are all hydrogen,
L is a substituted or unsubstituted imidazoline or imidazolidine ligand of the formula (IIa) or (IIb),

(IIa)

(IIb)

where $R^8$, $R^9$, $R^{10}$, $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, —Si(R)$_3$, —O—Si(R)$_3$, —O—C(=O)R, C(=O)R, —C(=O)N(R)$_2$, —SO$_2$N(R)$_2$, —S(=O)R, —S(=O)$_2$R, —O—S(=O)$_2$R, halogen, nitro or cyano, and E is CH$_2$ and n is 0 or 1, more preferably 0.

Such meanings of $R^8$, $R^9$, $R^{10}$, and $R^{11}$ in the specifically preferred catalysts of Formula (A1) may in each case be substituted by one or more further substituent(s), preferably straight-chain or branched $C_1$-$C_{10}$-alkyl, $C_3$-$C_8$-cycloalkyl, $C_1$-$C_{10}$-alkoxy or $C_6$-$C_{24}$-aryl, and these abovementioned substituents may in turn be substituted by one or more moieties, preferably selected from the group consisting of halogen, in particular chlorine or bromine, $C_1$-$C_5$-alkyl, $C_1$-$C_5$-alkoxy and phenyl.

Very particular preference is given to a catalyst system obtainable by using a catalyst which comes under the general formula (A1) and has the following structure, where Mes is 2,4,6-trimethylphenyl.

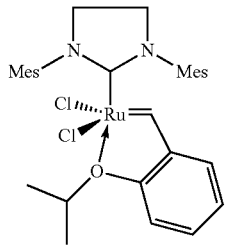

This catalyst is also referred to as "Hoveyda catalyst" in the literature.

Further suitable catalysts which come under the general formula (A1) have the following formulae, where Mes is in each case 2,4,6-trimethylphenyl.

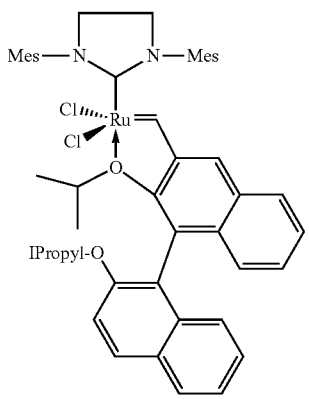
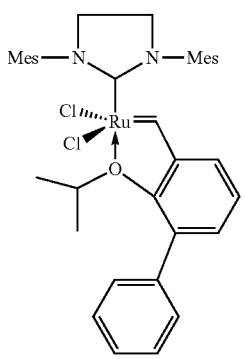

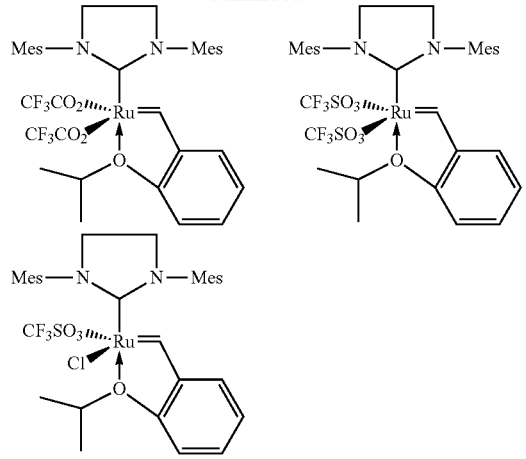

A further catalyst system according to the invention is obtainable using a catalyst of the general formula (A2),

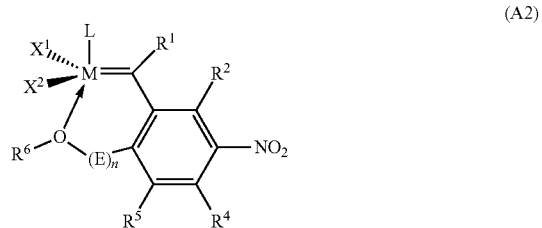

(A2)

where M, L, $X^1$, $X^2$, $R^1$, $R^2$, $R^4$, $R^5$, $R^6$, n and E have the general and preferred meanings mentioned for the formula (A).

The catalysts of the general formula (A2) are known in principle from, for example, WO-A-2004/035596 (Grela) and can be obtained by preparative methods indicated there.

Particular preference is given to catalyst systems obtainable using a catalyst of the general formula (A2) in which M is ruthenium, $X^1$ and $X^2$ are both halogen, in particular both chlorine, R is hydrogen $R^6$ is straight-chain or branched $C_1$-$C_{12}$-alkyl, $R^2$, $R^4$, and $R^5$ have the general and preferred meanings mentioned for the formula (A), L has the meanings mentioned for the general formula (A), E is CH$_2$ and n is 0 or 1, more preferably 0.

Very particular preference is given to catalyst systems obtainable by using a catalyst of the general formula (A2) in which M is ruthenium, $X^1$ and $X^2$ are both chlorine, $R^6$ is isopropyl, L is a substituted or unsubstituted imidazol or imidazolidine ligand of the formulae (IIa) or (IIb), where $R^8$, $R^9$, $R^{10}$, $R^{11}$ are identical or different and have the meanings mentioned for the very particularly preferred catalysts of the general formula (A1), E is CH$_2$ and n is 0 or 1, more preferably 0.

Particularly useful catalysts falling under general formula (A2) have the following structures, where Mes is in each case 24,6-trimethylphenyl.

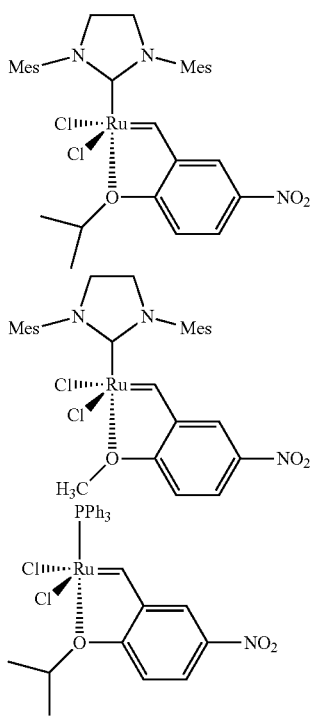

The catalyst depicted on the left is also known as "Grela catalyst" in the literature.

In an alternative embodiment catalysts of the general formula (A3) can be used in the process of the present invention,

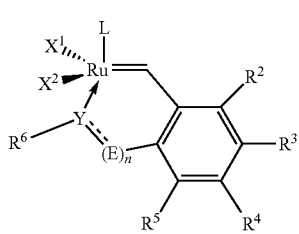

(A3)

wherein
- $X^1$ and $X^2$ are identical or different and shall mean hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl,
- L is an electron donating ligand, which can be linked or not linked with $X^1$ to form a cyclic structure,
- $R^3$ is chloro, fluoro, bromo, —C(=O)R, —C(=O)OR, —OC(=O)R, —C(=O)N(R)$_2$, —C(=S)R, —C(=S)SR, —C(=S)OR, —C(=S)N(R)$_2$, —S(=O)$_2$N(R)$_2$, —S(=O)$_2$R, or —S(=O)R,
- $R^4$ is H, halogen, nitro, cyano, $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryl, $C_6$-$C_{20}$ aryloxy, $C_2$-$C_{20}$ heterocyclic, $C_2$-$C_{20}$ heteroaryl, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)$_2$R or —S(=O)R,
- $R^2$ and $R^5$ are each H, bromo (Br), iodo (I), $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryloxy, $C_6$-$C_{20}$ aryl, $C_2$-$C_{20}$ heterocyclic, $C_2$-$C_{20}$ heteroaryl, —C(=O)OR, —C(=O)N(R)$_2$, or —SO$_2$N(R)$_2$,
- $R^6$ is H, $C_1$-$C_{20}$ alkyl, $C_6$-$C_{20}$ aryl, $C_2$-$C_{20}$ heterocyclic, $C_2$-$C_{20}$ heteroaryl, —C(=)R, —C(=O)OR, —C(=O)N(R)$_2$, —SO$_2$N(R)$_2$, or —N(SO$_2$—R)$_2$, —S(=O)R, or —S(=O)$_2$R,
- n is 0 or 1
wherein if n=1, then the element $$Y\text{---}(E)_n$$

shall mean that Y and (E)$_n$ are linked either by a single bond or by a double bond, wherein
  (i) if Y and (E)$_n$ are linked by a single bond, then
    Y is oxygen (O), sulfur (S), N—R or P—R and
    E is CH$_2$ or
  (ii) if Y and (E)$_n$ are linked by a double bond, then
    Y is N or P
    E is CH,
wherein if n=0, then
  Y is oxygen (O), sulfur (S), N—R or P—R and directly linked by a single bond to the phenyl moiety depicted above in formula (A3)
and wherein in all above occurrences in formula (A3)
R is identical or different and shall mean H, $C_1$-$C_{20}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_2$-$C_{24}$-heteroaryl, or if two substituents R are bound to the same atom, such two substituents R may also form a saturated or unsaturated cyclic structure together with the atoms to which they are bound.

To the extent the general, preferred, more preferred or most preferred definitions of the catalyst according to general formal (A3) mentions "$C_2$-$C_{20}$ heterocyclic" and "$C_2$-$C_{20}$ heteroaryl" this shall always imply that the respective heterocyclic ring contains besides the number of carbon atoms such a number hetero atoms that a stable heterocyclic structure is formed: A stable "$C_2$ heteroaryl" would e.g. be an triazolyl moiety comprising two carbon atoms in the ring and three nitrogen atoms.

Definition of $X^1$ and $X^2$ for General Formula (A3)

In the above depicted formula (A3) the moieties listed as meanings for $X^1$ and $X^2$ can also be substituted by one or more further groups, for example by halogen, preferably fluorine, $C_1$-$C_{10}$-alkyl, $C_1$-$C_{10}$-alkoxy or $C_6$-$C_{24}$-aryl, where these groups, too, may once again be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are each halogen, in particular chlorine, CF$_3$COO, CH$_3$COO, CFH$_2$COO, (CH$_3$)$_3$CO, (CF$_3$)$_2$(CH$_3$)CO, (CF$_3$)(CH$_3$)$_2$CO, PhO (phenoxy), MeO (methoxy), EtO (ethoxy), tosylate (p-CH$_3$—C$_6$H$_4$—SO$_3$), mesylate (CH$_3$SO$_3$) or trifluoromethanesulphonate (CF$_3$SO$_3$).

In a preferred embodiment of the present invention complex catalysts having the general structure (A3) are suited for obtaining the novel catalyst compositions wherein
Y is oxygen or sulfur;
X$^1$ and X$^2$ are identical and are each chloro, CF$_3$COO, CH$_3$COO, CFH$_2$COO, (CH$_3$)$_3$CO, (CF$_3$)$_2$(CH$_3$)CO, (CF$_3$)(CH$_3$)$_2$CO, PhO (phenoxy), MeO (methoxy), EtO (ethoxy), tosylate (p-CH$_3$—C$_6$H$_4$—SO$_3$), mesylate (CH$_3$SO$_3$) or trifluoromethanesulphonate (CF$_3$SO$_3$),
R$^3$ —C(=O)R, —C(=O)OR, —OC(=O)R, —C(=O)N(R)$_2$, chloro, fluoro, bromo, —NR—C(=O)—N(R)$_2$, or —SO$_2$N(R)$_2$,
R$^4$ is hydrogen, halogen, nitro, cyano, C$_1$-C$_{14}$ alkyl, C$_1$-C$_{14}$ alkoxy, C$_1$-C$_{14}$ alkylthio, —Si(R)$_3$, —O—Si(R)$_3$, C$_6$-C$_{14}$ aryl, C$_6$-C$_{14}$ aryloxy, C$_2$-C$_{14}$ heterocyclic, C$_2$-C$_{14}$ heteroaryl, —C(=O)R, —C(=O)OR, —C(=O)N(R)$_2$, —NR—C(=O)—N(R)$_2$, —SO$_2$N(R)$_2$, —N(SO$_2$—R)$_2$, —S(=O)R, or —S(=O)$_2$R
R$^2$ and R$^5$ are each hydrogen, bromo (Br), iodo (I), C$_1$-C$_{14}$ alkyl, C$_1$-C$_{14}$ alkoxy, C$_1$-C$_{14}$ alkylthio, —Si(R)$_3$, —O—Si(R)$_3$, C$_6$-C$_{14}$ aryloxy, C$_6$-C$_{14}$ aryl, C$_2$-C$_{14}$ heterocyclic, C$_2$-C$_{14}$ heteroaryl, —C(=O)OR, —C(=O)N(R)$_2$, —NR—C(=O)—N(R)$_2$, —SO$_2$N(R)$_2$, or —N(SO$_2$—R)$_2$,
R$^6$ is H, C$_1$-C$_{14}$ alkyl, C$_1$-C$_{14}$ alkoxy, C$_1$-C$_{14}$ alkylthio, —Si(R)$_3$, —O—Si(R)$_3$, C$_6$-C$_{14}$ aryl, C$_6$-C$_{14}$ aryloxy, C$_2$-C$_{14}$ heterocyclic, C$_2$-C$_{14}$ heteroaryl, —C(=O)OR, —C(=O)N(R)$_2$, —NR—C(=O)—N(R)$_2$, —SO$_2$N(R)$_2$, or —N(SO$_2$—R)$_2$,
n is 0 or 1
E is CH$_2$
wherein if n=1, then Y is linked to E by a single bond,
wherein if n=0, then Y is directly linked to the phenyl moiety depicted in formula (A3) and
wherein in all above occurrences of this preferred embodiment
R is identical or different and shall mean H, C$_1$-C$_8$-alkyl, C$_5$-C$_6$-cycloalkyl, C$_2$-C$_8$-alkenyl, C$_2$-C$_8$-alkynyl, C$_6$-C$_{14}$-aryl, or C$_2$-C$_{14}$-heteroaryl.

In an even more preferred embodiment complex catalysts having the general structure (A3) are suited for obtaining the novel catalyst compositions wherein
Y is oxygen,
X$^1$ and X$^2$ are identical and each chloro or each R'COO with R' being C$_1$-C$_3$ alkyl,
R$^3$ —C(O)R, —C(=O)OR, —OC(=O)R, —C(=O)N(R)$_2$, chloro, fluoro, bromo, —NR—C(=O)—N(R)$_2$, —SO$_2$N(R)$_2$ or —N(SO$_2$—R)$_2$,
R$^2$ and R$^5$ are each hydrogen,
R$^4$ is H, chloro, fluoro, —C(=O)R, —C(=O)OR, —C(=O)N(R)$_2$, —NR—C(=O)—N(R)$_2$, —SO$_2$N(R)$_2$ or —N(SO$_2$—R)$_2$,
R$^6$ is C$_1$-C$_6$ alkyl, particularly isopropyl or isobutyl,
n is 0 or 1
E is CH$_2$
wherein if n=1, then Y is linked to E by a single bond,
wherein if n=0, then Y is directly linked to the phenyl moiety depicted in formula (A3) and
wherein in all above occurrences in formula (A3)
R is identical or different and shall mean H, C$_1$-C$_8$-alkyl, C$_5$-C$_6$-cycloalkyl, C$_2$-C$_8$-alkenyl, C$_2$-C$_8$-alkynyl, phenyl, imidazolyl, triazolyl, or pyridinyl moieties.

In another preferred embodiment of the present invention ruthenium complex catalysts having the general structure (A3) are suited for obtaining the novel catalyst compositions, wherein L can be selected from following structures (IIa), (IIb), (IIc) and (IId),

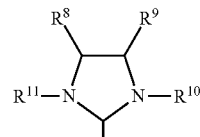

(IIa)

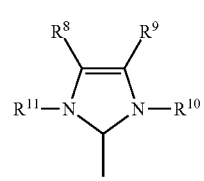

(IIb)

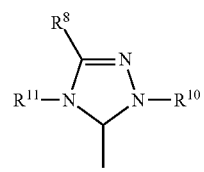

(IIc)

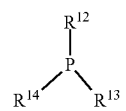

(IId)

wherein
R$^{10}$ and R$^{11}$ are each C$_1$-C$_{20}$ alkyl, C$_6$-C$_{20}$ aryl, C$_7$-C$_{25}$ alkaryl, C$_2$-C$_{20}$ heteroaryl, C$_1$-C$_{20}$ heterocyclic, —C(=O)R, —C(=O)N(R)$_2$, —NR—C(=O)—N(R)$_2$, or —SO$_2$N(R)$_2$
R$^8$ and R$^9$ are each hydrogen, C$_1$-C$_{20}$ alkyl, C$_1$-C$_{20}$ alkoxy, C$_1$-C$_{20}$ alkylthio, —Si(R)$_3$, —O—Si(R)$_3$, C$_6$-C$_{20}$ aryl, C$_6$-C$_{20}$ aryloxy, C$_2$-C$_{20}$ heteroaryl, C$_2$-C$_{20}$ heterocyclic, C(=O)R, —C(=O)N(R)$_2$, —NR—C(=O)—N(R)$_2$, or —SO$_2$N(R)$_2$, —S(=O)R, —S(=O)$_2$R or —O—S(=O)$_2$R, halogen, nitro or cyano group;
R$^{12}$, R$^{13}$ and R$^{14}$ are each C$_1$-C$_{20}$ alkyl, C$_1$-C$_{20}$ alkoxy, C$_6$-C$_{20}$ aryl, C$_6$-C$_{20}$ aryloxy, C$_2$-C$_{20}$ heteroaryl or C$_2$-C$_{20}$ heterocyclic group;
wherein in all above occurrences regarding structures (IIa), (IIb), (IIc) and (IId),
R is identical or different and shall mean H, C$_1$-C$_{20}$-alkyl, C$_3$-C$_{10}$-cycloalkyl, C$_2$-C$_{16}$-alkenyl, C$_2$-C$_{20}$-alkynyl, C$_6$-C$_{24}$-aryl, or C$_6$-C$_{24}$-heteroaryl.

In an even more preferred embodiment complex catalysts having the general structure (A3) are suited for obtaining the novel catalyst compositions, in which the ligand L has the structure (IIa) or (IIb) wherein R$^{10}$ and R$^{11}$ are each an aryl group, more preferably each a substituted phenyl group, most preferably each 2,4,6-trimethylphenyl and R$^8$ and R$^9$ are each hydrogen, respectively.

In another preferred embodiment complex catalysts having the general structure (A3) are suited for obtaining the novel catalyst compositions, in which the ligand L has the structure (IId) wherein R$^{12}$, R$^{13}$ and R$^{14}$ are each cyclohexyl, respectively.

In another preferred embodiment of the present invention ruthenium complex catalysts having the general structure (A3) are suited for obtaining the novel catalyst compositions, wherein $X^1$ and $X^2$ are each chloro;

L has the general structure (IIa) or (IIb) as defined above;

Y is oxygen;

$R^3$ —C(=O)R, —C(=O)OR, —OC(=O)R, —C(=O)N(R)$_2$, chloro, fluoro, bromo, —NR—C(=O)—N(R)$_2$, or —SO$_2$N(R)$_2$, $R^4$ is H, halogen, nitro, cyano, $C_1$-$C_{14}$ alkyl, $C_1$-$C_{14}$ alkoxy, $C_1$-$C_{14}$ alkylthio, —Si(R)$_3$, —O—Si(R)$_3$, $C_6$-$C_{14}$ aryl, $C_6$-$C_{14}$ aryloxy, $C_2$-$C_{14}$ heterocyclic, $C_2$-$C_{14}$ heteroaryl, —C(=O)R, —C(=O)OR, —C(=O)N(R)$_2$, —S(=O)$_2$R, —S(=O)R or —SO$_2$N(R)$_2$, $R^2$ and $R^5$ are each H, bromo (Br), iodo (I), $C_1$-$C_{14}$ alkyl, $C_1$-$C_{14}$ alkoxy, $C_1$-$C_{14}$ alkylthio, —O—Si(R)$_3$, $C_6$-$C_{14}$ aryloxy, $C_6$-$C_{14}$ aryl, $C_2$-$C_{14}$ heterocyclic, $C_2$-$C_{14}$ heteroaryl, —C(=O)OR, —C(=O)N(R)$_2$ or —SO$_2$N(R)$_2$, $R^6$ is H, $C_1$-$C_{14}$ alkyl $C_1$-$C_{14}$ alkoxy, $C_1$-$C_{14}$ alkylthio, —Si(R)$_3$, —O—Si(R)$_3$, $C_6$-$C_{12}$ aryl, $C_6$-$C_{12}$ aryloxy, $C_2$-$C_{12}$ heterocyclic, $C_2$-$C_{12}$ heteroaryl, —C(=O)R, —C(=O)N(R)$_2$, —NR—C(=O)—N(R)$_2$, —SO$_2$N(R)$_2$, or —N(SO$_2$—R)$_2$, wherein in all above occurrences R is identical or different and shall mean H, $C_1$-$C_8$-alkyl, $C_5$-$C_6$-cycloalkyl, $C_2$-$C_8$-alkenyl, $C_2$-$C_8$-alkynyl, phenyl, imidazolyl, triazolyl, or pyridinyl moieties.

In an even more preferred embodiment of the present invention complex catalysts having the general structure (A3) are suited for obtaining the novel catalyst compositions, wherein $X^1$ and $X^2$ are each chloro, L has the general structure (IIa) or (IIb), Y is oxygen, $R^3$ chloro, fluoro, —C(=O)R, —C(=O)OR, —C(=O)N(R)$_2$, or —SO$_2$N(R)$_2$, $R^4$ is H, chloro, fluoro, —C(=O)R, —C(=O)OR, —OC(=O)R, —C(=O)N(R)$_2$, or —SO$_2$N(R)$_2$, $R^2$ and $R^5$ are each hydrogen, $R^6$ is $C_1$-$C_6$ alkyl, particularly isopropyl or isobutyl, wherein in all above occurrences R is identical or different and shall mean H, $C_1$-$C_6$-alkyl, $C_5$-$C_6$-cycloalkyl, $C_2$-$C_6$-alkenyl, $C_2$-$C_6$-alkynyl, phenyl, imidazolyl, triazolyl, or pyridinyl moieties.

In a particularly preferred embodiment of the present invention a catalyst is used for the preparation of the novel catalyst compositions which is chosen from the following structures:

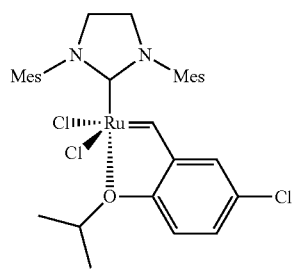

-continued

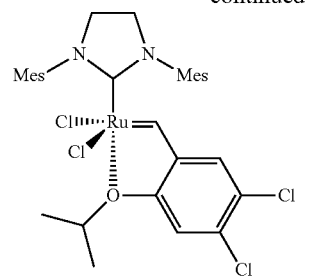

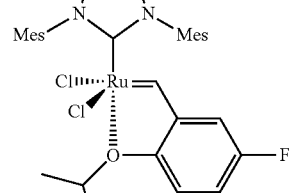

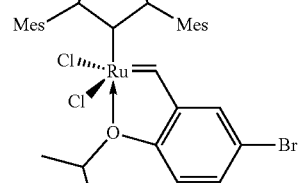

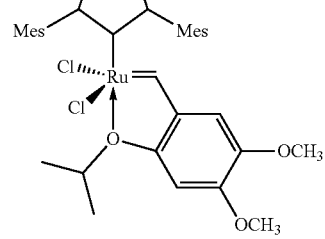

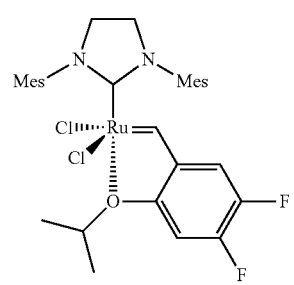

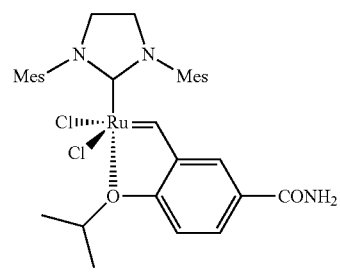

37
-continued
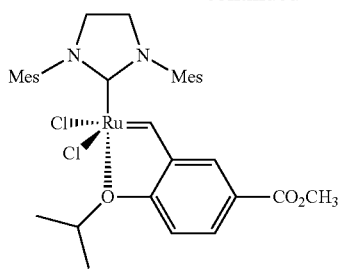
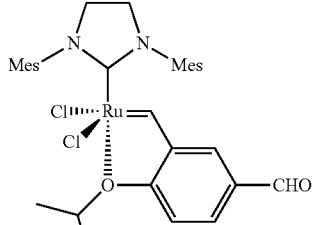
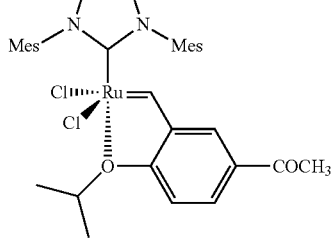
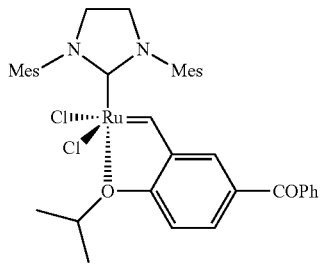
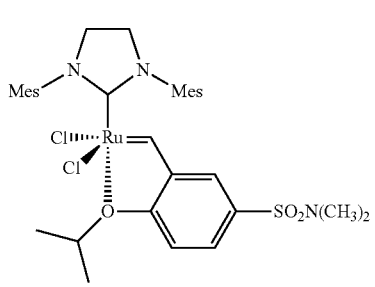
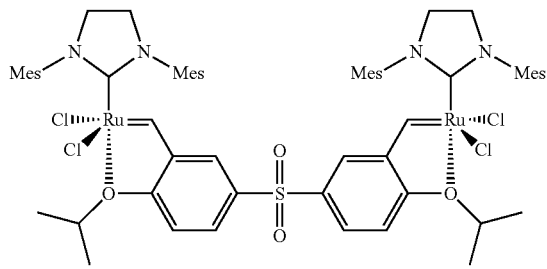
38
-continued
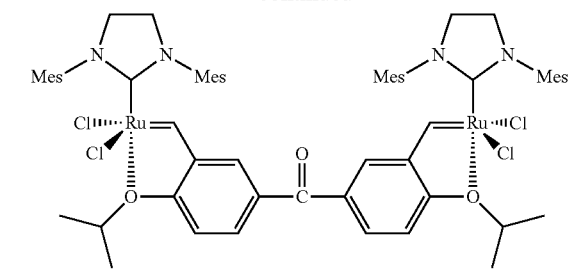
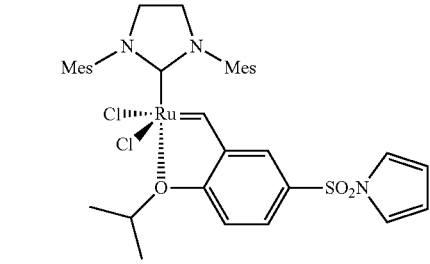
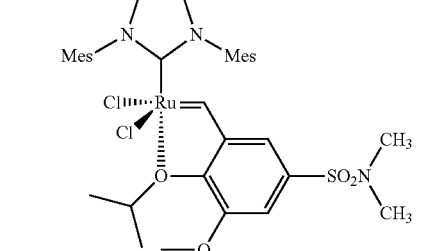
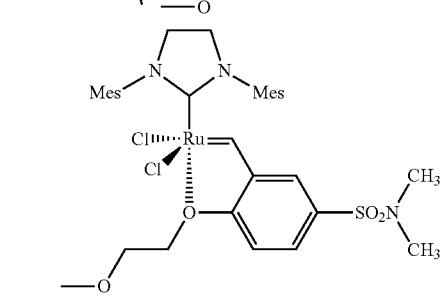
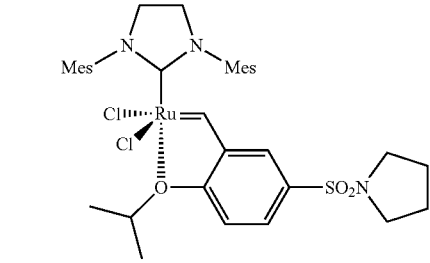
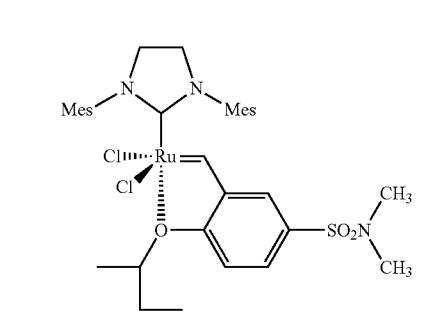

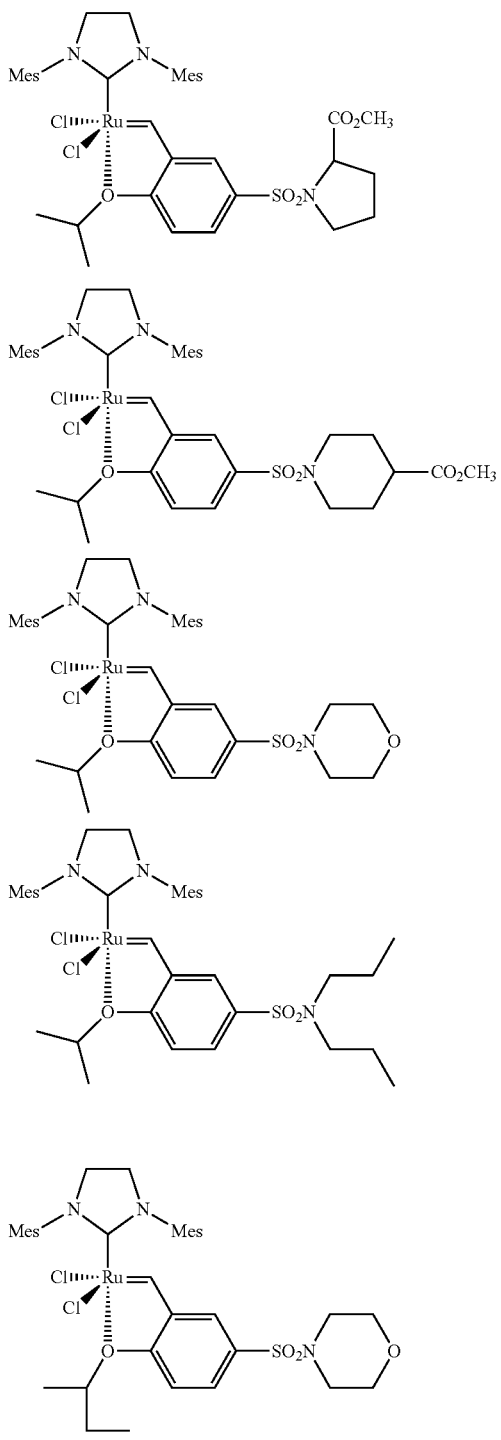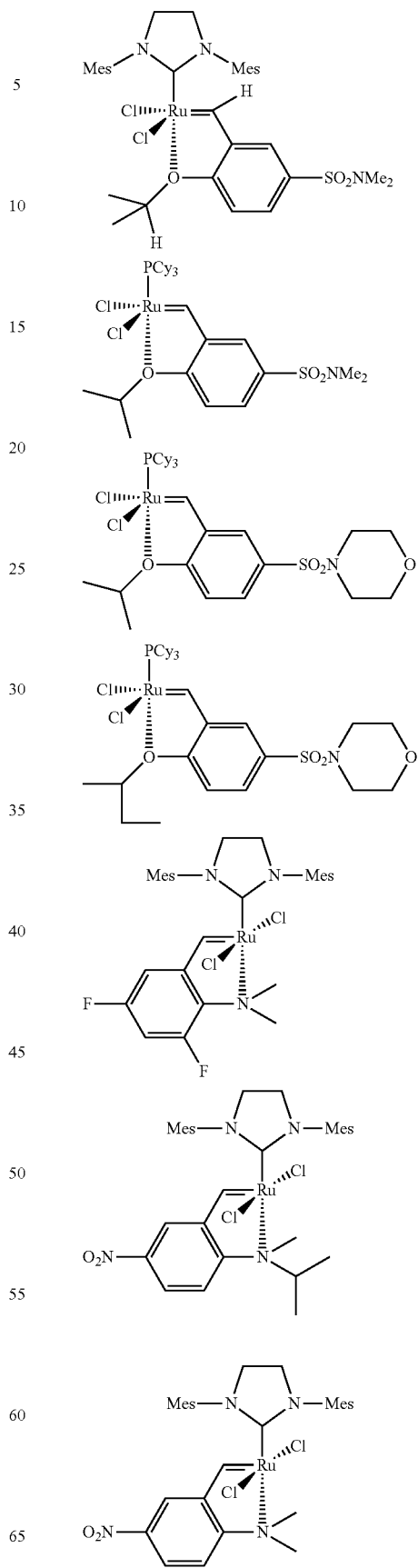

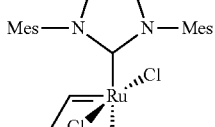
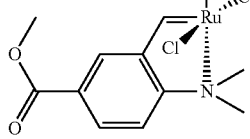

The above described catalysts of general formula (A3) with its preferred, more preferred, particularly preferred and most preferred embodiments may be prepared in accordance with the preparation methods described in EP-A-1 905 777.

In one embodiment of the present invention catalysts of general formula (A4) can be used coming under general formula (I) with n being 1.

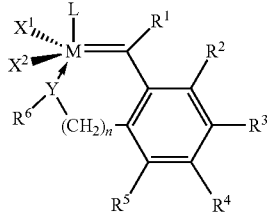
(A4)

wherein M, L, Y, $X^1$, $X^2$, $R^1$, $R^2$, $R^3$, $R^4$, $R^5$, $R^6$ and n have all general, preferred, more preferred and particularly preferred meanings as given for general formula (A).

General formula (A4) therefore covers catalysts according to general formula (A4-1) (with n=0) and (A4-2) (with n=1) which can both be used for preparing the catalyst compositions of the present invention

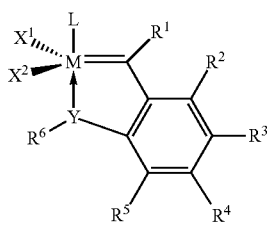
(A4-1)

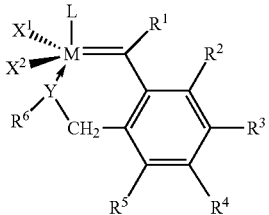
(A4-2)

wherein M, L, Y, $X^1$, $X^2$, $R^1$, $R^2$, $R^3$, $R^4$, $R^5$, and $R^6$ have all general, preferred, more preferred and particularly preferred meanings as given for general formula (A).

In preferred catalysts to be used for preparing the catalyst compositions according to the invention M is Ruthenium and Y is oxygen or NH with L, $X^1$, $X^2$, $R^1$, $R^2$, $R^3$, $R^4$, $R^5$, $R^6$ and n having all general, preferred, more preferred and particularly preferred meanings as given for general formula (A).

Suitable catalysts falling under general formula (A4) and in particular under general formula (A4-2) have the following structures:

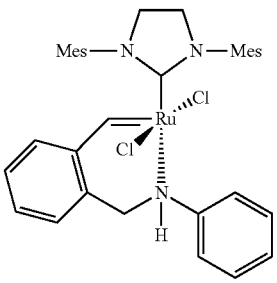

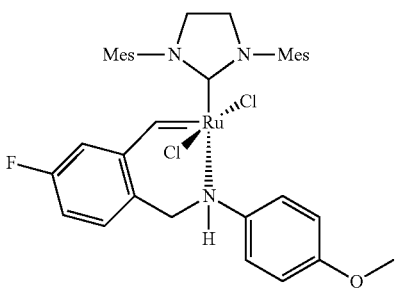

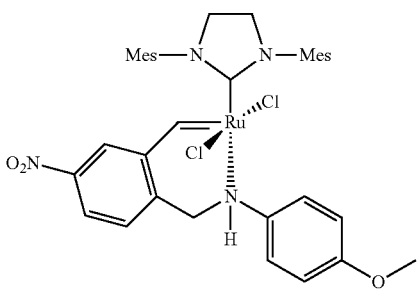

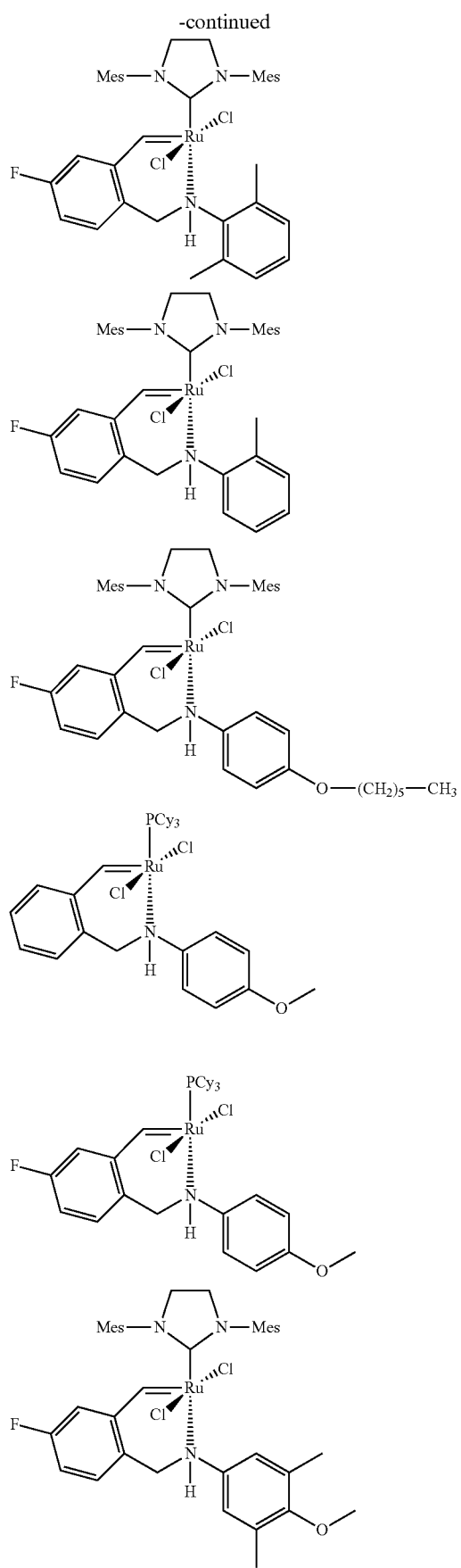
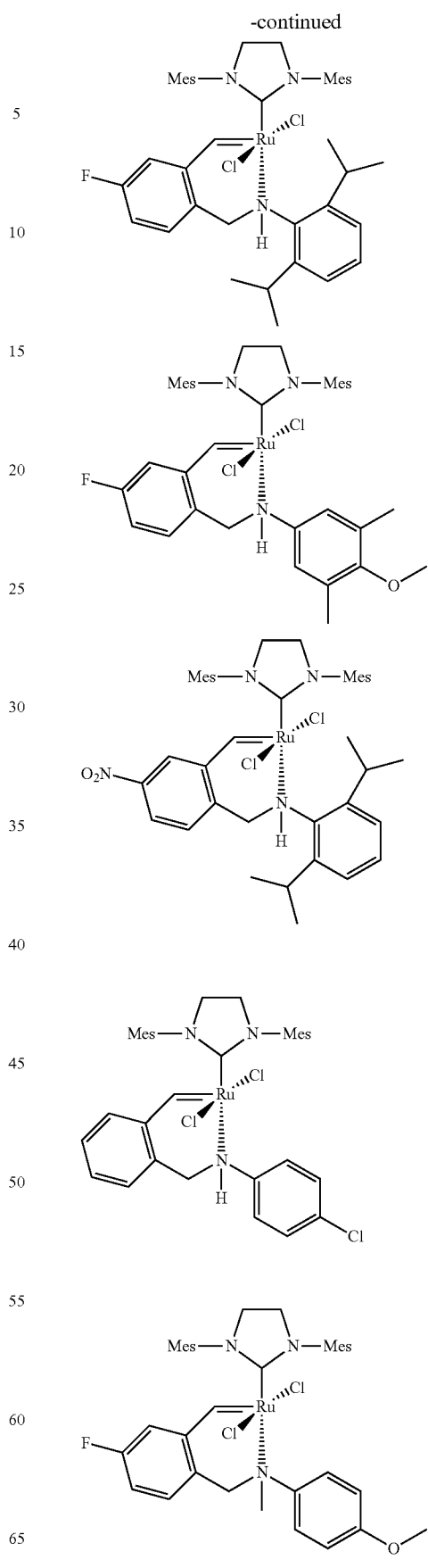

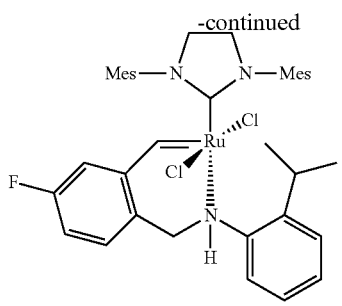

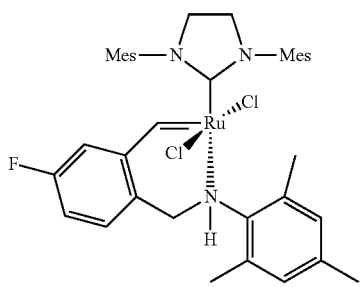

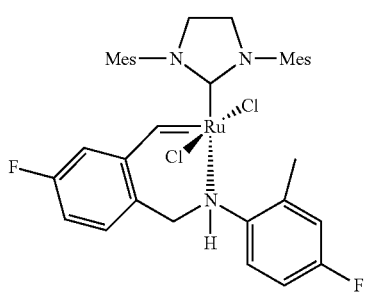

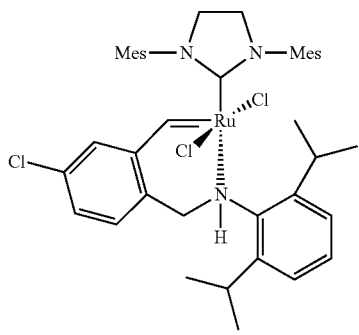

In a specific embodiment of the present invention catalysts of general formula (A4) may be used wherein $R^6$ means either an aryl group, preferably phenyl group substituted in 2-position with $C_1$-$C_{10}$-alkoxy or —N(R)$_2$, with R being identical or different and representing hydrogen or straight chain or branched $C_1$-$C_6$ alkyl and wherein M, L, Y, $X^1$, $X^2$, $R^1$, $R^2$, $R^3$, $R^4$, and $R^5$ have the same meanings as given for general formula (A4).

In such specific embodiment the substituent $R^6$ may then coordinate to the metal of the complex catalyst via the oxygen in the alkoxy group, or the nitrogen in the N(R)$_2$ substituent. Hence, such specific catalysts then have the general formula (A5)

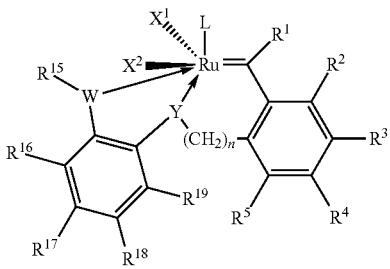

wherein
  Y is oxygen (O) or —NR with R representing hydrogen, alkyl, cycloalkyl, alkenyl, alkynyl, aryl or heteroaryl,
  W is oxygen (O) or NR$^7$ with R$^7$ being hydrogen or straight chain or branched $C_1$-$C_{10}$ alkyl,
  $R^{15}$ represents straight chain or branched alkyl,
  $R^{16}$, $R^{17}$, $R^{18}$ and $R^{19}$ are identical or different and represent hydrogen, halogen, alkyl, cycloalkyl, alkoxy, alkenyl, alkynyl, aryl or heteroaryl, and
  L, $R^1$, $R^2$, $R^3$, $R^4$, $R^5$ shall have the general, preferred and more preferred meanings given for general formula A.

General formula (A5) covers catalysts according to general formula (A5-1) (with n=0) and (A5-2) (with n=1) which can both be used for preparing the catalyst compositions of the present invention,

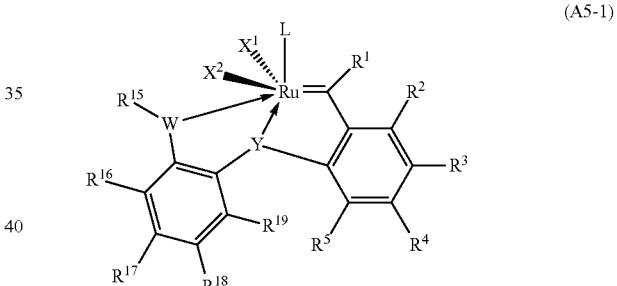

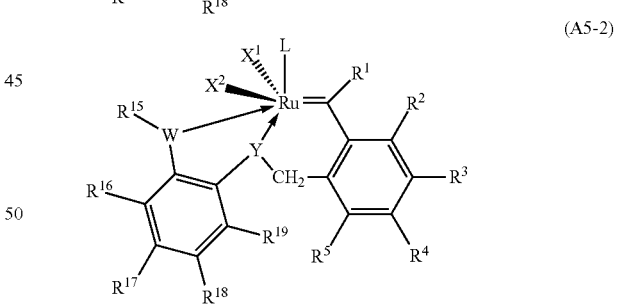

wherein L, Y, $X^1$, $X^2$, $R^1$, $R^2$, $R^3$, $R^4$, $R^5$, $R^{15}$, $R^{16}$, $R^{17}$, $R^{18}$ and $R^{19}$ have the same meanings as given for general formula (A5).

In preferred catalysts of general formula (A5) to be used for preparing the catalyst compositions according to the invention Y is oxygen (O) or —NR with R representing hydrogen, $C_1$-$C_{10}$ alkyl, $C_5$-$C_8$ cycloalkyl, $C_2$-$C_{20}$ alkenyl, $C_2$-$C_{20}$ alkynyl, $C_6$-$C_{24}$ aryl or $C_2$-$C_{20}$ heteroaryl, W is oxygen (O) or —NR$^7$ with R$^7$ being hydrogen or straight chain or branched $C_1$-$C_4$ alkyl, $R^{15}$ represents straight chain or branched $C_1$-$C_{10}$ alkyl $R^{16}$, $R^{17}$, $R^{18}$ and $R^{19}$ are identical or different and represent hydrogen, halogen, straight chain or branched $C_1$-$C_{10}$ alkyl, $C_5$-$C_8$ cycloalkyl, straight chain or branched $C_1$-$C_{10}$ alkoxy, $C_2$-$C_{20}$ alkenyl, $C_2$-$C_{20}$ alkynyl, $C_6$-$C_{24}$ aryl or $C_2$-$C_{20}$ heteroaryl, L, $R^1$, $R^2$, $R^3$, $R^4$, $R^5$ shall have the general, preferred and more preferred meanings given for general formula A, and n being 0 or 1.

More preferably catalysts of general formula (A5) can be used wherein

Y is oxygen (O) or —NR with R representing hydrogen or $C_1$-$C_4$ alkyl,

W is oxygen (O) or —$NR^7$ with $R^7$ being hydrogen or straight chain or branched $C_1$-$C_4$ alkyl, $R^{15}$ represents straight chain or branched $C_1$-$C_4$ alkyl, $R^{16}$, $R^{17}$, $R^{18}$ and $R^{19}$ are identical or different and represent hydrogen, chloro, straight chain or branched $C_1$-$C_{10}$ alkyl, or straight chain or branched $C_1$-$C_{10}$ alkoxy and n being 0 or 1.

Suitable catalysts falling under general formula (A5) have the following structures

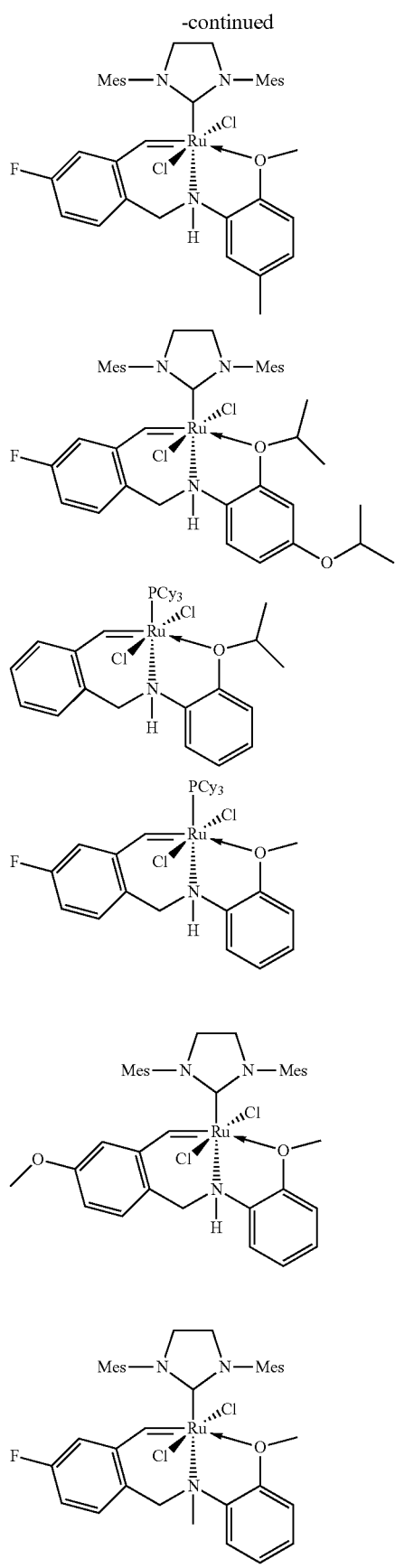

-continued
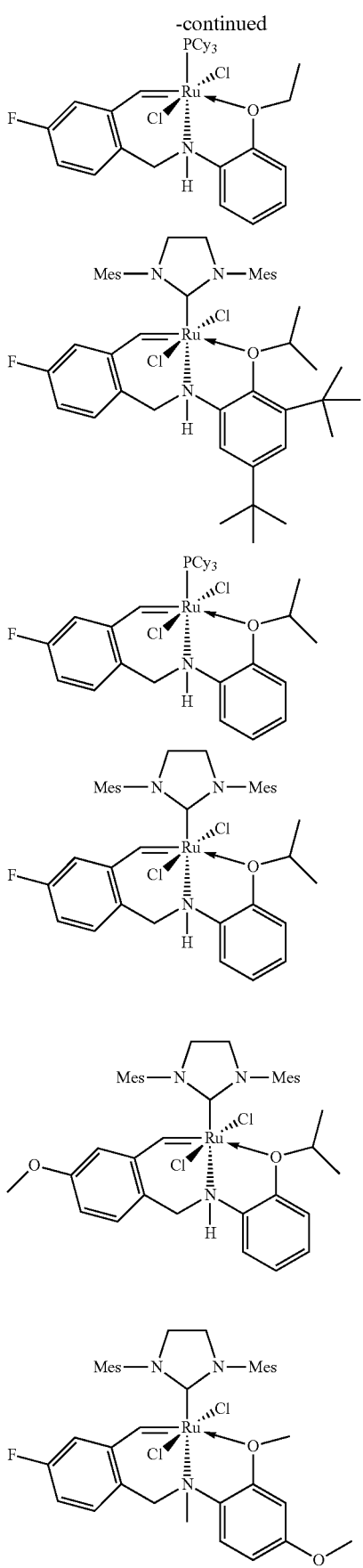
-continued
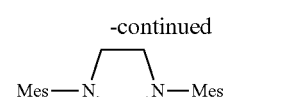
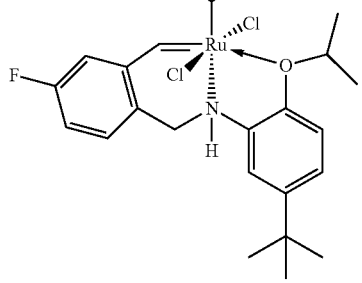
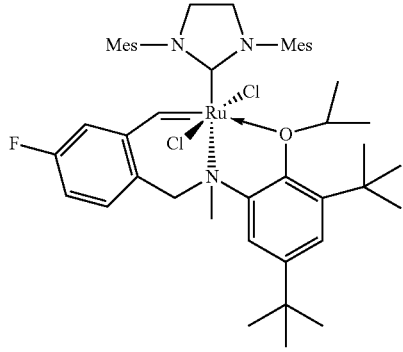
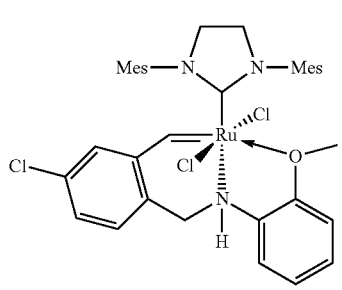
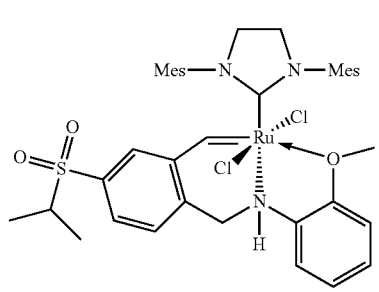
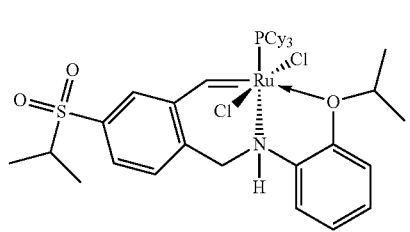

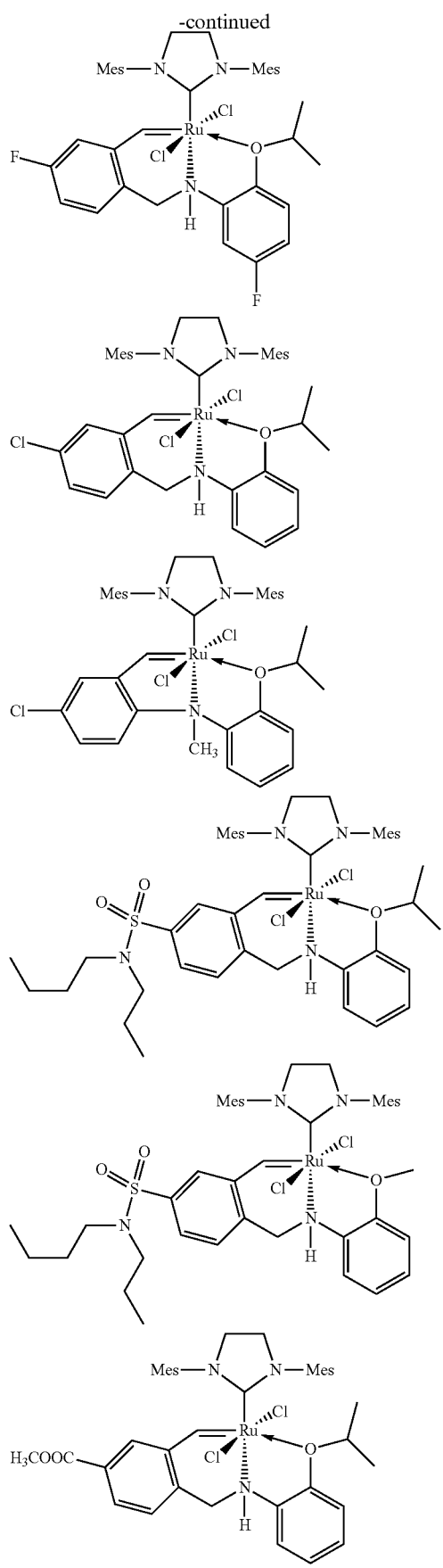
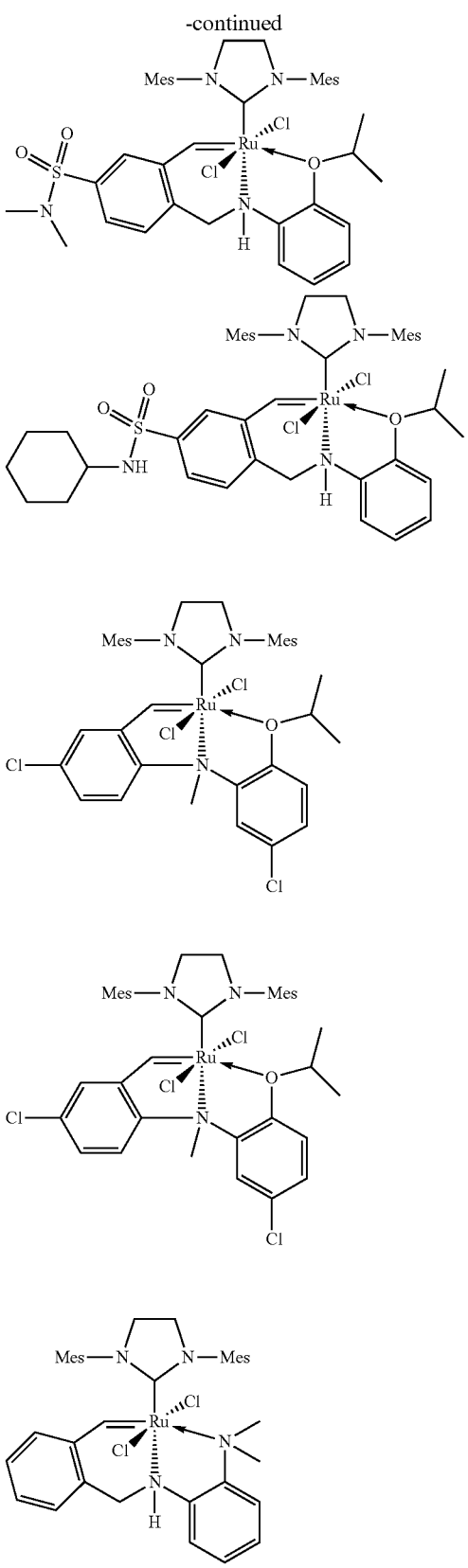
A further alternative embodiment provides a catalyst system according to the invention obtainable by using a catalyst of the general formula (A6)

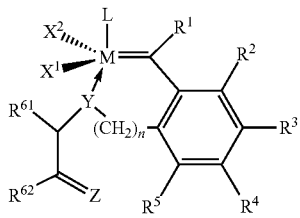

(A6)

where
- M is ruthenium or osmium, preferably ruthenium,
- Z is oxygen (O) or sulfur (S),
- Y is oxygen (O), sulfur (S), N—$R^7$ or P—$R^7$, where $R^7$ has the meanings indicated below,
- $X^1$ and $X^2$ are identical or different ligands,
- $R^1$ is H, alkyl, alkenyl, alkynyl or aryl,
- $R^2$, $R^3$, $R^4$ and $R^5$ are identical or different and are each hydrogen, organic or inorganic substituents,
- $R^{61}$ is H, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, halogen, alkoxy, aryl or heteroaryl substituents,
- $R^{62}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, halogen, alkoxy, aryl or heteroaryl substituents,
- or where in the alternative $R^{61}$ and $R^{62}$ may form a cyclic structure together with the two adjacent carbon atoms to which they are bound,
- L is a ligand, and
- $R^7$ is alkyl, cycloalkyl, alkenyl, alkynyl, alkoxy, alkenyloxy, alkynyloxy, aryloxy, alkoxycarbonyl, alkylamino, alkylthio, arylthio, alkylsulphonyl or alkylsulphinyl which may each be optionally substituted by one or more alkyl, halogen, alkoxy, aryl or heteroaryl substituents, and
- n is 0 or 1.

The catalysts of the general formula (A6) are known in principle. Representatives of this class of compounds are the catalysts described by Arlt et al. in WO-A1-2008/034552 and by Zhan in WO-A-2011/079799. The catalysts are commercially available or can be prepared as described in the references cited.

General formula (A6) covers catalysts according to general formula (A6-1) (with n=0) and (A6-2) (with n=1) which can both be used for preparing the catalyst compositions of the present invention,

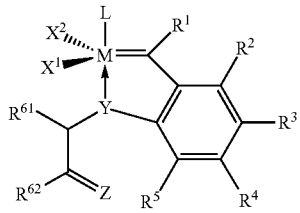

(A6-1)

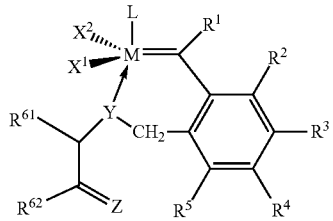

(A6-2)

wherein L, M, $X^1$, $X^2$, $R^1$, $R^2$, $R^3$, $R^4$, $R^5$, Y, $R^{61}$ and $R^{62}$ have the same meanings as given for general formula (A6).

In the catalysts of the general formula (A6) as well as (A6-1) and (A6-2) L is a ligand, usually a ligand having an electron donor function. L can have all meanings as described above relating to general formula (A). It can in particular represent a $P(X^3)_3$ ligand, where $X^3$ are each, independently of one another, $C_1$-$C_6$-alkyl, $C_3$-$C_8$-cycloalkyl or aryl or L is a substituted or unsubstituted imidazoline or imidazolidine ligand as defined in general formulae (IIa), (IIb), and (IIIa) to (IIIn) further above with regard to the catalyst of the general formula (A).

Alkyl in general formulae (A6) as well as (A6-1) and (A6-2) preferably means $C_1$-$C_6$-Alkyl which is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl or n-hexyl.

Cycloalkyl in general formulae (A6) as well as (A6-1) and (A6-2) preferably means $C_3$-$C_8$-Cycloalkyl which encompasses cyclopropyl, cyclobutyl, cyclopentyl, cyclohexyl, cycloheptyl and cyclooctyl.

Aryl in general formulae (A6) as well as (A6-1) and (A6-2) encompasses an aromatic radical having from 6 to 24 skeletal carbon atoms. Preferred monocyclic, bicyclic or tricyclic carbocyclic aromatic radicals having from 6 to 10 skeletal carbon atoms are, for example, phenyl, biphenyl, naphthyl, phenanthrenyl and anthracenyl.

In the catalysts of the general formula (A6) as well as (A6-1) and (A6-2) $X^1$ and $X^2$ are identical or different ligands and can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl.

In the catalysts of the general formula (A6) as well as (A6-1) and (A6-2) the abovementioned ligands $X^1$ and $X^2$ can also be substituted by one or more further substituents, e.g. by halogen, preferably fluorine, $C_1$-$C_{10}$-alkyl, $C_1$-$C_{10}$-alkoxy or $C_6$-$C_{24}$-aryl, where these substituents may optionally also in turn be substituted by one or more substituents selected from the group consisting of halogen, preferably fluorine, $C_1$-$C_5$-alkyl, $C_1$-$C_5$-alkoxy and phenyl.

In a preferred embodiment of catalyst (A6) as well as (A6-1) and (A6-2) $X^1$ and $X^2$ are identical or different and are each halogen, in particular fluorine, chlorine or bromine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment of catalyst (A6) as well as (A6-1) and (A6-2) $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-CH$_3$—C$_6$H$_4$—SO$_3$), mesylate (2,4,6-trimethylphenyl) or CF$_3$SO$_3$ (trifluoromethanesulphonate).

In the catalysts of general formula (A6) as well as (A6-1) and (A6-2) R$^{61}$ and R$^{62}$ are identical or different and represent alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, halogen, alkoxy, aryl or heteroaryl substituents, however, R$^{61}$ may also represent hydrogen in the alternative.

In the preferred catalyst of general formula (A6) R$^{61}$ and R$^{62}$ are identical or different and preferably represent C$_1$-C$_{30}$-alkyl, C$_3$-C$_{20}$-cycloalkyl, C$_2$-C$_{20}$-alkenyl, C$_2$-C$_{20}$-alkynyl, C$_6$-C$_{24}$-aryl, C$_1$-C$_{20}$-alkoxy, C$_2$-C$_{20}$-alkenyloxy, C$_2$-C$_{20}$-alkynyloxy, C$_6$-C$_{24}$-aryloxy, C$_2$-C$_{20}$-alkoxycarbonyl, C$_1$-C$_{20}$-alkylamino, C$_1$-C$_{20}$-alkylthio, C$_6$-C$_{24}$-arylthio, C$_1$-C$_{20}$-alkylsulfonyl or C$_1$-C$_{20}$-alkylsulfinyl, each of which may optionally be substituted by one or more alkyl, alkoxy, aryl or heteroaryl substituents, however, R$^{61}$ may also represent hydrogen in the alternative, or wherein or where in the alternative R$^{61}$ and R$^{62}$ may form a cyclic structure together with the two adjacent carbon atoms to which they are bound.

More preferably R$^{61}$ is hydrogen and R$^{62}$ is C$_3$-C$_{20}$-cycloalkyl, C$_6$-C$_{24}$-aryl or straight-chain or branched C$_1$-C$_{12}$-alkyl, with the latter optionally being able to be interrupted by one or more double or triple bonds or one or more heteroatoms, preferably oxygen or nitrogen, or where in the alternative R$^{61}$ and R$^{62}$ may form a cyclic structure together with the two adjacent carbon atoms to which they are bound. In such preferred definition C$_3$-C$_{20}$-cycloalkyl then encompasses, for example, cyclopropyl, cyclobutyl, cyclopentyl, cyclohexyl, cycloheptyl and cyclooctyl, C$_1$-C$_{12}$-alkyl can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl and C$_6$-C$_{24}$-aryl radical is an aromatic radical having from 6 to 24 skeletal carbon atoms, more preferably a monocyclic, bicyclic or tricyclic carbocyclic aromatic radical having from 6 to 10 skeletal carbon atoms, most preferably phenyl, biphenyl, naphthyl, phenanthrenyl or anthracenyl.

In the general formula (A6) R$^1$ is hydrogen or an alkyl, alkenyl, alkynyl or aryl radical. R$^1$ is preferably hydrogen or a C$_1$-C$_{30}$-alkyl radical, a C$_2$-C$_{20}$-alkenyl radical, a C$_2$-C$_{20}$-alkynyl radical or a C$_6$-C$_{24}$-aryl radical. R$^1$ is particularly preferably hydrogen.

In the catalyst of general formula (A6) R$^2$, R$^3$, R$^4$ and R$^5$ are identical or different and can be H, organic or inorganic substituents. In a preferred embodiment, R$^2$, R$^3$, R$^4$, R$^5$ are identical or different and are each H, halogen, nitro, CF$_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, alkoxy, halogen, aryl or heteroaryl substituents. More preferably R$^2$, R$^3$, R$^4$, R$^5$ are identical or different and are H, halogen, preferably chlorine or bromine, nitro, CF$_3$, C$_1$-C$_{30}$-alkyl, C$_3$-C$_{20}$-cycloalkyl, C$_2$-C$_{20}$-alkenyl, C$_2$-C$_{20}$-alkynyl, C$_6$-C$_{24}$-aryl, C$_1$-C$_{20}$-alkoxy, C$_2$-C$_{20}$-alkenyloxy, C$_2$-C$_{20}$-alkynyloxy, C$_6$-C$_{24}$-aryloxy, C$_2$-C$_{20}$-alkoxycarbonyl, C$_1$-C$_{20}$-alkylamino, C$_1$-C$_{20}$-alkylthio, C$_6$-C$_{24}$-arylthio, C$_1$-C$_{20}$-alkylsulphonyl or C$_1$-C$_{20}$-alkylsulphinyl, each of which may optionally be substituted by one or more C$_1$-C$_{30}$-alkyl, C$_1$-C$_{20}$-alkoxy, halogen, C$_6$-C$_{24}$-aryl or heteroaryl substituents. In a particularly preferred embodiment, R$^2$, R$^3$, R$^4$, R$^5$ are identical or different and are each nitro, a straight-chain or branched C$_1$-C$_{12}$-alkyl or C$_6$-C$_{20}$-cycloalkyl radical, a straight-chain or branched C$_1$-C$_{20}$-alkoxy radical or a C$_6$-C$_{24}$-aryl radical, most preferably phenyl or naphthyl. The C$_1$-C$_{12}$-alkyl and C$_1$-C$_{20}$-alkoxy groups may optionally be interrupted by one or more double or triple bonds or one or more heteroatoms, preferably oxygen or nitrogen.

Furthermore, two or more of R$^2$, R$^3$, R$^4$ or R$^5$ can be bridged via aliphatic or aromatic structures. For example, R$^3$ and R$^4$ can, with inclusion of the carbon atoms to which they are bound, in the phenyl ring of the formula (Q), form a fused-on phenyl ring so that overall a naphthyl structure results.

Particular preference is given to catalysts of the general formula (A6) in which M is ruthenium, Y is oxygen (O), Z is oxygen (O), X$^1$ and X$^2$ are both halogen, in particular, both chlorine, R$^1$ is hydrogen, R$^2$, R$^3$, R$^4$, R$^5$ have the general, preferred and more preferred meanings given for the general formula (A6), R$^{61}$, R$^{61}$ have the general, preferred and more preferred meanings given for the general formula (A6) and L has the general, preferred and more preferred meanings given for the general formula (A6).

Very particular preference is given to catalysts of the general formula (A6) in which M is ruthenium, Y is oxygen (O), Z is oxygen (O), X$^1$ and X$^2$ are both chlorine, R$^1$ is hydrogen, R$^2$, R$^3$, R$^4$, R$^5$ are all hydrogen, R$^{61}$ is methyl, R$^{62}$ is methyl and L is a substituted or unsubstituted imidazoline or imidazolidine ligand of general formulae (IIa), (IIb), (IIIa) to (IIIu) as defined for general formula (A)

A very particularly preferred catalyst which comes under the general structural formula (A6) has the following structure and is also referred to as "Arlt catalyst".

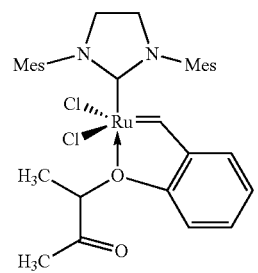

Further suitable catalysts which come under the general formula (A6) have the formulae depicted below where Mes is in each case a 2,4,6-trimethylphenyl. Even in case this is not shown in the below formulae the doable bonded oxygen may also coordinate (back-bite) to the central metal of the complex catalyst

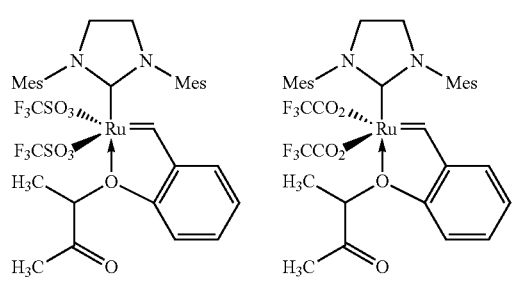
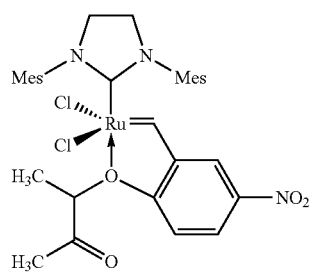
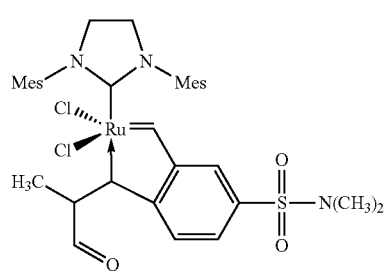
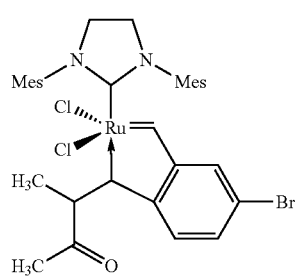
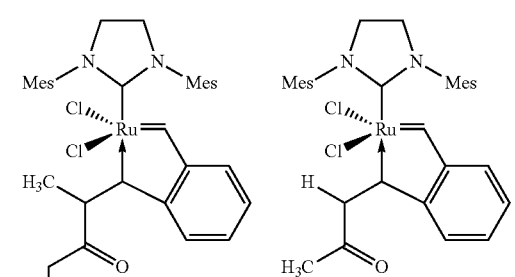
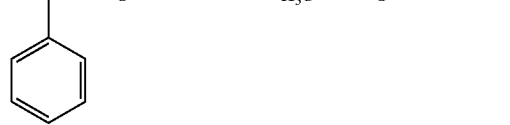
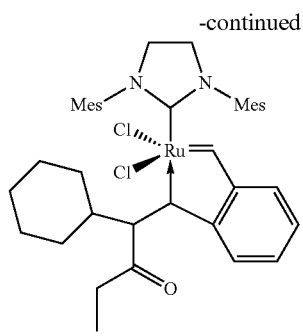
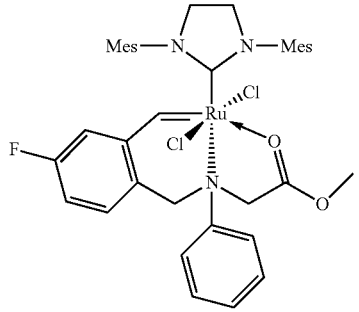
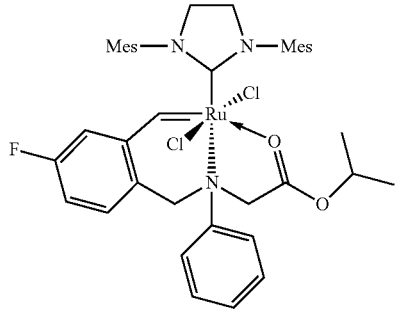
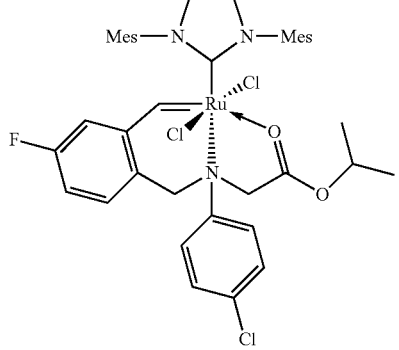
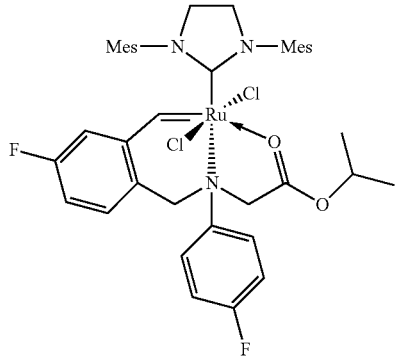

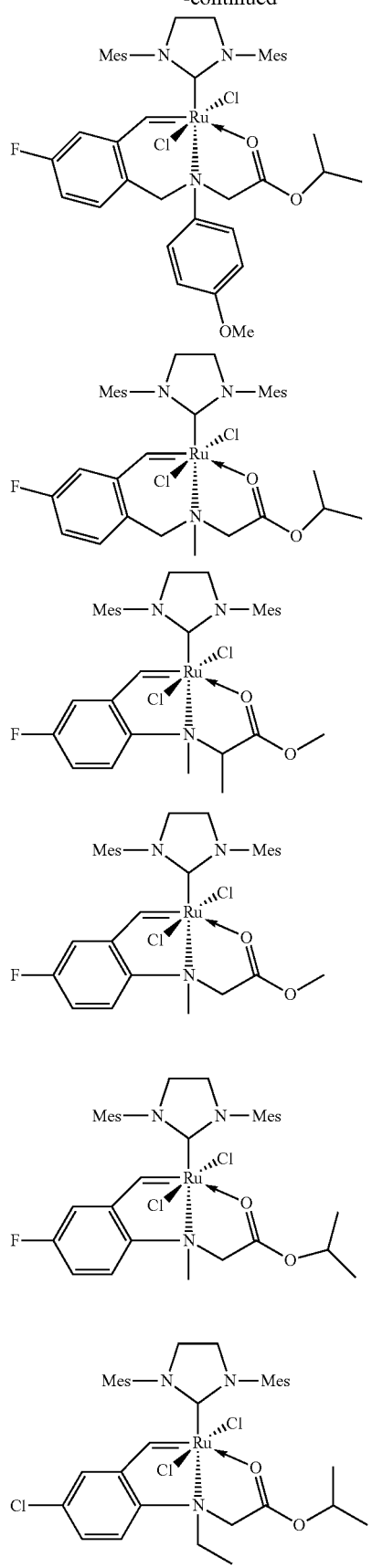

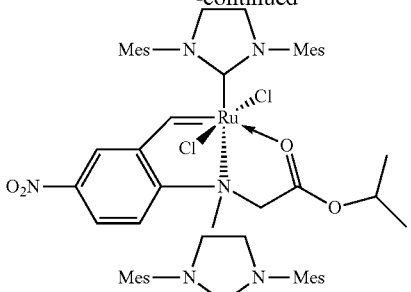
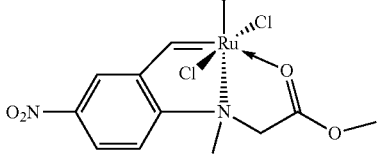
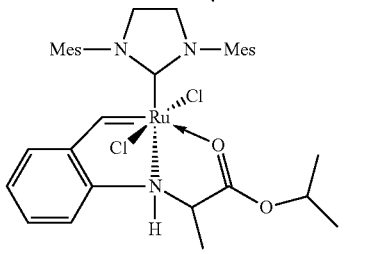
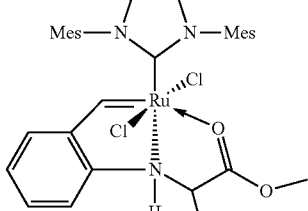
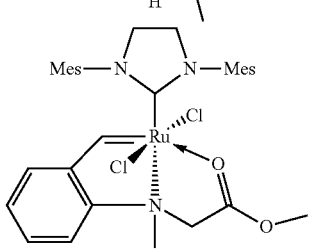

In a further embodiment catalysts of general formula (A7) can be used to prepare the novel catalyst compositions

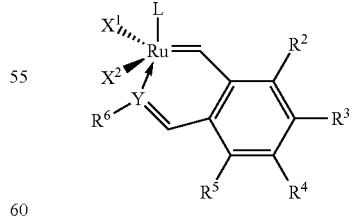

(A7)

wherein
- $X^1$ and $X^2$ are identical or different and shall mean hydrogen, halogen, pseudohalogen, straight-chain or branched $C_1$-$C_{30}$-alkyl, $C_6$-$C_{24}$-aryl, $C_1$-$C_{30}$-alkoxy, $C_6$-$C_{24}$-aryloxy, $C_3$-$C_{20}$-alkyldiketonate $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl, L is an electron donating ligand, which can be linked or not linked with $X^1$ to form a cyclic structure, Y is NR or PR, preferably NR, $R^3$ is chloro, fluoro, bromo, —C(=O)R, —C(=O)OR, —OC(=O)R, —C(=O)N(R)$_2$, —C(=S)R, —C(=S)SR, —C(=S)OR, —C(=S)N(R)$_2$, —S(=O)$_2$N(R)$_2$, —S(=O)$_2$R, or —S(=O)R, $R^4$ is H, halogen, nitro, cyano, $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryl, $C_6$-$C_{20}$ aryloxy, $C_2$-$C_{20}$ heterocyclic, $C_2$-$C_{20}$ heteroaryl, —C(=O)R, —C(=O)OR, —C(=O)N(R)$_2$, —C(=S)R, —C(=S)SR, —C(=S)OR, —C(=S)N(R)$_3$, —S(=O)$_2$N(R)$_2$, —S(=O)$_2$R or —S(=O)R, $R^2$ and $R^5$ are each H, bromo (Br), iodo (I), $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryloxy, $C_6$-$C_{20}$ aryl, $C_2$-$C_{20}$ heterocyclic, $C_2$-$C_{20}$ heteroaryl, —C(=O)OR, —C(=O)N(R)$_2$, or —SO$_2$N(R)$_2$, $R^6$ is H, $C_1$-$C_{20}$ alkyl, $C_6$-$C_{20}$ aryl, $C_2$-$C_{20}$ heterocyclic, $C_2$-$C_{20}$ heteroaryl, —C(=O)R, —C(=O)OR, —C(=O)N(R)$_2$, —SO$_2$N(R)$_2$, —N(SO$_2$—R)$_2$, —S(=O)R, or —S(=O)$_2$R, and wherein in all above occurrences in formula (A7) R is identical or different and shall mean H, $C_1$-$C_{20}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_2$-$C_{24}$-heteroaryl, or if two substituents R are bound to the same atom, such two substituents R may also form a saturated or unsaturated cyclic structure together with the atoms to which they are bound.

The following catalysts fall under general formula (A7) and can be used to prepare the novel catalyst compositions:

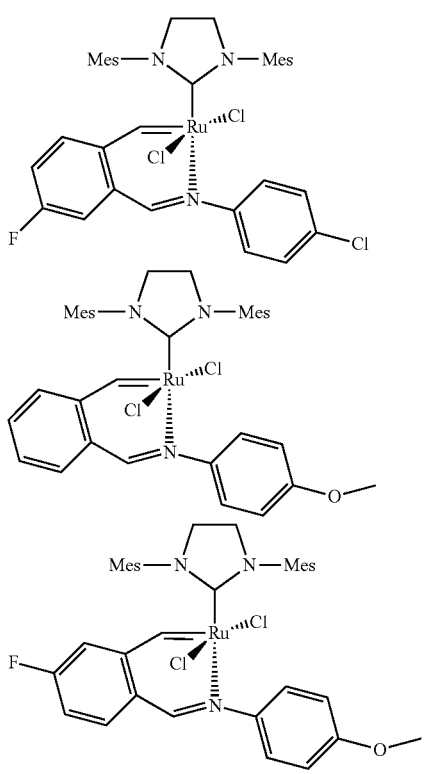

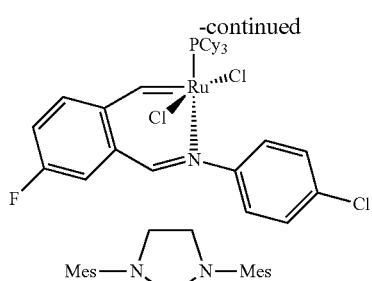

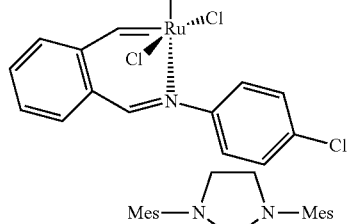

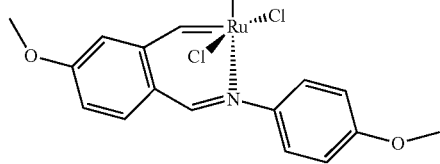

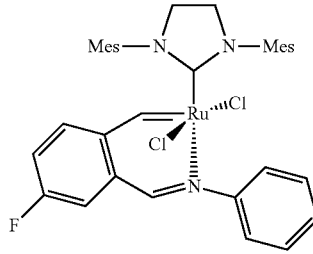

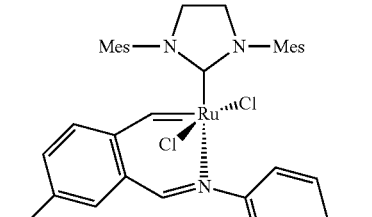

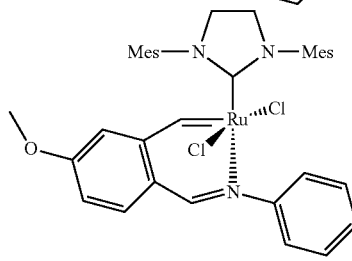

In a further alternative embodiment all catalysts according to general formula (A) can be used in immobilized form. The immobilization favourably occurs via a chemical bond of the complex catalyst to the surface of a support material. Suited are e.g. complex catalysts having the general formulae (support-1), (support-2), (support-3), or (support-4) as depicted below, wherein M, Y, L, $X^1$, $X^2$, $R^1$, $R^2$, $R^3$, $R^4$, $R^5$, $R^6$, n and E may have all general, preferred, more preferred, particularly preferred and most preferred meanings listed above in this application for general formula (A) and wherein "supp" stands for the support material. Preferably the support material represents a macromolecular material, or silica gels. As macromolecular material synthetic polymers or resins may be used, with polyethylene glycol, polystyrenes or cross-linked polystyrenes (e.g. poly(styrene-divinylbenzene) copolymers (PS-DVB)) being even more preferred. Such support material comprises functional groups on its surface which are able to form covalent bonds to one of the ligands or substituents of the complex catalyst, like e.g. to the ligand L or $X^1$ or to the substituents $R^3$ or $R^4$ as shown in the below depicted formulae.

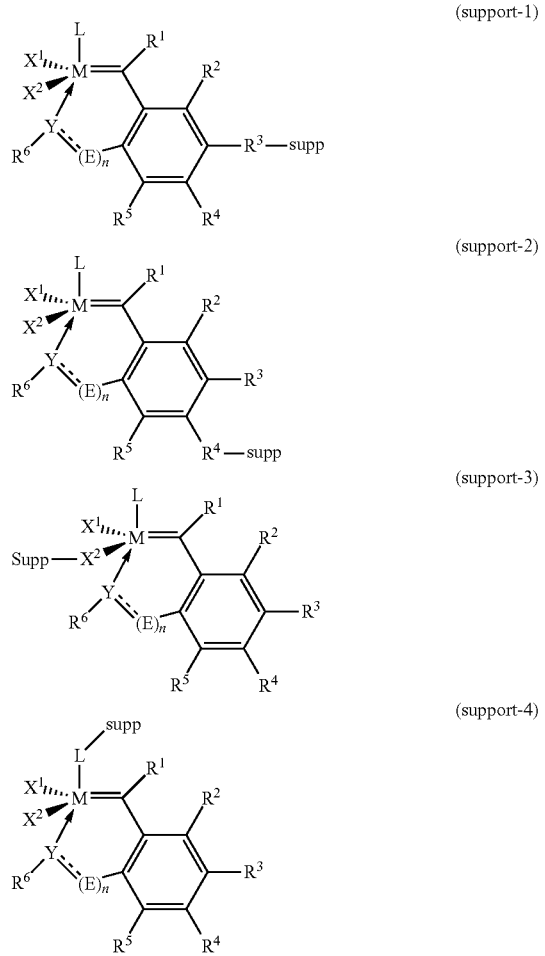

In analogy the preferred catalysts of general formulae (A1), (A2), (A3), (A4), (A5), (A6) and (A7) can also be used in immobilized form, too.

In the immobilized catalysts of general formulae formulae (support-1), (support-2), (support-3) or (support-4) "supp" stands more preferably for a polymeric support, a resin, polyethyleneglycole, or silica gels having one or more functional groups "$X^3$" on their surface which are able to form a covalent bond to one of the ligands, like e.g. the L, R or $X^1$ as shown in the above formulae.

Suitable functional groups "$X^3$" on the surface are hydroxyl, amino, thiol, carboxyl, $C_1$-$C_{20}$ alkoxy, $C_1$-$C_{20}$ alkylthio, —Si(R)$_3$, —O—Si(R)$_3$, $C_6$-$C_{14}$ aryloxy, $C_2$-$C_{14}$ heterocyclic, —C(=O)R, —C(=O)OR, —C(=O)N(R)$_2$, —SO$_2$N(R)$_2$, —S(=O)$_2$R, or —S(=O)R wherein in all above occurrences of R in $X^3$ is identical or different and shall mean H, $C_1$-$C_6$-alkyl, $C_5$-$C_6$-cycloalkyl, $C_2$-$C_6$-alkenyl, $C_2$-$C_6$-alkynyl, phenyl, imidazolyl, triazolyl, or pyridinyl moieties.

Polystyrene or cross-linked polystyrene is the preferred support material, even more preferably with hydroxyl groups on the surface to allow an easy coupling to the catalyst.

In a specific embodiment a catalyst can be used having the following formula

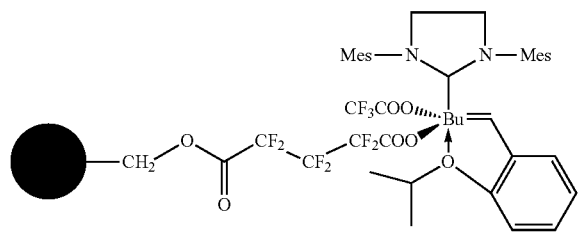

where the symbol ● represents a support, preferably a poly(styrene-divinylbenzene) copolymer. Catalysts of such type are known in principle from Chem. Eur. J. 2004 10, 777-784 and can be obtained by the preparative methods described there.

Step a) of the Process of the Present Invention:

The preparation of the novel catalyst composition in step a) of the present process is performed at an appropriate temperature. The choice of the temperature is influenced by the nature of the co-catalyst and the boiling temperature thereof. Typically this preparation step a) is performed at a temperature in the range of from –20° C. to 160° C., preferably in the range of from 20° C. to 80° C. The suitable time for the catalyst pretreatment using vinyl-containing substance ranges from about 1 minute to 48 hours.

The ratio of co-catalyst to transition metal catalyst is 1:(1-550), preferably 1:(20-550), more preferably 1:(20-500), very preferably 1:(25-475), even more preferably 1:(25-450), most preferably 1:(30-450) and particularly 1:(30-100).

The preparation of the novel catalyst composition can be carried out in a suitable solvent which does not deactivate the catalyst used and also does not have an adverse effect on the hydrogenation in any other way. Preferred solvents include, but are not restricted to, dichloromethane, benzene, toluene, methyl ethyl ketone, acetone, tetrahydrofuran, tetrahydropyran, dioxane, cyclohexane and chlorobenzene. The particularly preferred solvents are chlorobenzene and methyl ethyl ketone.

The formation of the novel catalyst composition is performed before hydrogen is brought into the reaction system.

Step b) of the Process of the Present Invention:

The hydrogenation of the nitrile rubber can be carried out by bringing the nitrile rubber into contact with the catalyst composition formed in step a) of the present process in the presence of hydrogen.

The hydrogenation is preferably carried out at a temperature in the range of from 60° C. to 200° C., preferably from 80° C. to 180° C., most preferably from 100° C. to 160° C. and at a hydrogen pressure in the range of 0.5 MPa to 35 MPa, more preferably of 3.0 MPa to 10 MPa.

Preferably, the hydrogenation time of the nitrile rubber is from 10 minutes to 24 hours, preferably from 15 minutes to 20 hours, more preferably from 30 minutes to 4 hours, even more preferably from 1 hour to 8 hours and most preferably from 1 hour to 3 hours.

The amount of the metathesis catalyst to the nitrile rubber in step b) depends on the nature and the catalytic activity of the metathesis catalyst. The amount of catalyst employed in step 1 is typically chosen in the range of from 1 to 1000 ppm of noble metal, preferably from 2 to 500 ppm, in particular from 5 to 250 ppm, based on the nitrile rubber used.

In an alternative embodiment of the present process it is possible to perform a metathesis reaction prior to the preparation of the novel catalyst composition and the subsequent hydrogenation. Such alternative process (hereinafter also referred to as "tandem process") comprises performing a metathesis step before the above described steps a) and b).

This means that such alternative process comprises firstly subjecting a nitrile rubber to a molecular weight degradation in a metathesis reaction by contacting the nitrile rubber in the absence or presence of a co-olefin, with a complex catalyst of general formula (A), then
  a) preparing the catalyst composition according to the invention by contacting the complex catalyst of general formula (A) which is present in the reaction mixture obtained after the metathesis reaction with at least one co-catalyst in a molar ratio of transition metal to co-catalyst in the range of 1:(20-550) wherein the co-catalyst has the general formula (1) or (2) as defined above and thereafter
  b) hydrogenating the nitrile rubber in the presence of the novel catalyst composition.

Such alternative process allows the production of hydrogenated nitrile rubber with a molecular weight which can be specifically controlled by the metathesis step.

Metathesis Step of the Tandem Method:

The NBR metathesis as first step of the tandem method can be carried out in the absence or presence of a co-olefin.

This co-olefin is preferably a straight-chain or branched $C_2$-$C_{16}$-olefin. Suitable co-olefins are, for example, ethylene, propylene, isobutene, styrene, 1-hexene and 1-octene. Particular preference is given to using 1-hexene or 1-octene.

In the alternative the following co-olefins can be used:

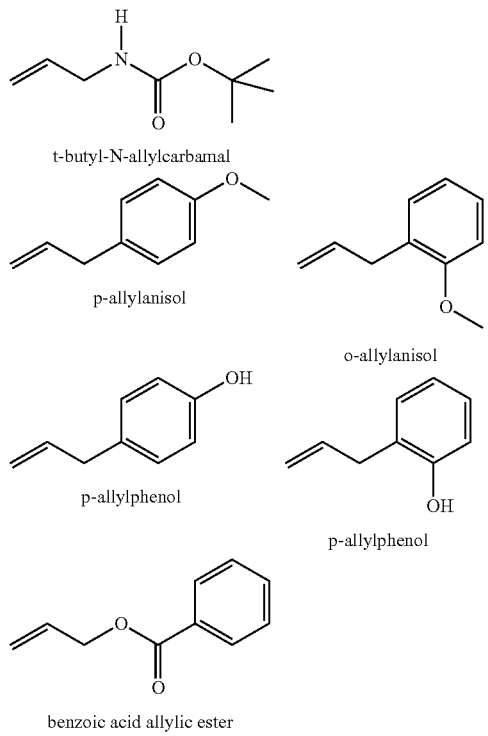

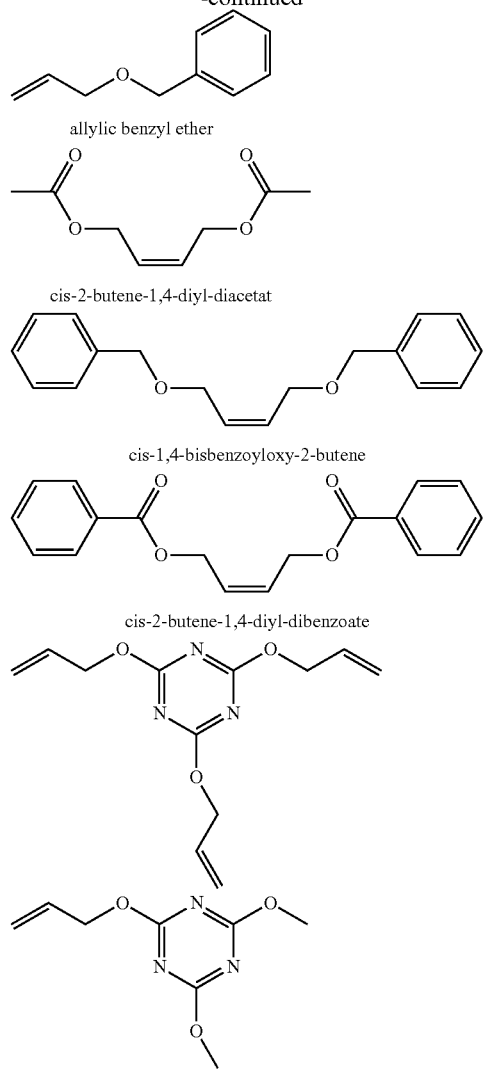

If the co-olefin is liquid (as in the case of, for example, 1-hexene), the amount of co-olefin is preferably in the range 0.2-20% by weight, based on the nitrile rubber used. If the co-olefin is a gas, as in the case of, for example, ethylene, the amount of co-olefin is selected so that a pressure in the range $1\times10^5$ Pa-$1\times10^7$ Pa, preferably a pressure in the range from $5.2\times10^5$ Pa to $4\times10^6$ Pa, is established in the reaction vessel at room temperature.

The metathesis reaction can be carried out in a suitable solvent which does not deactivate the catalyst used and also does not have an adverse effect on the reaction in any other way. Preferred solvents include, but are not restricted to, dichloromethane, benzene, toluene, methyl ethyl ketone, acetone, tetrahydrofuran, tetrahydropyran, dioxane, cyclohexane and chlorobenzene. The particularly preferred solvent is chlorobenzene. In some cases when the co-olefin itself can function as solvent, e.g. in the case of 1-hexene, the addition of a further additional solvent can be dispensed with.

The amount of catalyst based on the nitrile rubber used in the tandem method according to the invention depends on the nature and the catalytic activity of the specific complex catalyst. The amount of catalyst used is usually from 1 to 1000 ppm of noble metal, preferably from 2 to 500 ppm, in particular from 5 to 250 ppm, based on the nitrile rubber used.

The concentration of the nitrile rubber used in the reaction mixture of the metathesis is not critical, but it should naturally be ensured that the reaction is not adversely affected by an excessively high viscosity of the reaction mixture and the associated mixing problems. The concentration of NBR in the reaction mixture is preferably in the range from 1 to 25% by weight, particularly preferably in the range from 5 to 20% by weight, based on the total reaction mixture.

The metathetic degradation is usually carried out at a temperature in the range from 10° C. to 150° C., preferably at a temperature in the range from 20 to 80° C.

The metathesis reaction time depends on a number of factors, for example on the type of NBR, the type of catalyst, the catalyst concentration used and the reaction temperature. The progress of the cross-metathesis can be monitored by standard analytical methods, e.g. by GPC measurements or by determination of the viscosity. The reaction is typically allowed to be conducted for about 15 minutes to six hours under normal conditions. It is also possible to perform the metathesis reaction until the reaction ceases by deactivation of the catalyst.

After such metathesis step, the reaction mixture containing the metathesis catalyst is taken and brought into contact with the co-catalyst having the general formula (1) or (2). Typically the co-catalyst is simply added to the reaction mixture, preferably in the same solvent in which the metathesis was performed.

The appropriate temperature for the preparation of the novel catalyst composition after the metathesis in the tandem method can also be chose in the range of from −20° C. to 160° C., preferably in the range of from 20° C. to 80° C. The suitable time for the metathesis stopping using the vinyl-group containing co-catalyst ranges from about 5 minutes to 48 hours. The preferred time ranges from 10 minutes to 12 hours.

The subsequent hydrogenation of the nitrile rubber can be carried in the same manner as described above for the hydrogenation reaction.

One major advantage of the present invention resides in the fact that the catalytic system used is very active, so that the catalyst residue in the final HNBR products can be low enough to make the catalyst metal removal or recycle step alleviated or even unnecessary.

However, to the extent desired, the catalysts used during the process of the present invention may be removed. Such removal can be performed e.g. by using ion-exchange resins as described in EP-A-2 072 532 A1 and EP-A-2 072 533 A1. The reaction mixture obtained after the completion of the hydrogenation reaction can be taken and treated with an ion-exchange resin at e.g. 100° C. for 48 hours under nitrogen and then be precipitated in cold methanol For the purposes of the present invention, hydrogenation is a reaction of the double bonds present in the starting nitrile rubber to an extent of at least 50%, preferably 70-100%, more preferably 80-100%; even more preferably 90-100%

After the completion of the hydrogenation according to the present invention a hydrogenated nitrile rubber having a Mooney viscosity (ML1+4 at 100° C.), measured in accordance with ASTM standard D 1646, in the range from 1 to 130, preferably from 10 to 100, is obtained. This corresponds to a weight average molecular weight Mw in the range 2000-400000 g/mol, preferably in the range 20000-200000. The hydrogenated nitrile rubbers obtained also have a polydispersity PDI=Mw/Mn, where Mw is the weight average molecular weight and Mn is the number average molecular weight, in the range 1-5 and preferably in the range 1.5-3.

Nitrile Rubber:

The nitrile rubber used in the process of the present invention is a copolymer or terpolymer of at least one $\alpha,\beta$-unsaturated nitrile, at least one conjugated diene and, if desired, one or more further copolymerizable monomers.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Very particular preference is given to 1,3-butadiene and isoprene or mixtures thereof. Especial preference is given to 1,3-butadiene.

As $\alpha,\beta$-unsaturated nitrile, it is possible to use any known $\alpha,\beta$-unsaturated nitrile, preferably a ($C_3$-$C_5$) $\alpha,\beta$-unsaturated nitrile such as acrylonitrile, methacrylonitrile, ethacrylonitrile or mixtures thereof. Particular preference is given to acrylonitrile.

A particularly preferred nitrile rubber used in the process of this invention is thus a copolymer having repeating units derived from acrylonitrile and 1,3-butadiene.

Apart from the conjugated diene and the $\alpha,\beta$-unsaturated nitrile, the hydrogenated nitrile rubber may comprise repeating units of one or more further copolymerizable monomers known in the art, e.g. $\alpha,\beta$-unsaturated (preferably mono-unsaturated) monocarboxylic acids, their esters and amides, $\alpha,\beta$-unsaturated (preferably mono-unsaturated) dicarboxylic acids, their mono-oder diesters, as well as the respective anhydrides or amides of said $\alpha,\beta$-unsaturated dicarboxylic acids.

As $\alpha,\beta$-unsaturated monocarboxylic acids acrylic acid and methacrylic acid are preferably used.

Esters of $\alpha,\beta$-unsaturated monocarboxylic acids may also be used, in particular alkyl esters, alkoxyalkyl esters, aryl esters, cycloalkylesters, cyanoalkyl esters, hydroxyalkyl esters, and fluoroalkyl esters.

As alkyl esters $C_1$-$C_{18}$ alkyl esters of the $\alpha,\beta$-unsaturated monocarboxylic acids are preferably used, more preferably $C_1$-$C_{18}$ alkyl esters of acrylic acid or methacrylic acid, such as methylacrylate, ethylacrylate, propylacrylate, n-butylacrylate, tert.-butylacrylate, 2-ethyl-hexylacrylate, n-dodecylacrylate, methylmethacrylate, ethylmethacrylate, propylmethacrylate, n-butylmethacrylate, tert.-butylmethacrylate and 2-ethylhexyl-methacrylate.

As alkoxyalkyl esters $C_2$-$C_{18}$ alkoxyalkyl esters of $\alpha,\beta$-unsaturated monocarboxylic acids are preferably used, more preferably alkoxyalkylester of acrylic acid or methacrylic acid such as methoxy methyl(meth)acrylate, methoxy ethyl (meth)acrylate, ethoxyethyl(meth)acrylate and methoxyethyl(meth)acrylate.

It is also possible to use aryl esters, preferably $C_6$-$C_{14}$-aryl-, more preferably $C_6$-$C_{10}$-aryl esters and most preferably the aforementioned aryl esters of acrylates and methacrylates.

In another embodiment cycloalkyl esters, preferably $C_5$-$C_{12}$-, more preferably $C_6$-$C_{12}$-cyclo-alkyl and most preferably the aforementioned cycloalkyl acrylates and methacrylates are used.

It is also possible to use cyanoalkyl esters, in particular cyanoalkyl acrylates or cyanoalkyl methacrylates, with 2 to 12 C atoms in the cyanoalkyl group, preferably $\alpha$-cyanoethyl acrylate, $\beta$-cyanoethyl acrylate or cyanobutyl methacrylate.

In another embodiment hydroxyalkyl esters are used, in particular hydroxyalkyl acrylates and hydroxyalkyl methacrylates with 1 to 12 C-atoms in the hydroxylalkyl group, preferably 2-hydroxyethyl acrylate, 2-hydroxyethyl methacrylate or 3-hydroxypropyl acrylate.

It is also possible to use fluorobenzyl esters, in particular fluorobenzyl acrylates or fluorobenzyl methacrylates preferably trifluoroethyl acrylate and tetrafluoropropyl methacrylate. Substituted amino group containing acrylates and methacrylates may also be used like dimethylaminomethyl acrylate and diethylaminoethylacrylate.

Various other esters of the α,β-unsaturated carboxylic acids may also be used, like e.g. poly-ethyleneglycol(meth)acrylate, polypropyleneglycole(meth)acrylate, glycidyl(meth)acrylate, epoxy(meth)acrylate, N-(2-hydroxyethyl)acrylamide, N-(2-hydroxymethyl)acrylamide or urethane (meth)acrylate.

It is also possible to use mixture of all aforementioned esters of α,β-unsaturated carboxylic acids.

Furtheron α,β-unsaturated dicarboxylic acids may be used, preferably maleic acid, fumaric acid, crotonic acid, itaconic acid, citraconic acid and mesaconic acid.

In another embodiment anhydrides of α,β-unsaturated dicarboxylic acids are used, preferably maleic anhydride, itaconic anhydride, itaconic anhydride, citraconic anhydride and mesaconic anhydride.

In a further embodiment mono- or diesters of α,β-unsaturated dicarboxylic acids can be used. Suitable alkyl esters are e.g. $C_1$-$C_{10}$-alkyl, preferably ethyl-, n-propyl-, iso-propyl, n-butyl-, tert.-butyl, n-pentyl-oder n-hexyl mono- or diesters. Suitable alkoxyalkyl esters are e.g. $C_2$-$C_{12}$ alkoxyalkyl-, preferably $C_3$-$C_8$-alkoxyalkyl mono- or diesters. Suitable hydroxyalkyl esters are e.g. $C_1$-$C_{12}$ hydroxyalkyl-, preferably $C_2$-$C_8$-hydroxyalkyl mono- or diesters. Suitable cycloalkyl esters are e.g. $C_5$-$C_{12}$-cycloalkyl-, preferably $C_6$-$C_{12}$-cycloalkyl mono- or diesters. Suitable alkylcycloalkyl esters are e.g. $C_6$-$C_{12}$-alkylcycloalkyl-, preferably $C_7$-$C_{10}$-alkylcycloalkyl mono- or diesters. Suitable aryl esters are e.g. $C_6$-$C_{14}$-aryl, preferably $C_6$-$C_{10}$-aryl mono- or diesters.

Explicit examples of the α,β-ethylenically unsaturated dicarboxylic acid monoester monomers include
- maleic acid monoalkyl esters, preferably monomethyl maleate, monoethyl maleate, monopropyl maleate, and mono n-butyl maleate;
- maleic acid monocycloalkyl esters, preferably monocyclopentyl maleate, monocyclohexyl maleate, and monocycloheptyl maleate;
- maleic acid monoalkylcycloalkyl esters, preferably monomethylcyclopentyl maleate, and monoethylcyclohexyl maleate;
- maleic acid monoaryl ester, preferably monophenyl maleate;
- maleic acid mono benzyl ester, preferably monobenzyl maleate;
- fumaric acid monoalkyl esters, preferably monomethyl fumarate, monoethyl fumarate, monopropyl fumarate, and mono n-butyl fumarate;
- fumaric acid monocycloalkyl esters, preferably monocyclopentyl fumarate, monocyclohexyl fumarate, and monocycloheptyl fumarate;
- fumaric acid monoalkylcycloalkyl esters, preferably monomethylcyclopentyl fumarate, and monoethylcyclohexyl fumarate;
- fumaric acid monoaryl ester, preferably monophenyl fumarate;
- fumaric acid mono benzyl ester, preferably monobenzyl fumarate;
- citraconic acid monoalkyl esters, preferably monomethyl citraconate, monoethyl citraconate, monopropyl citraconate, and mono n-butyl citraconate;
- citraconic acid monocycloalkyl esters, preferably monocyclopentyl citraconate, monocyclohexyl citraconate, and monocycloheptyl citraconate;
- citraconic acid monoalkylcycloalkyl esters, preferably monomethylcyclopentyl citraconate, and monoethylcyclohexyl citraconate;
- citraconic acid mono aryl ester, preferably monophenyl citraconate;
- citraconic acid mono benzyl ester, preferably monobenzyl citraconate;
- itaconic acid mono alkyl esters, preferably monomethyl itaconate, monoethyl itaconate, monopropyl itaconate, and mono n-butyl itaconate;
- itaconic acid monocycloalkyl esters, preferably monocyclopentyl itaconate, monocyclohexyl itaconate, and monocycloheptyl itaconate;
- itaconic acid monoalkylcycloalkyl esters, preferably monomethylcyclopentyl itaconate, and monoethylcyclohexyl itaconate;
- itaconic acid mono aryl ester, preferably monophenyl itaconate;
- itaconic acid mono benzyl ester, preferably monobenzyl itaconate.

As α,β-ethylenically unsaturated dicarboxylic acid diester monomers the analogous diesters based on the above explicitly mentioned mono ester monomers may be used, wherein, however, the two organic groups linked to the C═O group via the oxygen atom may be identical or different.

As further termonomers vinyl aromatic monomers like styrol, α-methylstyrol and vinylpyridine, as well as non-conjugated dienes like 4-cyanocyclohexene and 4-vinylcyclohexene, as well as alkines like 1- or 2-butine may be used.

Particularly preferred are termonomers chosen from the below depicted formulae:

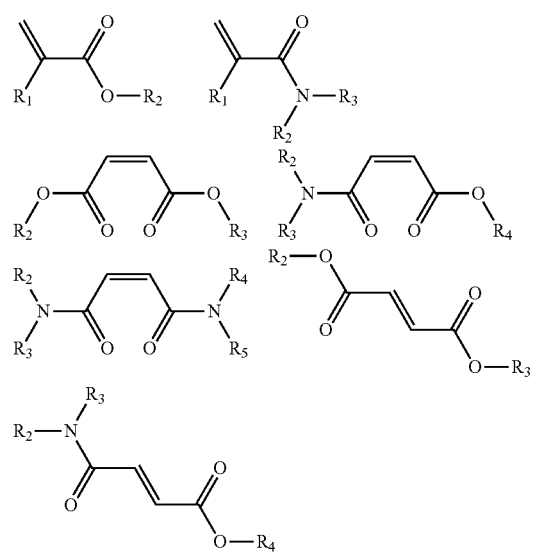

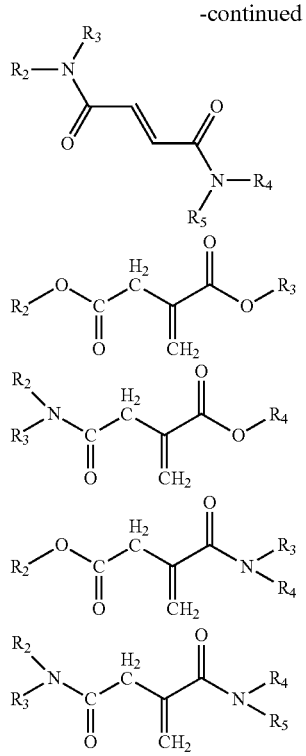

where
- $R^1$ is hydrogen or methyl group, and
- $R^2$, $R^3$, $R^4$, $R^5$ are identical or different and may represent H, $C_1$-$C_{12}$ alkyl, cycloalkyl, alkoxyalkyl, hydroxyalkyl, expoxyalkyl, aryl, heteroaryl.

The proportions of conjugated diene and α, β-unsaturated nitrile in the NBR polymers to be used can vary within wide ranges. The proportion of the conjugated diene or the sum of conjugated dienes is usually in the range from 40 to 90% by weight, preferably in the range from 60 to 85% by weight, based on the total polymer. The proportion of α, β-unsaturated nitrile or the sum of α, β-unsaturated nitriles is usually from 10 to 60% by weight, preferably from 15 to 40% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or the α, β-unsaturated nitrile or nitriles are replaced by proportions of the additional monomers, with the proportions of all monomers in each case adding up to 100% by weight.

The preparation of the nitrile rubbers by polymerization of the abovementioned monomers is adequately known to those skilled in the art and is comprehensively described in the literature.

Nitrile rubbers which can be used for the purposes of the invention are also commercially available, e.g. as products from the product range of the Perbunan® and Krynac® grades of Lanxess Deutschland GmbH.

The nitrile rubbers used for the metathesis have a Mooney viscosity (ML1+4 at 100° C.) in the range from 30 to 70, preferably from 30 to 50. This corresponds to a weight average molecular weight Mw in the range 150000-500000, preferably in the range 180000-400000. Furthermore, the nitrile rubbers used have a polydispersity PDI=Mw/Mn, where Mw is the weight average molecular weight and Mn is the number average molecular weight, in the range 2.0-6.0 and preferably in the range 2.0-4.0. The determination of the Mooney viscosity is carried out in accordance with ASTM Standard D 1646.

The metathesis activity of the ruthenium- or osmium-based catalyst is suppressed by treating the catalyst with the vinyl compound of general formula (1) and thus the molecular weight of the hydrogenated nitrile rubber obtained after the hydrogenation is comparable to the original NBR feedstock and not further reduced during hydrogenation. Meanwhile the hydrogenation activity of the novel catalyst composition is obviously higher than the corresponding process performed only in the presence of the ruthenium- or osmium-based catalyst.

In the tandem method, the nitrile rubber is firstly degraded using at least one ruthenium- or osmium-based catalyst in the absence or in the presence of a co-olefin. The vinyl compound of general formula (1) is either added when the metathesis reaction has ceased or gone to completion or added before in order to stop the metathesis at a certain degree. Thereafter, the hydrogenation can be carried out to afford hydrogenated nitrile rubber by introducing hydrogen gas. In the sequence of metathesis, catalyst composition formation and hydrogenation, the metathesis degree can be fully controlled and the molecular weight of the final hydrogenated nitrile rubber is adjustable as desired.

The invention is further illustrated but is not intended to be limited by the following examples in which all parts and percentages are by weight unless otherwise specified.

EXAMPLES

Catalysts Used in the Examples:

Catalysts (1) and (2) were purchased from Sigma Aldrich or Strem Chemicals Inc. Catalyst (3) was purchased from Xian Kaili Co. (China). The structures of these catalysts are shown below, wherein "Mes" means mesityl (2,4,6-trimethylphenyl) and "Cy" means cyclohexyl:

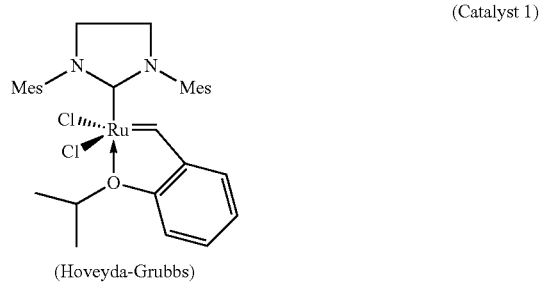

(Catalyst 1)

(Hoveyda-Grubbs)

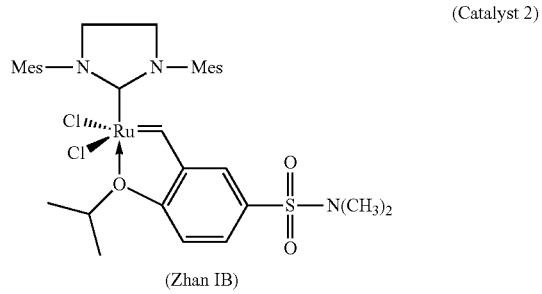

(Catalyst 2)

(Zhan IB)

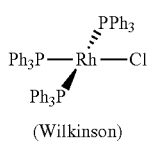
(Catalyst 3)

(Wilkinson)

These catalysts have the following molecular weights:

| catalyst | molecular weight [g/mol] |
|---|---|
| (1) | 626.62 |
| (2) | 733.75 |
| (3) | 925.22 |

Nitrile Butadiene Rubbers Used in the Examples:

The nitrile butadiene rubbers which were used in the examples are commercially available from Lanxess Deutschland GmbH and have the properties as outlined in Table 1.

TABLE 1

Nitrile Butadiene Rubbers (NBR) used

| NBR | Acrylonitrile content % by weight | Mooney viscosity ML(1 + 4) 100° C. | Mn | Mw | PDI |
|---|---|---|---|---|---|
| Perbunan ® 3431 VP | 34 | 29 | 77,101 | 255,395 | 3.31 |
| Perbunan ® 3430 F | 34 | 32 | 78,930 | 199,479 | 2.53 |
| Krynac ® 3330 F | 33 | 30 | 77,766 | 256,919 | 3.30 |
| Krynac ® X1.46* | 33 | 45 | 106,357 | 289,134 | 2.72 |
| NBR-5 | 34 | 34 | 73,711 | 243,671 | 3.31 |
| NBR-6 | 34 | 34 | 74,698 | 249,935 | 3.35 |

*Terpolymer with a carboxylic acid termonomer, Termonomer content: 1% by weight
Vinyl ethyl ether (VEE) was purchased from Sigma-Aldrich.

Analytical Tests:

GPC Test: The apparent molecular weight Mn and Mw were determined by a Waters GPC system equipped with a Waters 1515 high performance liquid chromatography pump, a Waters 717plus autosampler, a PL gel 10 μm mixed B column and a Waters 2414 RI detector. The GPC test was carried out at 40° C. at 1 mL/min of flow rate with THF as the eluent, and the GPC column was calibrated with narrow PS standard samples.

FT-IR Test: The spectrum of nitrile rubber before, during and after the hydrogenation reaction was recorded on a Perkin Elmer spectrum 100 FT-IR spectrometer. The solution of the nitrile butadiene rubber in MCB was cast onto a KBr disk and dried to form a film for the test. The hydrogenation conversion is determined by the FT-IR analysis according to the ASTM D 5670-95 method.

Abbreviations:
phr: per hundred rubber (weight)
rpm: revolution per minute
Mn: number-average molecular weight
Mw: weight-average molecular weight
PDI: polydispersity index, defined as Mw/Mn
PPh$_3$: triphenylphosphine
MCB: monochlorobenzene
VEE: vinyl ethyl ether
RT: room temperature (22+/−2° C.)

Example 1

Comparison Example, Using Catalyst (3)

A solution of 18 g Perbunan® 3431VP in 282 g MCB (Perbunan® 3431VP concentration of 6 wt %) was bubbled with nitrogen in a 600 mL Parr autoclave for 30 minutes, and then heated to 120° C. Wilkinson's catalyst (15 mg) and PPh$_3$ (18 mg) was dissolved in another 22 g of degassed MCB and then added into the reactor. Hydrogenation was conducted under 4.137 MPa of hydrogen pressure and 800 rpm of agitation speed. Samples were taken from the reactor at intervals for FT-IR analysis to determine the hydrogenation degree. After 5 hours of hydrogenation, the hydrogenation degree reached 90.3%, the reactor was cooled to room temperature and the pressure was released. The final molecular weights and PDI were: Mn=76,286, Mw=260,572, PDI=3.42.

Example 2

Comparison Example, Using Catalyst (2) without Pretreatment

A solution of 9 g Perbunan® 3431VP in 291 g MCB (Perbunan® 3431VP concentration of 3 wt %) was bubbled with nitrogen in a 600 mL Parr autoclave for 30 minutes, and then heated to 120° C. Catalyst (2) (9 mg) was dissolved in another 22 g of degassed MCB and then added into the reactor. Hydrogenation was conducted under 4.137 MPa of hydrogen pressure and 800 rpm of agitation speed. Samples were taken from the reactor at intervals for FT-IR analysis to determine the hydrogenation degree. After 4 hours of hydrogenation, the hydrogenation degree reached 98.6%. The final molecular weights and the PDI were: Mn=5,560, Mw=14,407, PDI=2.59.

Example 3

Comparison Example, Using Catalyst (2) without Pretreatment

A solution of 18 g Perbunan® 3431VP in 282 g MCB (Perbunan® 3431VP concentration of 6 wt %) was bubbled with nitrogen in a 600 mL Parr autoclave for 30 minutes, and then heated to 120° C. Catalyst (2) (18 mg) was dissolved in another 22 g of degassed MCB and then added into the reactor. Hydrogenation was conducted under 4.137 MPa of hydrogen pressure and 800 rpm of agitation speed. Samples were taken from the reactor at intervals for FT-IR analysis to determine the hydrogenation degree. After 18 hours of hydrogenation, the hydrogenation degree reached 92.6%. The final molecular weights and the PDI were: Mn=10,103, Mw=19,964, PDI=1.98.

Example 4

Inventive; Perbunan® 3431VP; Catalyst (2) and VEE Pretreatment

Catalyst (2) (18 mg) was dissolved in 22 g degassed MCB in a flask. Vinyl ethyl ether was injected into the flask and the solution was stirred for 12 hours. A solution of 18 g Perbunan® 3431VP in 282 g MCB (Perbunan® VP3431VP concentration of 6 wt %) was bubbled with nitrogen in a 600 mL Parr autoclave for 30 minutes, and then heated to 120° C. The catalyst solution in the flask was transferred into the reactor via syringe. Hydrogenation was conducted under 4.137 MPa of hydrogen pressure and 800 rpm of agitation speed. Samples were taken from the reactor at intervals for FT-IR analysis to determine the hydrogenation degree. After 2 hours of hydrogenation, the hydrogenation degree reached 99%. The final molecular weights and the PDI were: Mn=74,495, Mw=229,568, PDI=3.08.

Example 5

Inventive; Perbunan® 3431VP; Catalyst (2) and VEE Pretreatment

Catalyst (2) (9 mg) was dissolved in 22 g degassed MCB in a flask. Vinyl ethyl ether (100 μL) was injected into the flask and the solution was stirred for 12 hours. A solution of 18 g Perbunan® 3431VP in 282 g MCB (Perbunan® 3431VP concentration of 6 wt %) was bubbled with nitrogen in a 600 mL Parr autoclave for 30 minutes, and then heated to 120° C. The catalyst solution in the flask was transferred into the reactor via syringe. Hydrogenation was conducted under 4.137 MPa of hydrogen pressure and 800 rpm of agitation speed. Samples were taken from the reactor at intervals for FT-IR analysis to determine the hydrogenation degree. After 4 hours of hydrogenation, the hydrogenation degree reached 95%. The final molecular weights and the PDI were: Mn=71,220, Mw=224,342, PDI=3.15.

Example 6

Inventive; Krynac® 3330 F; Catalyst (2) and VEE Pretreatment

All the conditions and operation were the same as in Example 5 except that the NBR feedstock was Krynac® 3330 F. The hydrogenation degree at 4 hours was 96%. The final molecular weights and the PDI were: Mn=78,125, Mw=256,043, PDI=3.28.

Example 7

Inventive; Perbunan® 3430 F; Catalyst (2) and VEE Pretreatment

All the conditions and operation were the same as in Example 5 except that the NBR feedstock was Perbunan® 3430 F. The hydrogenation degree at 4 hours was 99%. The final molecular weight and the distribution were: Mn=78,514, Mw=222,813, PDI=2.84.

Example 8

Inventive; Krynac® X146; Catalyst (2) and VEE Pretreatment

All the conditions and operation were identical to Example 5 except that the dosage of Catalyst (2) was 18 mg, the hydrogen pressure was 6.895 MPa and the NBR used was Krynac® X1.46. The hydrogenation degree at 3 hours was 98%. The final molecular weights and the PDI were: Mn=107,058, Mw=261,844, PDI=2.44.

Example 9

Inventive; Perbunan® 3431VP; Catalyst (1) and VEE Pretreatment

All the conditions and operation were the same as in Example 5 except that Catalyst (1) was used (9 mg). The hydrogenation degree at 3 hours was 97%. The final molecular weights and the PDI were: Mn=77473, Mw=219498, PDI=2.83.

The conditions and the results for Example 1-9 are shown in Table 2.

In such Table 2 the comparative examples are marked with an asterisk. Furtheron the abbreviation P3431VP stands for Perbunan® 3431VP, K3330 F stands for Krynac® 3330F, P3430F stands for Perbunan® 3430F and K X 1.46 stands for Krynac® X1.46. Only for comparison reasons the number and weight average molecular weights as well as PDI has been included at the bottom of Table 2 with regard to the starting nitrile rubbers then subjected to hydrogenation in Examples 1 to 9.

TABLE 2

Examples 1 to 9 (hydrogenation temperature: 120° C. all Examples; pr.essure: 4.137 MPa all Examples except Example 8 (6.895 MPa)

| Ex | NBR type | amount [g] | MCB (used to dissolve NBR + catalyst) [g] | catalyst no. | amount [mg] | [mmol] | co-catalyst type | amount [mg] | [mmol] | Molar ratio co-catalyst to catalyst | Time of pre-treatment [h] | Hydrogenation time [h] | degree [%] | Mn [g/mol] | Mw [g/mol] | PDI |
|---|---|---|---|---|---|---|---|---|---|---|---|---|---|---|---|---|
| | | | | | | | | | | | | | | HNBR | | |
| 1* | P 3431 VP | 18 | 282 + 22 | (3) | 15 | 0.0162 | PPh₃ | 18 | | | 0 | 5 | 90.3 | 76,286 | 260,572 | 3.42 |
| 2* | P 3431 VP | 9 | 291 + 22 | (2) | 9 | 0.0123 | — | — | — | | 0 | 4 | 98.6 | 5,560 | 14,407 | 2.59 |
| 3* | P 3431 VP | 18 | 282 + 22 | (2) | 18 | 0.0246 | — | — | — | | 0 | 18 | 92.6 | 10,103 | 19,964 | 1.98 |
| 4 | P 3431 VP | 18 | 282 + 22 | (2) | 18 | 0.0246 | VEE | 75 | 1.04 | 42.4 | 12 | 2 | 99 | 74,495 | 229,568 | 3.08 |
| 5 | P 3431 VP | 18 | 282 + 22 | (2) | 18 | 0.0246 | VEE | 75 | 1.04 | 42.4 | 12 | 4 | 95 | 71,220 | 224,342 | 3.15 |
| 6 | K 3330 F | 18 | 282 + 22 | (2) | 18 | 0.0246 | VEE | 75 | 1.04 | 42.4 | 12 | 4 | 96 | 78,125 | 256,043 | 3.28 |

TABLE 2-continued

Examples 1 to 9 (hydrogenation temperature: 120° C. all Examples;
pr.essure: 4.137 MPa all Examples except Example 8 (6.895 MPa)

| Ex | NBR type | NBR amount [g] | MCB (used to dissolve NBR + catalyst [g] | catalyst no. | catalyst amount [mg] | catalyst [mmol] | co-catalyst type | co-catalyst [mg] | co-catalyst [mmol] | Molar ratio co-catalyst to catalyst | Time of pre-treatment [h] | Hydrogenation time [h] | Hydrogenation degree [%] | Mn [g/mol] | Mw [g/mol] | PDI |
|---|---|---|---|---|---|---|---|---|---|---|---|---|---|---|---|---|
| 7 | P 3430 F | 18 | 282 + 22 | (2) | 18 | 0.0246 | VEE | 75 | 1.04 | 42.4 | 12 | 4 | 99 | 78,514 | 222,813 | 2.84 |
| 8 | K X146 | 18 | 282 + 22 | (2) | 18 | 0.0246 | VEE | 75 | 1.04 | 42.4 | 12 | 3 | 98 | 107,058 | 261,844 | 2.44 |
| 9 | P 3431 VP | 18 | 282 + 22 | (1) | 9 | 0.0144 | VEE | 75 | 1.04 | 72.4 | 12 | 3 | 97 | 77,473 | 219,498 | 2.83 |
| | | | | | | | | | | | | | NBR | | | |
| | P 3431 VP | | | | | | | | | | | | | 77,101 | 255,395 | 3.31 |
| | P 3430 F | | | | | | | | | | | | | 78,930 | 199,479 | 2.53 |
| | K 3330 F | | | | | | | | | | | | | 77,766 | 256,919 | 3.30 |
| | K X146 | | | | | | | | | | | | | 106,357 | 289,134 | 2.72 |

Example 10

Inventive, Perbunan® 3431VP; Catalyst (2);
Metathesis and Subsequent Hydrogenation A solution of 18 g Perbunan® 3431VP in 282 g MCB (Perbunan® 3431VP concentration of 6 wt) % was bubbled with nitrogen in a 600 mL Parr autoclave for 30 minutes. Catalyst (2) (9 mg) was dissolved in 22 g of degassed MCB at room temperature and then added into the reactor. The metathesis was allowed to conduct for 1 hour at room temperature. Then 0.5 mL of VEE was added into the autoclave. After stirring for 10 minutes, a sample was taken from the reactor for GPC analysis. The temperature of the autoclave was elevated to 120° C. Then the hydrogen gas was introduced into the autoclave. Hydrogenation was conducted under 4.137 MPa of hydrogen pressure and 800 rpm of agitation speed. Samples were taken from the reactor at intervals for FT-IR analysis to determine the hydrogenation degree. The molecular weights and the PDI after the addition of VEE were Mn=54,262, Mw=141,533, PDI=2.61. After 3 hours of hydrogenation, the hydrogenation degree reached 99%. The final molecular weights and the PDI were: Mn=56,391, Mw=140,641, PDI=2.49.

Example 11

Inventive, Perbunan® 3431VP; Catalyst (2);
Metathesis and Subsequent Hydrogenation All the conditions and operation were the same as in Example 10 except that the metathesis was allowed to conduct for 2 hours. The molecular weights and the PDI after the addition of VEE were Mn=41,534, Mw=95,791, PDI=2.31. After 3 hours of hydrogenation, the hydrogenation degree reached 99%. The final molecular weights and the PDI were: Mn=46,540, Mw=105,983, PDI=2.28.

The conditions and the results for Example 10 and 11 are shown in Table 3.

TABLE 3

Reaction conditions and results of Examples 10 and 11
(hydrogenation pressure 4.137 MPa, hydrogenation temperature: 120° C., hydrogenation time: 3 h)

| Ex | Perbunan 3431 VP amount [g] | Catalyst (2) amount [mg] | Catalyst (2) amount [mmol] | MCB to dissolve NBR + catalyst amount [g] | Step 1: Metathesis time [h] | Co-catalyst type | Co-catalyst [mg] | Co-catalyst [mmol] | Molar ratio co-catalyst to catalyst | Pre-treatment at 20° C. time [min] | | HNBR Mn [g/mol] | HNBR Mw [g/mol] | PDI | Hydrogenation degree [%] |
|---|---|---|---|---|---|---|---|---|---|---|---|---|---|---|---|
| 10 | 18 | 9 | 0.0123 | 282 + 22 | 1 | VEE | 375 | 5.20 | 424.1 | 10 | after methathesis and VEE addition | 54,262 | 141,533 | 2.61 | — |
| | | | | | | | | | | | after hydrogenation | 56,391 | 140,641 | 2.49 | 99 |
| 11 | 18 | 9 | 0.0123 | 282 + 22 | 2 | VEE | 375 | 5.20 | 424.1 | 10 | after methathesis and VEE addition | 41,534 | 95,791 | 2.31 | — |
| | | | | | | | | | | | after hydrogenation | 46,540 | 105,983 | 2.28 | 99 |

The examples show that HNBR can be prepared by hydrogenation of NBR in the presence of a pretreated Ru-based metathesis catalyst wherein the pretreatment of the catalyst is conducted either separately or following a metathesis reaction in-situ in the reaction mixture before the addition of hydrogen. The metathesis activity of the catalyst is controlled by the pretreatment method and thus the molecular weight of the hydrogenated nitrile rubber obtained by the pretreatment method according to the invention is comparable to the original NBR feedstock. Surprisingly the composition obtained by contacting the catalyst with the co-catalyst exhibits a higher hydrogenation activity in the hydrogenation of the nitrile rubber than the same catalyst which was not pretreated. This can be taken from a comparison of Example 3 with Examples 4 and 5. In Example 3 the hydrogenation using Catalyst (2) which was not pretreated resulted in a hydrogenation degree of 92.6% after 18 hours, while Examples 4 and 5 both using Catalyst (2) which was pretreated according to the invention resulted in a hydrogenation degree of 99% and 95%, respectively, after a hydrogenation time of only 2 or 4 hours, respectively.

What is claimed is:

1. A selective hydrogenation of nitrile rubber comprising selectively hydrogenating nitrile rubber in the presence of a catalyst composition obtained by contacting a complex catalyst with at least one co-catalyst in a molar ratio of the complex catalyst to the co-catalyst of 1:30 to 1:100, wherein:
the complex catalyst has the general formula (A)

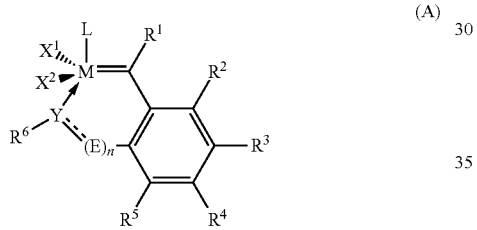

where
M is ruthenium or osmium,
$X^1$ and $X^2$ are identical or different ligands,
L is an electron donating ligand, which can be linked or not linked with $X^1$ to form a cyclic structure,
$R^1$ is hydrogen, alkyl, cycloalkyl, alkenyl, alkynyl, aryl or heteroaryl,
$R^2$, $R^3$, $R^4$ and $R^5$ are identical or different and are each hydrogen or an organic or inorganic substituent,
$R^6$ is H, alkyl, cycloalkyl, alkenyl, alkynyl, aryl, heteroaryl, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)$_2$R, —S(=O)R, or a group containing either a C=O or a C=S structural element adjacent to a carbon atom which is bound to Y,
n is 0 or 1,
wherein if n=1, then the element  shall mean that Y and (E)$_n$ are linked either by a single bond or by a double bond, wherein
  (i) if Y and (E)$_n$ are linked by a single bond, then Y is oxygen (O), sulfur (S), N—R or P—R, and E is CH$_2$, or
  (ii) if Y and (E)$_n$ are linked by a double bond, then Y is N or P, and
  E is CH, and wherein if n=0, then
  Y is oxygen (O), sulfur (S), N—R or P—R, and is directly linked by a single bond to the phenyl moiety depicted above in formula (A), and
wherein in all above occurrences of general formula (A), R is hydrogen or alkyl, cycloalkyl, alkenyl, alkynyl, aryl or heteroaryl; and
wherein the co-catalyst must contain at least one vinyl group, and has the general formula (1)

$$CH_2=CRR' \qquad (1)$$

in which R and R' are identical or different and in the co-catalyst shall mean hydrogen, wherein R and R' must not both represent hydrogen, or
  OR$^1$ wherein R$^1$ shall mean alkyl, cycloalkyl, alkenyl, alkynyl, aryl, or heteroaryl, C(=O)(R$^2$), —C(=O)N(R$^2$)$_2$, —[(CH$_2$)$_n$—X]$_m$R$^2$, —[(CH$_2$)$_n$—X]$_m$—CH=CH$_2$, or —(CH$_2$)$_p$—C(R$^3$)$_2$R$^4$, wherein
    X is identical or different and means oxygen (O) or NR$^2$
    R$^2$ are identical or different and represent H, alkyl, cycloalkyl, alkenyl, alkynyl, aryl, or heteroaryl,
    R$^3$ are identical or different and represent C$_1$-C$_8$ alkyl or —(CH$_2$)$_{n'}$—O—CH=CH$_2$,
    R$^4$ represents (CH$_2$)$_{p'}$—O—CH=CH$_2$,
    n is 1 to 5,
    m is 1 to 10,
    p is 0 to 5, or
  where in the alternative, if R and R' both represent a group OR$^1$, both R$^1$ may be linked to each other and together represent a divalent group —(C(R$^2$)$_2$)$_q$—with q being 2, 3 or 4 and R$^2$ being identical or different and having the above defined meanings, or
  SR$^5$, SOR$^5$, SO$_2$R$^5$ wherein R$^5$ represents alkyl, cycloalkyl, alkenyl, alkynyl, aryl, or heteroaryl, or
  N(R$^6$R$^7$), P(R$^6$R$^7$) wherein R$^6$ and R$^7$ are identical or different and shall mean alkyl, cycloalkyl, alkenyl, alkynyl, aryl, heteroaryl, —C(=O)(R$^2$), or where in the alternative R$^6$ and R$^7$ may form together with such N or P atom to which they both are linked at the same time a saturated, unsaturated or aromatic cyclic structure with 4 to 7 carbon atoms in the cyclic structure wherein one, two or three of said carbon atoms can be replaced by a moiety selected from oxygen, sulfur, nitrogen, N—R$^8$ or P—R$^8$ wherein R$^8$ shall mean alkyl, cycloalkyl, alkenyl, alkynyl, aryl, or heteroaryl; or
  P(=O)(OR$^9$)$_2$ in which R$^9$ are identical or different and shall mean alkyl, cycloalkyl, alkenyl, alkynyl, aryl, heteroaryl.

2. The selective hydrogenation according to claim 1, wherein the complex catalyst is contacted with one co-catalyst of the general formula (1) in which R is hydrogen and R' shall mean,
  OR$^1$ wherein R$^1$ shall mean C$_1$-C$_{16}$-alkyl, C$_3$-C$_{10}$-cycloalkyl, C$_2$-C$_{16}$-alkenyl, C$_2$-C$_{20}$-alkynyl, C$_6$-C$_{24}$-aryl, C$_6$-C$_{24}$-heteroaryl, —C(=O)(R$^2$)$_2$, —C(=O)N(R$^2$)$_2$, —[(CH$_2$)$_n$X]$_m$R$^2$, —[(CH$_2$)$_n$X]$_m$—CH=CH$_2$, or —(CH$_2$)$_p$—C(R$^3$)$_2$R$^4_1$,
  wherein
    X is identical or different and is oxygen (O) or NR$^2$,
    R$^2$ are identical or different and represent H, C$_1$-C$_{16}$-alkyl, C$_3$-C$_{10}$-cycloalkyl, C$_2$-C$_{16}$-alkenyl, C$_2$-C$_{20}$-alkynyl, C$_6$-C$_{24}$-aryl, or C$_3$-C$_{20}$-heteroaryl,
    R$^3$ are identical or different and represent C$_1$-C$_4$ alkyl or —(CH$_2$)$_n$—O—CH=CH$_2$, R$^4$ represents (CH$_2$)$_p$—O—CH=CH$_2$,
n is 1 to 4,
m is 1 to 5,
p is 0 to 5, or SR$^5$, SOR$^5$, SO$_2$R$^5$ wherein R$^5$ represents C$_1$-C$_{16}$-alkyl, C$_3$-C$_{10}$-cycloalkyl, C$_2$-C$_{16}$-alkenyl, C$_2$-C$_{20}$-alkynyl, C$_6$-C$_{24}$-aryl, or C$_6$-C$_{24}$-heteroaryl, or N(R$^6$R$^7$), P(R$^6$R$^7$) wherein R$^6$ and R$^7$ are identical or different and shall mean C$_1$-C$_{16}$-alkyl, C$_3$-C$_{10}$-cycloalkyl, C$_2$-C$_{16}$-alkenyl, C$_2$-C$_{20}$-alkynyl, C$_6$-C$_{24}$-aryl, or C$_6$-C$_{24}$-heteroaryl, —C(=O)(R$^2$), or where in the alternative R$^6$ and R$^7$ may form together with such N or P atom to which they both are linked at the same time a saturated, unsaturated or aromatic cyclic structure with 4 to 7 carbon atoms in the cyclic structure wherein one, two or three of said carbon atoms can be replaced by a moiety selected from oxygen, sulfur, nitrogen, N—R$^8$ or P—R$^8$ wherein R$^8$ shall mean C$_1$-C$_{16}$-alkyl, C$_3$-C$_{10}$-cycloalkyl, C$_2$-C$_{16}$-alkenyl, C$_2$-C$_{20}$-alkynyl, C$_6$-C$_{24}$-aryl, or C$_6$-C$_{24}$-heteroaryl, or P(=O)(OR$^9$)$_2$ in which R$^9$ are identical or different and shall mean C$_1$-C$_{16}$-alkyl, C$_3$-C$_{10}$-cycloalkyl, C$_2$-C$_{16}$-alkenyl, C$_2$-C$_{20}$-alkynyl, C$_6$-C$_{24}$-aryl, or C$_6$-C$_{24}$-heteroaryl.

3. The selective hydrogenation according to claim 1, wherein the complex catalyst is contacted with one co-catalyst of the general formula (1) in which R and R' are identical or different and shall mean OR$^1$ wherein R$^1$ shall mean C$_1$-C$_{16}$-alkyl, C$_3$-C$_{10}$-cycloalkyl, C$_2$-C$_{16}$-alkenyl, C$_2$-C$_{20}$-alkynyl, C$_6$-C$_{24}$-aryl, C$_6$-C$_{24}$-heteroaryl, —C(=O)(R$^2$), —C(=O)N(R$^2$)$_2$, —[(CH$_2$)$_n$X]$_m$R$^2$, —[(CH$_2$)$_n$X]$_m$—CH=CH$_2$, or —(CH$_2$)$_p$—C(R$^3$)$_2$R$^4$,
wherein
X is identical or different and oxygen (O) or NR$^2$,
R$^2$ are identical or different and represent H, C$_1$-C$_{16}$-alkyl, C$_3$-C$_{10}$-cycloalkyl, C$_2$-C$_{16}$-alkenyl, C$_2$-C$_{20}$-alkynyl, C$_6$-C$_{24}$-aryl, or C$_3$-C$_{20}$-heteroaryl,
R$^3$ are identical or different and represent C$_1$-C$_4$ alkyl or —(CH$_2$)$_n$—O—CH=CH$_2$,
R$^4$ represents (CH$_2$)$_p$—O—CH=CH$_2$,
n is 1 to 4,
m is 1 to 5,
p is 0 to 5, where in the alternative, if R and R' both represent a group OR$^1$, both R$^1$ may be linked to each other and together represent a divalent group —(C(R$^2$)$_2$)$_q$— with q being 2, 3 or 4, and R$^2$ being identical or different and having the above defined meanings, or SR$^5$, SOR$^5$, SO$_2$R$^5$ wherein R$^5$ represents C$_1$-C$_{16}$-alkyl, C$_3$-C$_{10}$-cycloalkyl, C$_2$-C$_{16}$-alkenyl, C$_2$-C$_{20}$-alkynyl, C$_6$-C$_{24}$-aryl, or C$_6$-C$_{24}$-heteroaryl, or N(R$^6$R$^7$), P(R$^6$R$^7$) wherein R$^6$ and R$^7$ are identical or different and shall mean C$_1$-C$_{16}$-alkyl, C$_3$-C$_{10}$-cycloalkyl, C$_2$-C$_{16}$-alkenyl, C$_2$-C$_{20}$-alkynyl, C$_6$-C$_{24}$-aryl, or C$_6$-C$_{24}$-heteroaryl, —C(=O)(R$^2$), or where in the alternative R$^6$ and R$^7$ may form together with such N or P atom to which they both are linked at the same time a saturated, unsaturated or aromatic cyclic structure with 4 to 7 carbon atoms in the cyclic structure wherein one, two or three of said carbon atoms can be replaced by a moiety selected from oxygen, sulfur, nitrogen, N—R$^8$ or P—R$^8$ wherein R$^8$ shall mean C$_1$-C$_{16}$-alkyl, C$_3$-C$_{10}$-cycloalkyl, C$_2$-C$_{16}$-alkenyl, C$_2$-C$_{20}$-alkynyl, C$_6$-C$_{24}$-aryl, or C$_6$-C$_{24}$-heteroaryl, or P(=O)(OR$^9$)$_2$ in which R$^9$ are identical or different and shall mean C$_1$-C$_{16}$-alkyl, C$_3$-C$_{10}$-cycloalkyl, C$_2$-C$_{16}$-alkenyl, C$_2$-C$_{20}$-alkynyl, C$_6$-C$_{24}$-aryl, or C$_6$-C$_{24}$-heteroaryl.

4. The selective hydrogenation according to claim 1, wherein the complex catalyst is contacted with one co-catalyst of the general formula (1) in which R is hydrogen and R' represents OR$^1$ wherein R$^1$ shall mean C$_1$-C$_6$-alkyl, C$_5$-C$_6$-cycloalkyl, C$_2$-C$_6$-alkenyl, C$_2$-C$_6$-alkynyl, phenyl, imidazolyl, triazolyl, or pyridinyl, —C(=O)(R$^2$), —C(=O)N(R$^2$)$_2$, —[(CH$_2$)$_n$O]$_m$R$^2$, —[(CH$_2$)$_n$O]$_m$—CH=CH$_2$, or —(CH$_2$)$_p$—C(R$^3$)$_2$R$^4$,
wherein
R$^2$ are identical or different and represent H, C$_1$-C$_6$-alkyl, C$_5$-C$_8$-cycloalkyl, C$_2$-C$_8$-alkenyl, C$_2$-C$_8$-alkynyl, phenyl, imidazolyl, triazolyl, or pyridinyl,
R$^3$ are identical or different and represent methyl, ethyl or —(CH$_2$)$_n$—O—CH=CH$_2$,
R$^4$ represents (CH$_2$)$_p$—O—CH=CH$_2$,
n is 1, or 2,
m is 1, 2, or 3, and
p is 0, 1, or 3.

5. The selective hydrogenation according to claim 1, wherein the co-catalyst is selected from the group consisting of formulae (cocat-1) to (cocat-31) and (cocat-33) to (cocat-38):

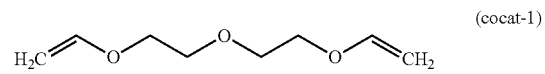
(cocat-1)

(cocat-2)

(cocat-3)

(cocat-4)

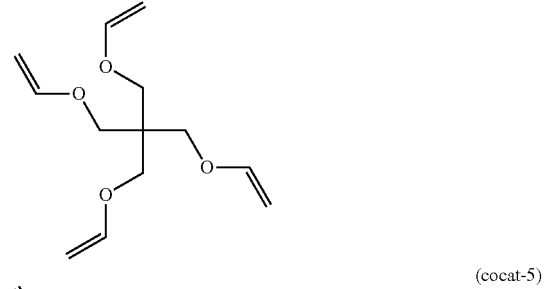
(cocat-5)

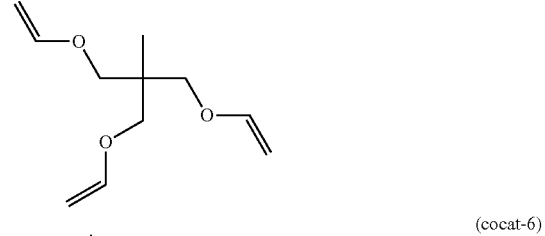
(cocat-6)

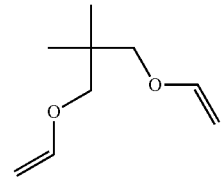

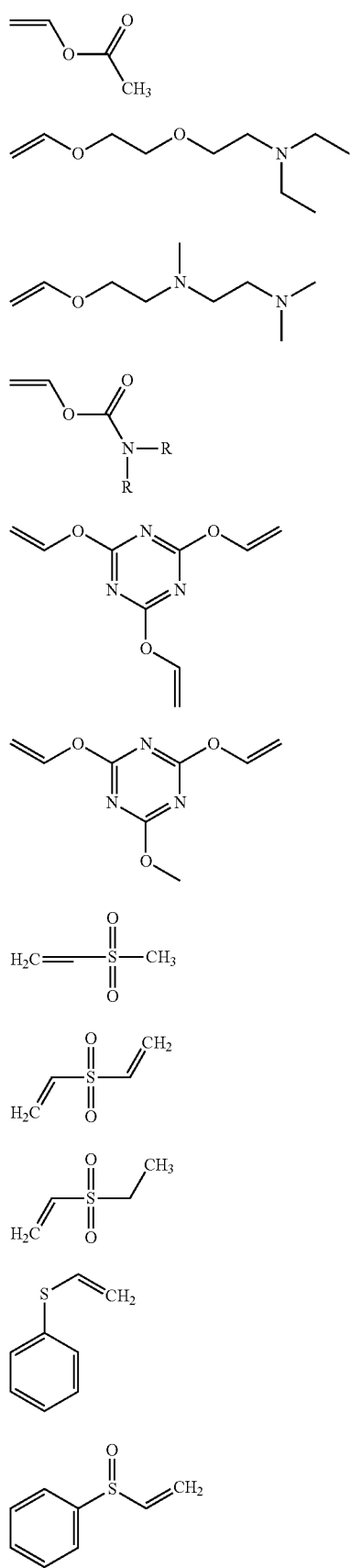
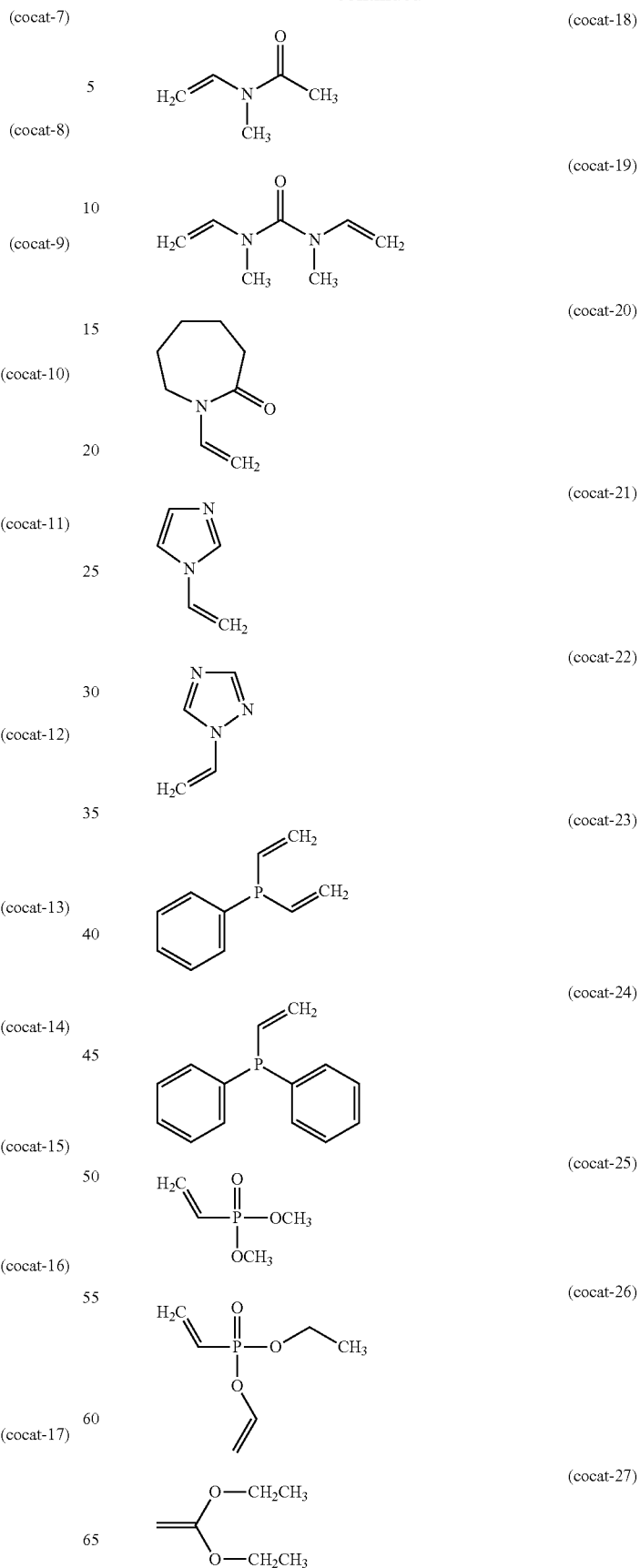

-continued

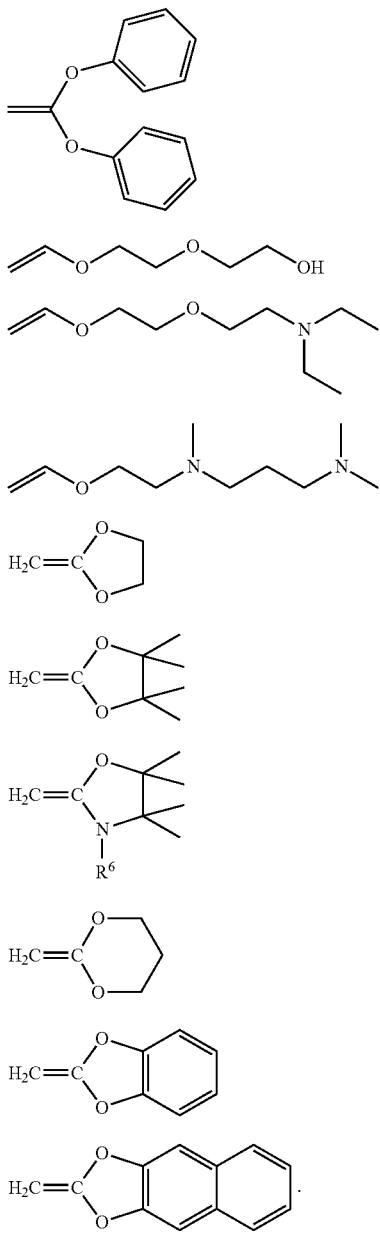

(cocat-28)
(cocat-29)
(cocat-30)
(cocast-31)
(cocat-33)
(cocat-34)
(cocat-35)
(cocat-36)
(cocat-37)
(cocat-38)

6. The selective hydrogenation according to claim 1, wherein the complex catalyst is selected from the group consisting of:

(i) catalysts of general formula (A1),

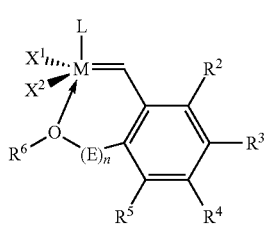

(A1)

wherein M, L, $X^1$, $X^2$, $R^2$, $R^3$, $R^4$, $R^5$, $R^6$, n and E can have the meanings mentioned for the general formula (A) in claim 1, (iii) catalysts of general formula (A3)

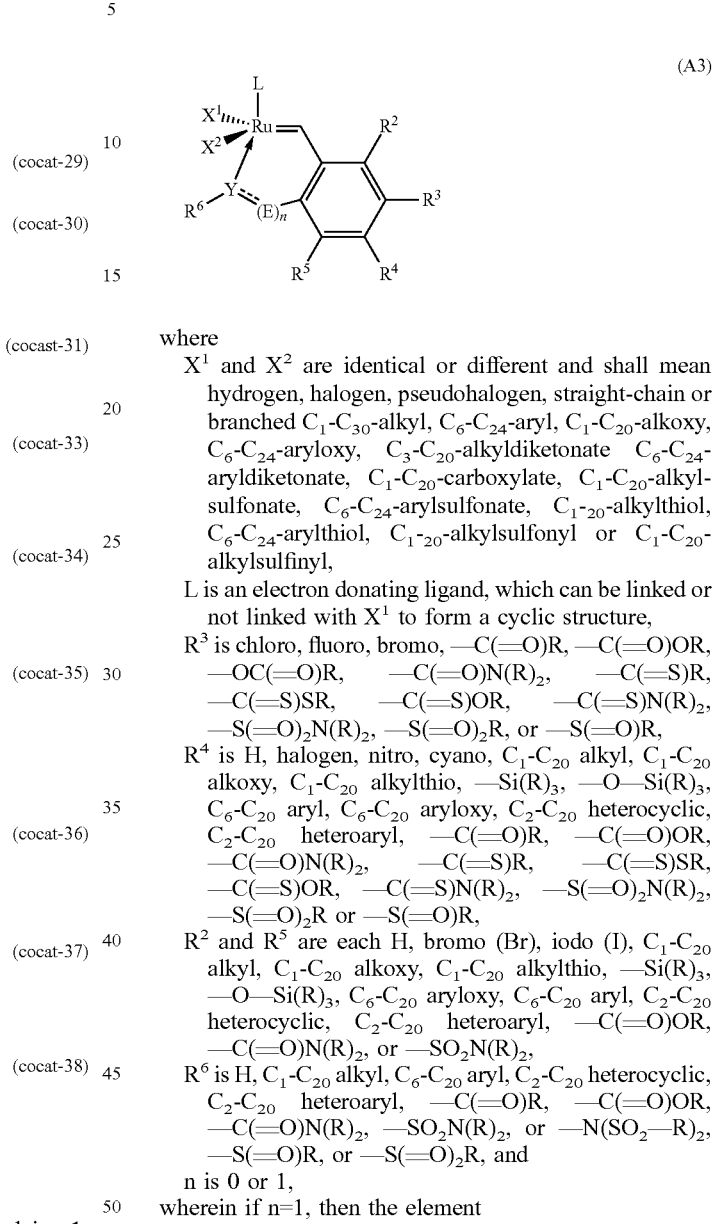

(A3)

where $X^1$ and $X^2$ are identical or different and shall mean hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$_{20}$-alkylthiol, $C_6$-$C_{24}$-arylthiol, $C_1$-$_{20}$-alkylsulfonyl or $C_1$-$C_{20}$-alkylsulfinyl, L is an electron donating ligand, which can be linked or not linked with $X^1$ to form a cyclic structure, $R^3$ is chloro, fluoro, bromo, —C(=O)R, —C(=O)OR, —OC(=O)R, —C(=O)N(R)$_2$, —C(=S)R, —C(=S)SR, —C(=S)OR, —C(=S)N(R)$_2$, —S(=O)$_2$N(R)$_2$, —S(=O)$_2$R, or —S(=O)R, $R^4$ is H, halogen, nitro, cyano, $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryl, $C_6$-$C_{20}$ aryloxy, $C_2$-$C_{20}$ heterocyclic, $C_2$-$C_{20}$ heteroaryl, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)$_2$R or —S(=O)R, $R^2$ and $R^5$ are each H, bromo (Br), iodo (I), $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryloxy, $C_6$-$C_{20}$ aryl, $C_2$-$C_{20}$ heterocyclic, $C_2$-$C_{20}$ heteroaryl, —C(=O)OR, —C(=O)N(R)$_2$, or —SO$_2$N(R)$_2$, $R^6$ is H, $C_1$-$C_{20}$ alkyl, $C_6$-$C_{20}$ aryl, $C_2$-$C_{20}$ heterocyclic, $C_2$-$C_{20}$ heteroaryl, —C(=O)R, —C(=O)OR, —C(=O)N(R)$_2$, —SO$_2$N(R)$_2$, or —N(SO$_2$—R)$_2$, —S(=O)R, or —S(=O)$_2$R, and n is 0 or 1, wherein if n=1, then the element $$Y=\!\!=\!\!(E)_n$$

shall mean that Y and (E)r, are linked either by a single bond or by a double bond, wherein (i) if Y and (E)r, are linked by a single bond, then
Y is oxygen (O), sulfur (S), N—R or P—R and
E is CH$_2$, or (ii) if Y and (E), are linked by a double bond, then
Y is N or P
E is CH, wherein if n=0, then
Y is oxygen (O), sulfur (S), N—R or P—R and directly linked by a single bond to the phenyl moiety depicted above in formula (A3), and wherein in all above occurrences in formula (A3) R is identical or different and shall mean H, $C_1$-$C_{20}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_2$-$C_{24}$-heteroaryl, or if two substituents R are bound to the same atom, such two substituents R may also form a saturated or unsaturated cyclic structure together with the atoms to which they are bound, (iv) catalysts of general formula (A4)

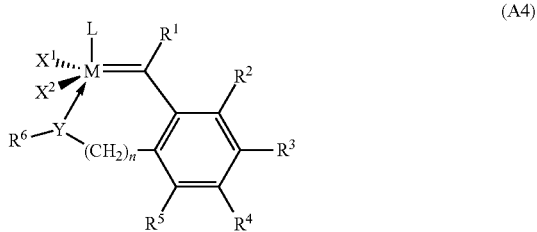

(A4)

wherein M, L, Y, $X^1$, $X^2$, $R^1$, $R^2$, $R^3$, $R^4$, $R^5$, $R^6$ and n have the meanings given for general formula (A), and (vii) catalysts of general formula (A7)

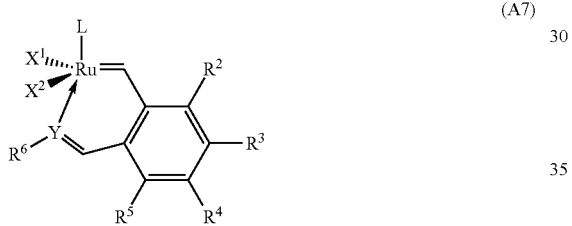

(A7)

where
$X^1$ and $X^2$ are identical or different and shall mean hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_{1-20}$-alkylsulfonyl or $C_1$-$C_{20}$-alkylsulfinyl, L is an electron donating ligand, which can be linked or not linked with $X^1$ to form a cyclic structure, Y is NR or PR, preferably NR, $R^3$ is chloro, fluoro, bromo, —C(═O)R, —C(═O)OR, —OC(═O)R, —C(═O)N(R)$_2$, —C(═S)R, —C(═S)SR, —C(═S)OR, —C(═S)N(R)$_2$, —S(═O)$_2$N(R)$_2$, —S(═O)$_2$R, or —S(═O)R, $R^4$ is H, halogen, nitro, cyano, $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryl, $C_6$-$C_{20}$ aryloxy, $C_2$-$C_{20}$ heterocyclic, $C_2$-$C_{20}$ heteroaryl, —C(═O)R, —C(═O)OR, —C(═O)N(R)$_2$, —C(═S)R, —C(═S)SR, —C(═S)OR, —C(═S)N(R)$_2$, —S(═O)$_2$N(R)$_2$, —S(═O)$_2$R or —S(═O)R, $R^2$ and $R^5$ are each H, bromo (Br), iodo (I), $C_1$-$C_{20}$ alkyl, $C_1$-$C_{20}$ alkoxy, $C_1$-$C_{20}$ alkylthio, —Si(R)$_3$, —O—Si(R)$_3$, $C_6$-$C_{20}$ aryloxy, $C_6$-$C_{20}$ aryl, $C_2$-$C_{20}$ heterocyclic, $C_2$-$C_{20}$ heteroaryl, —C(═O)OR, —C(═O)N(R)$_2$, or —SO$_2$N(R)$_2$, $R^6$ is H, $C_1$-$C_{20}$ alkyl, $C_6$-$C_{20}$ aryl, $C_2$-$C_{20}$ heterocyclic, $C_2$-$C_{20}$ heteroaryl, —C(═O)R, —C(═O)OR, —C(═O)N(R)$_2$, —SO$_2$N(R)$_2$, —N(SO$_2$—R)$_2$, —S(═O)R, or —S(═O)$_2$R, and wherein in all above occurrences in formula (A7) R is identical or different and shall mean H, $C_1$-$C_{20}$-alkyl, $C_3$-$C_{10}$-cycloalkyl, $C_2$-$C_{16}$-alkenyl, $C_2$-$C_{20}$-alkynyl, $C_6$-$C_{24}$-aryl, or $C_2$-$C_{24}$-heteroaryl, or if two substituents R are bound to the same atom, such two substituents R may also form a saturated or unsaturated cyclic structure together with the atoms to which they are bound.

7. The selective hydrogenation according to claim 1, wherein the complex catalyst is selected from the group consisting of the below shown formulae, wherein Mes is in each case 2,4,6-trimethylphenyl, Ph is phenyl,

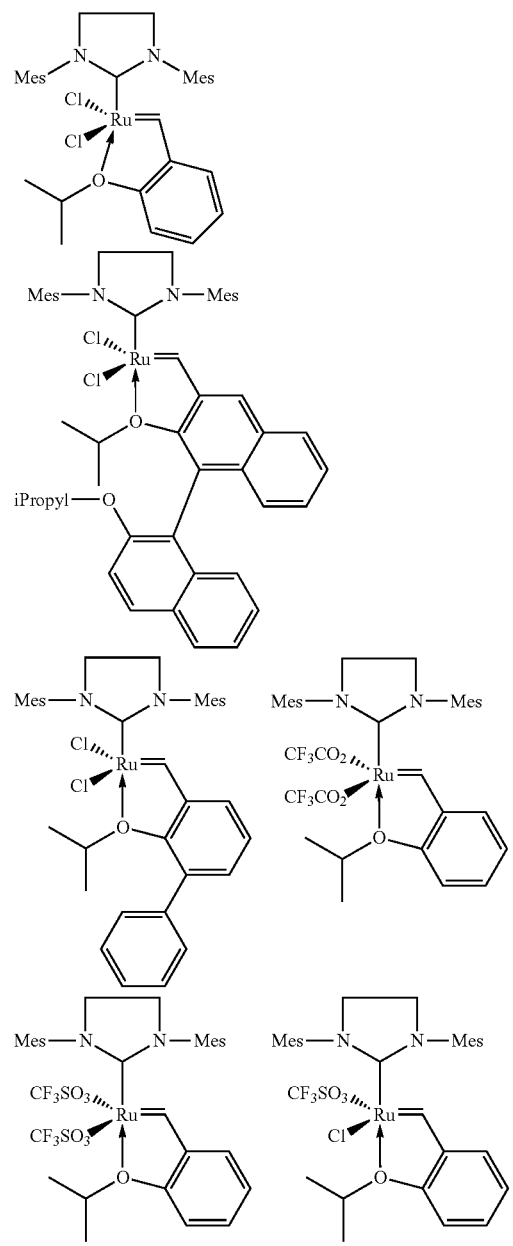

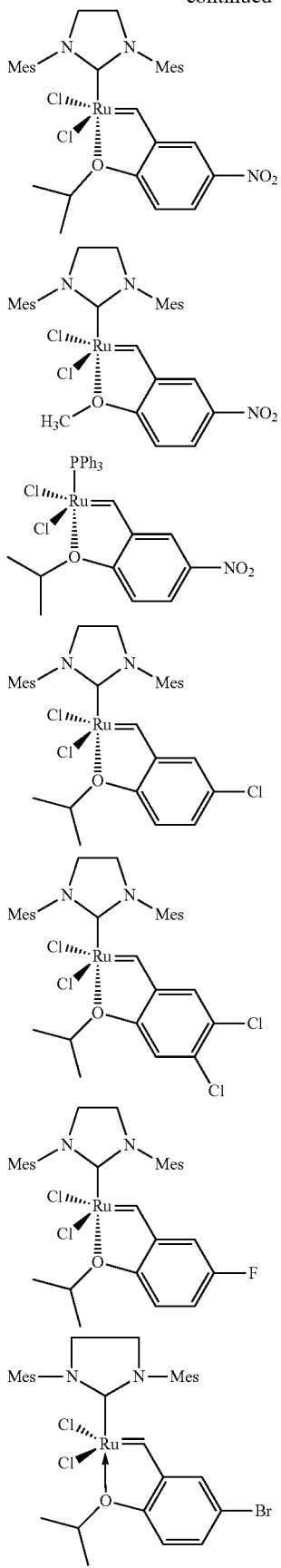
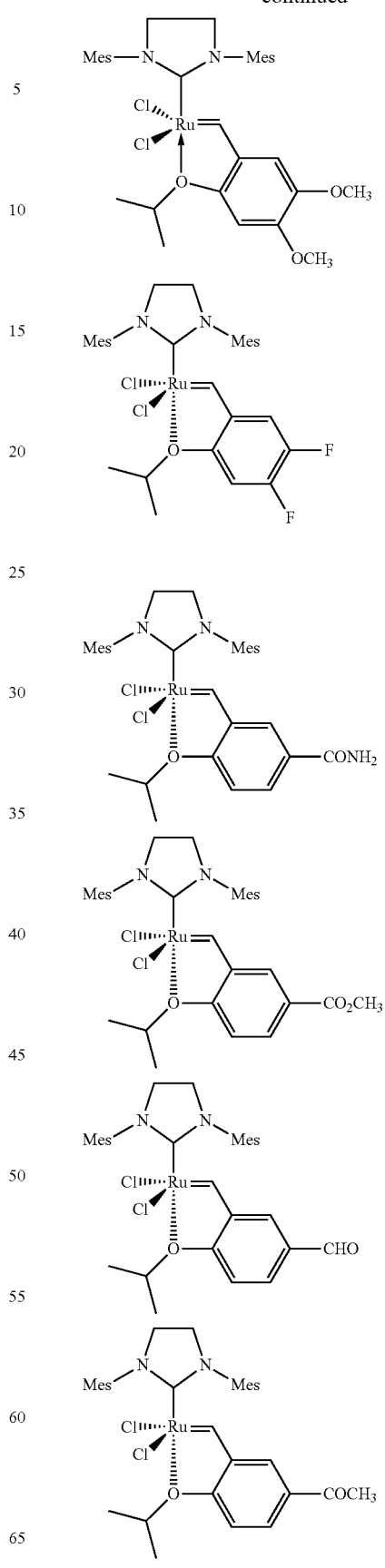

91
-continued
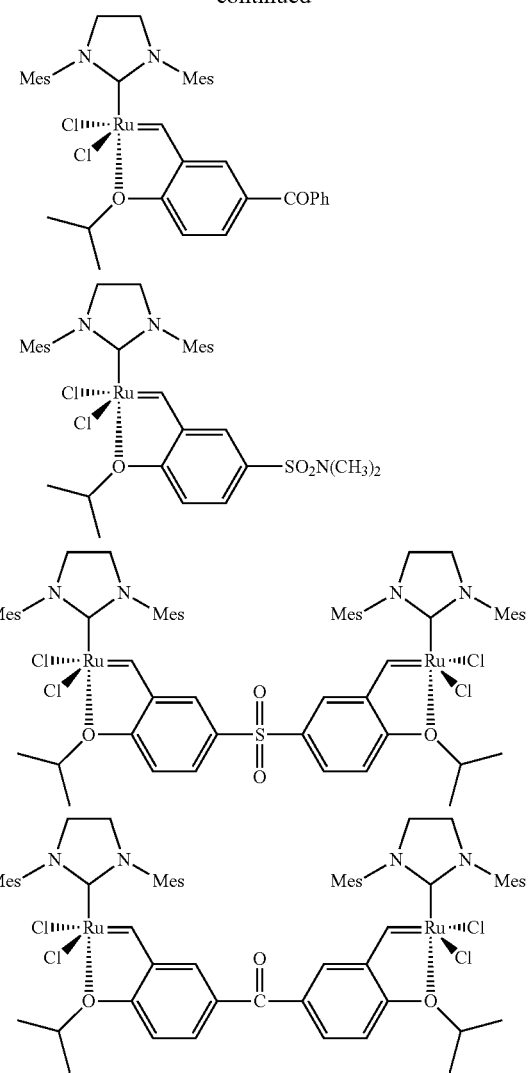
92
-continued
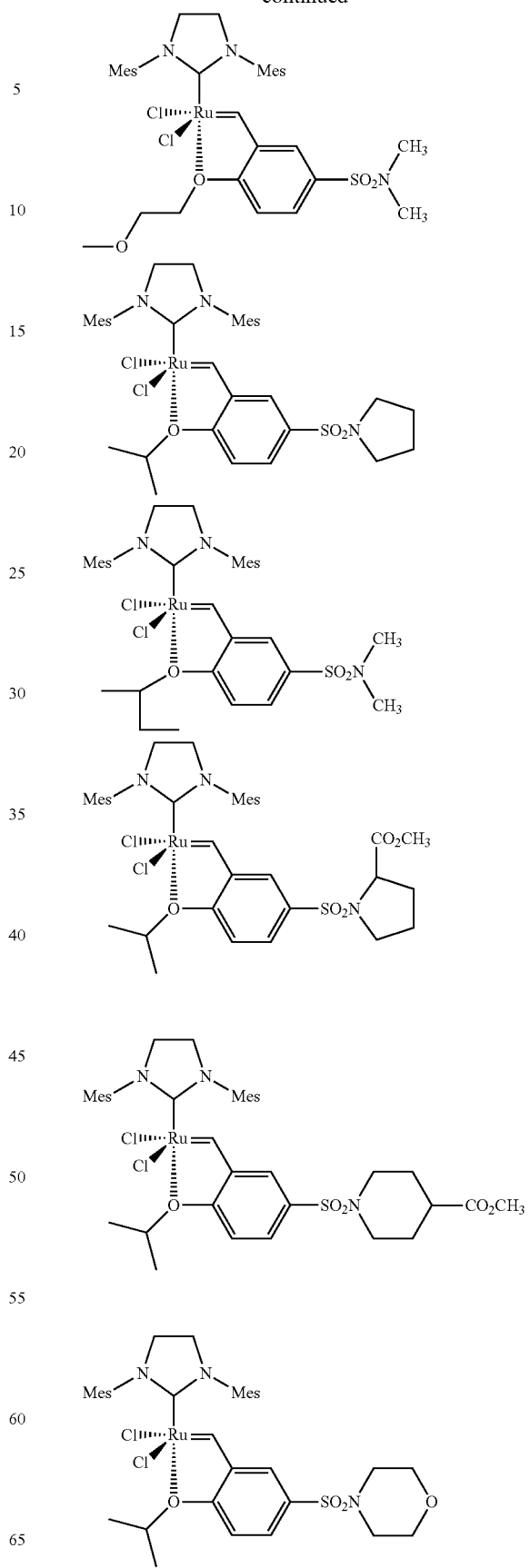

93
-continued
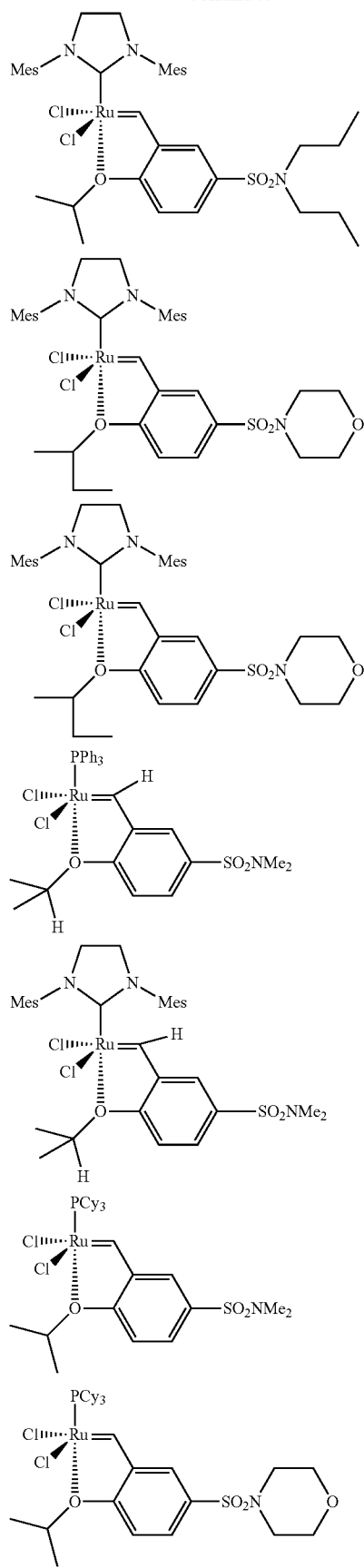
94
-continued
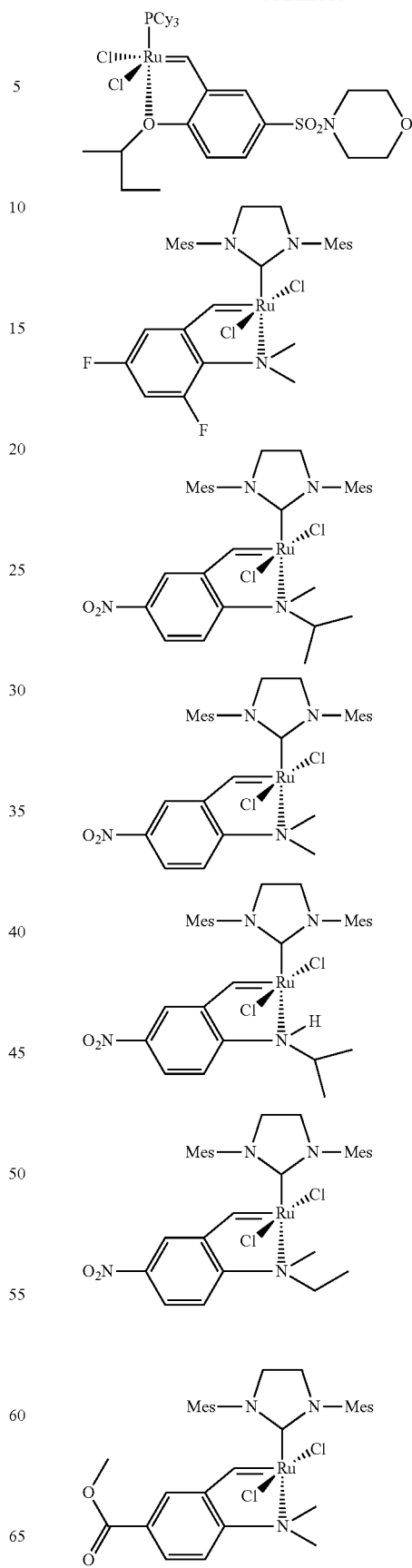

-continued
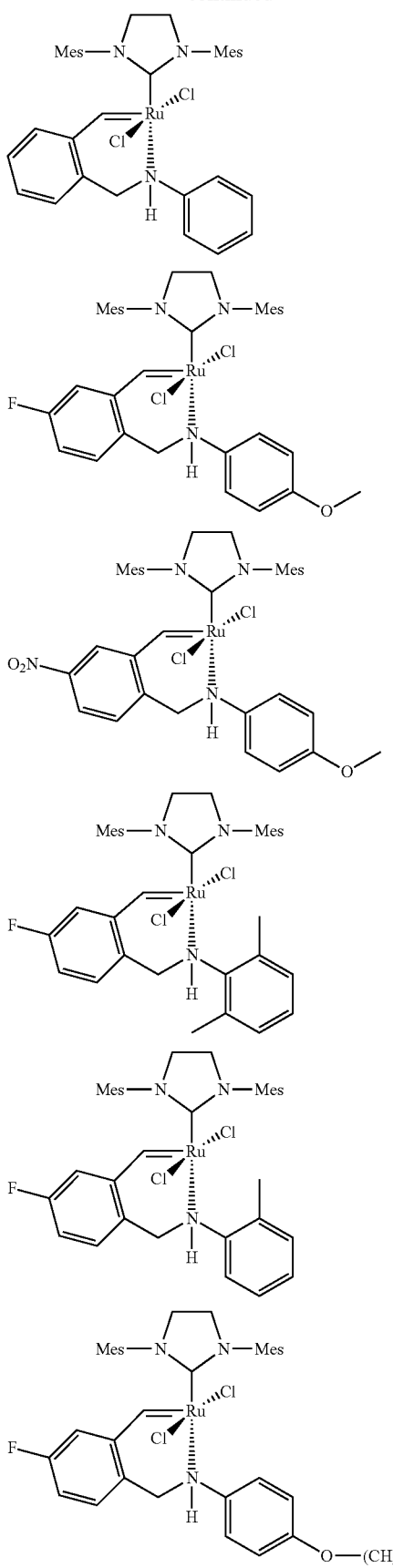
-continued
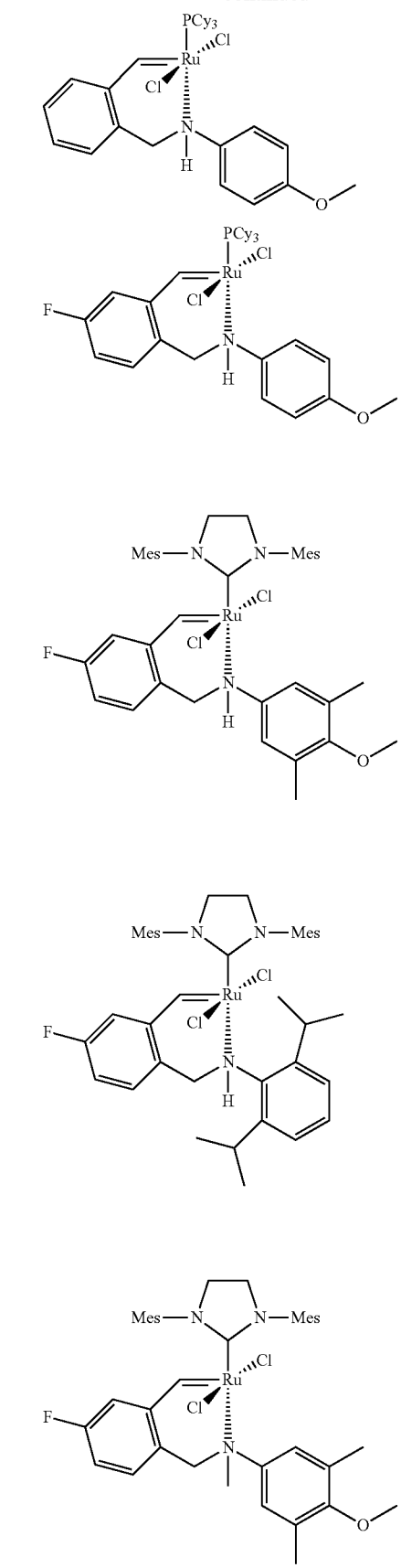

97
-continued
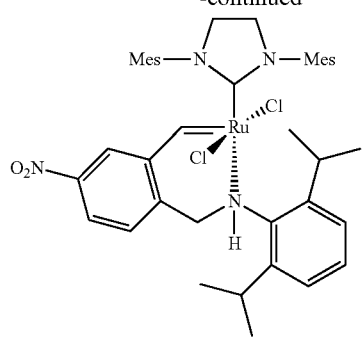
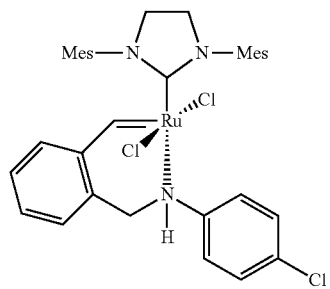
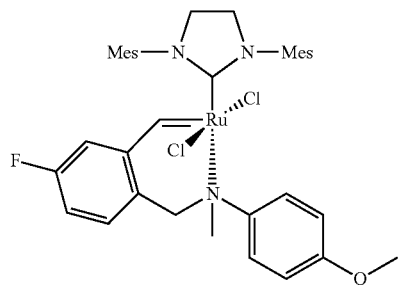
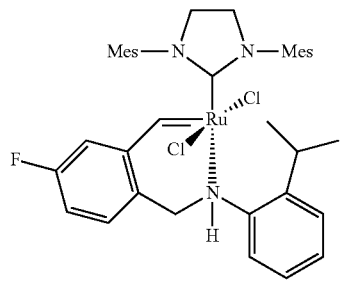
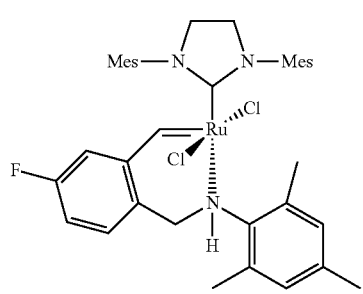
98
-continued
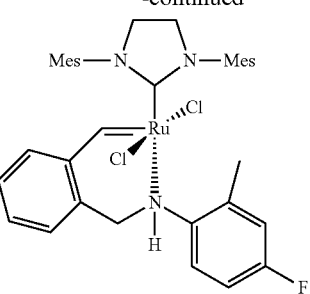
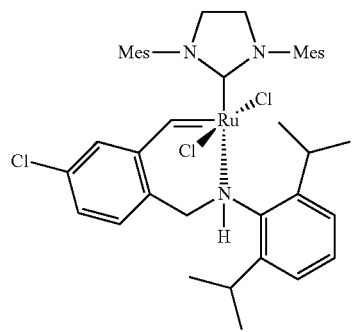
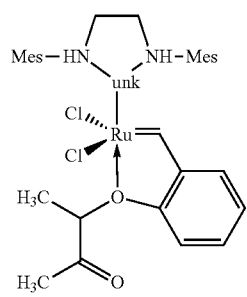
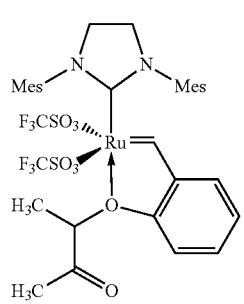
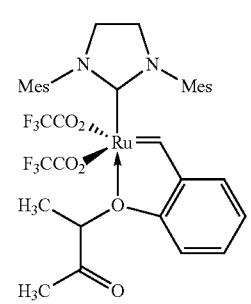
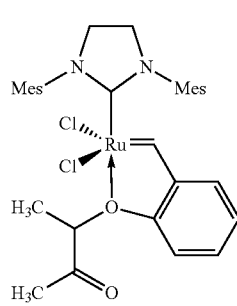

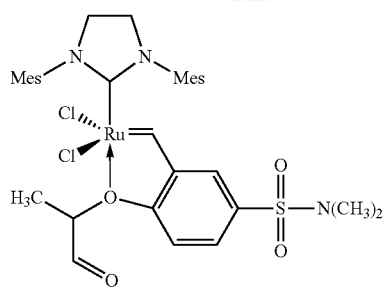
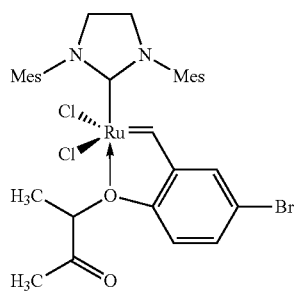
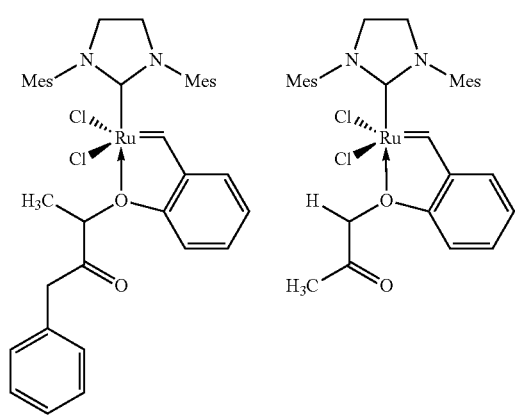
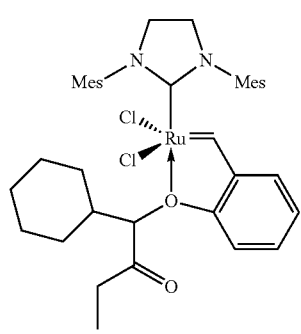
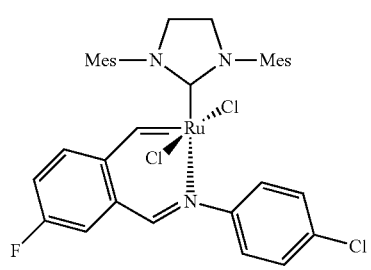
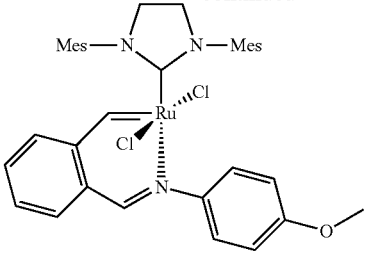
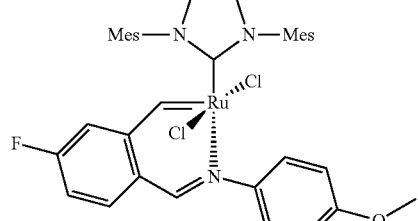
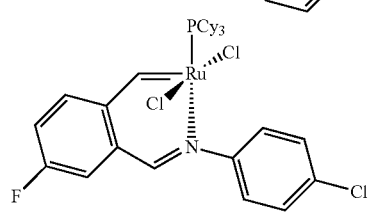
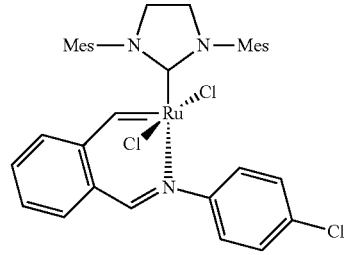
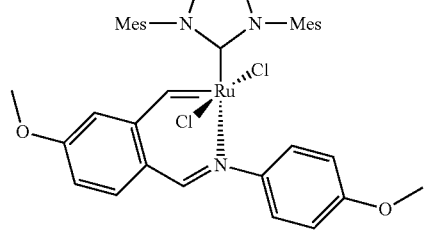
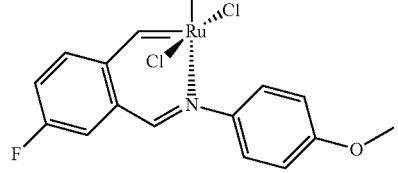
and

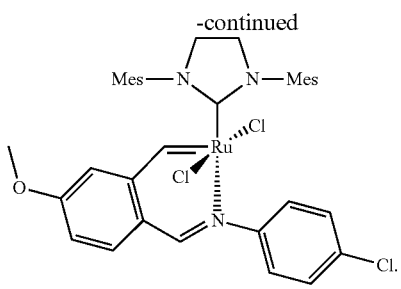

8. The selective hydrogenation according to claim 1, further comprising:
   a) preparing the catalyst composition according to claim 1 by contacting the complex catalyst according to claim 1 with the at least one co-catalyst according to claim 1 in a molar ratio of the complex catalyst to the co-catalyst of 1:30 to 1:100, and thereafter
   b) hydrogenating nitrile rubber in the presence of the catalyst composition formed in step a).

9. The selective hydrogenation according to claim 8, wherein step a) is performed at a temperature of −20° C. to 160° C.

10. The selective hydrogenation according to claim 9, wherein the hydrogenation in step b) is carried out at a temperature of 60° C. to 200° C., and at a hydrogen pressure of 0.5 MPa to 35 MPa.

11. The selective hydrogenation according to claim 8, wherein the nitrile rubber is subjected to a molecular weight degradation in a metathesis reaction first comprising contacting the nitrile rubber in the absence or presence of a co-olefin with the complex catalyst according to claim 1, then
   a) contacting the complex catalyst which is present in the reaction mixture obtained after the metathesis reaction with at least one co-catalyst having at least one vinyl group in a molar ratio of the complex catalyst to the co-catalyst of 1:30 to 1:100, to form a catalyst composition, and thereafter
   b) hydrogenating the nitrile rubber in the presence of the catalyst composition.

12. The selective hydrogenation according to claim 1, wherein the catalyst has the general formula (A2)

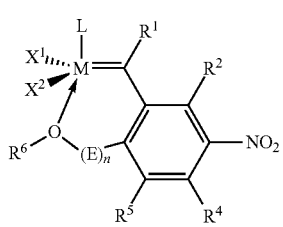

(A2)

wherein M, L, $X^1$, $X^2$, $R^1$, $R^2$, $R^4$, $R^5$, $R^6$, n and E have the meanings mentioned for the formula (A) in claim 1.

13. The selective hydrogenation according to claim 1, wherein the catalyst is selected from the group consisting of catalysts of general formula (A6)

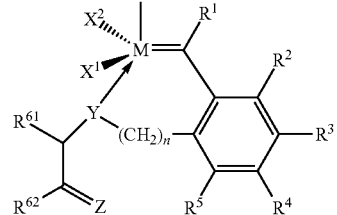

(A6)

where
   M is ruthenium or osmium,
   Z is oxygen (O) or sulfur (S),
   Y is oxygen (O), sulfur (S), N—$R^7$ or P—$R^7$, where $R^7$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl which may each be optionally substituted by one or more alkyl, halogen, alkoxy, aryl or heteroaryl substituents,
   $X^1$ and $X^2$ are identical or different ligands,
   $R^1$ is H, alkyl, alkenyl, alkynyl or aryl,
   $R^2$, $R^3$, $R^4$ and $R^5$ are identical or different and are each hydrogen, organic or inorganic substituents,
   $R^{61}$ is H, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, halogen, alkoxy, aryl or heteroaryl substituents,
   $R^{62}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, halogen, alkoxy, aryl or heteroaryl substituents, or, in the alternative $R^{61}$ and $R^{62}$ form a cyclic structure together with the two adjacent carbon atoms to which they are bound,
   L is a ligand, and
   n is 0 or 1.

14. A selective hydrogenation of nitrile rubber in the presence of a catalyst composition obtained by contacting a complex catalyst with at least one co-catalyst in a molar ratio of the complex catalyst to the co-catalyst of 1:30 to 1:100, wherein:
   the complex catalyst has the general formula (A5)

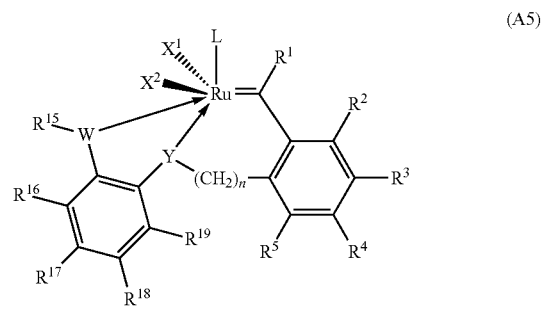

(A5)

where
Y is oxygen (O) or —NR, with R representing hydrogen, alkyl, cycloalkyl, alkenyl, alkynyl, aryl or heteroaryl,
W is oxygen (O) or $NR^7$, with $R^7$ being hydrogen or straight chain or branched $C_1$-$C_{10}$ alkyl,
$R^{15}$ represents straight chain or branched alkyl,
$R^{16}$, $R^{17}$, $R^{18}$ and $R^{19}$ are identical or different and represent hydrogen, halogen, alkyl, cycloalkyl, alkoxy, alkenyl, alkynyl, aryl or heteroaryl,
M is ruthenium or osmium,
$X^1$ and $X^2$ are identical or different ligands,
L is an electron donating ligand, which can be linked or not linked with $X^1$ to form a cyclic structure,
$R^1$ is hydrogen, alkyl, cycloalkyl, alkenyl, alkynyl, aryl or heteroaryl,
$R^2$, $R^3$, $R^4$ and $R^5$ are identical or different and are each hydrogen or an organic or inorganic substituent; and
wherein the co-catalyst must contain at least one vinyl group and has the general formula (1)

$$CH_2=CRR' \qquad (1)$$

in which R and R' are identical or different and in the co-catalyst shall mean hydrogen, wherein R and R' must not both represent hydrogen, or
$OR^1$ wherein $R^1$ shall mean alkyl, cycloalkyl, alkenyl, alkynyl, aryl, or heteroaryl, $C(=O)(R^2)$, —$C(=O)N(R^2)_2$, —$[(CH_2)_m—X]_mR^2$, —$[(CH_2)_n—X]_m$—$CH=CH_2$, or —$(CH_2)_p$—$C(R^3)_2R^4$, wherein
X is identical or different and means oxygen (O) or $NR^2$
$R^2$ are identical or different and represent H, alkyl, cycloalkyl, alkenyl, alkynyl, aryl, or heteroaryl,
$R^3$ are identical or different and represent $C_1$-$C_8$ alkyl or —$(CH_2)_n$—O—$CH=CH_2$,
$R^4$ represents $(CH_2)_p$—O—$CH=CH_2$,
n is 1 to 5,
m is 1 to 10,
p is 0 to 5, or
where in the alternative, if R and R' both represent a group $OR^1$, both $R^1$ may be linked to each other and together represent a divalent group —$(C(R^2)_2)_q$—with q being 2, 3 or 4 and $R^2$ being identical or different and having the above defined meanings, or
$SR^5$, $SOR^5$, $SO_2R^5$ wherein $R^5$ represents alkyl, cycloalkyl, alkenyl, alkynyl, aryl, or heteroaryl, or
$N(R^6R^7)$, $P(R^6R^7)$ wherein $R^6$ and $R^7$ are identical or different and shall mean alkyl, cycloalkyl, alkenyl, alkynyl, aryl, heteroaryl, —$C(=O)(R^2)$, or where in the alternative $R^6$ and $R^7$ may form together with such N or P atom to which they both are linked at the same time a saturated, unsaturated or aromatic cyclic structure with 4 to 7 carbon atoms in the cyclic structure wherein one, two or three of said carbon atoms can be replaced by a moiety selected from oxygen, sulfur, nitrogen, N—$R^8$ or P—$R^8$ wherein $R^8$ shall mean alkyl, cycloalkyl, alkenyl, alkynyl, aryl, or heteroaryl; or
$P(=O)(OR^9)_2$ in which $R^9$ are identical or different and shall mean alkyl, cycloalkyl, alkenyl, alkynyl, aryl, heteroaryl.

15. The selective hydrogenation according to claim 14, wherein the complex catalyst is selected from the group consisting of the below shown formulae, wherein Mes is in each case 2,4,6-trimethylphenyl, Ph is phenyl,

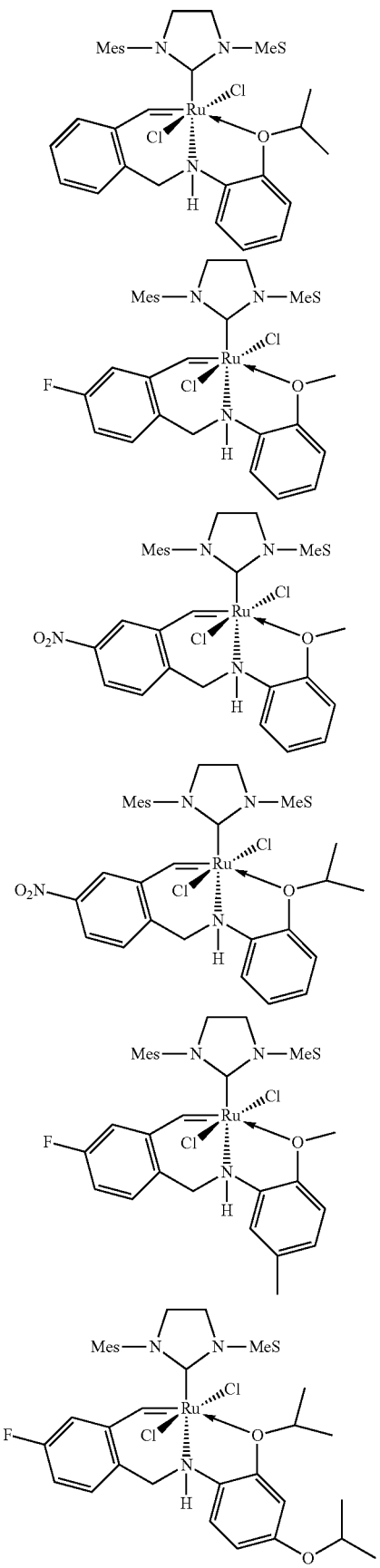

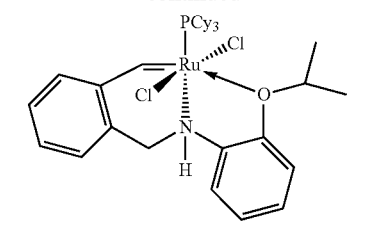
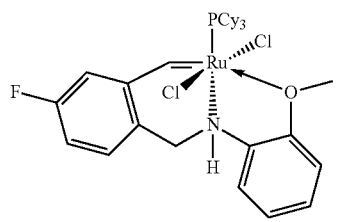
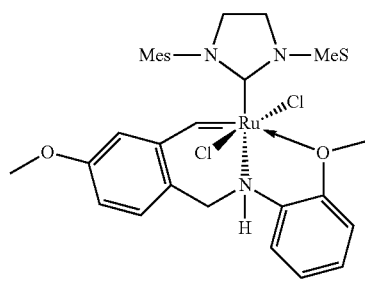
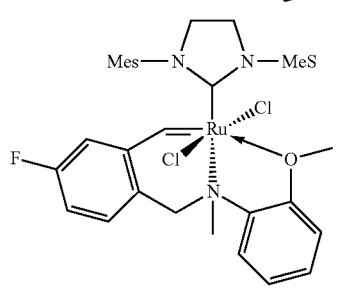
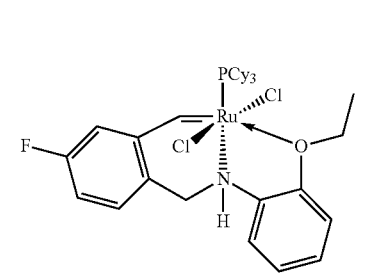
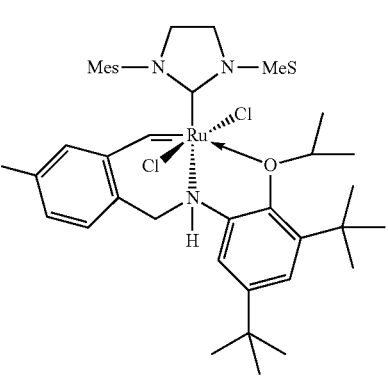
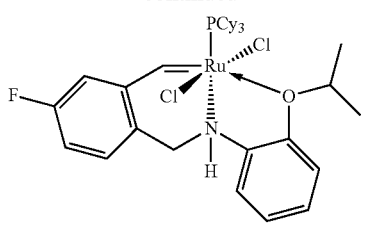
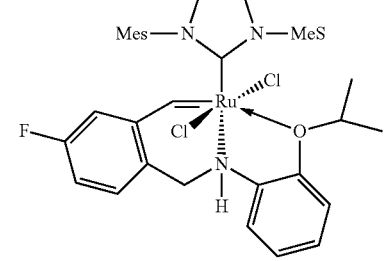
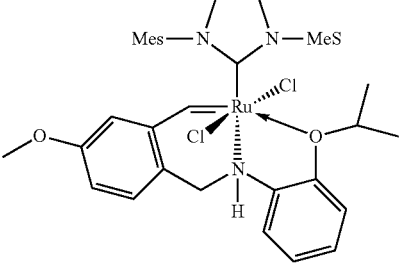
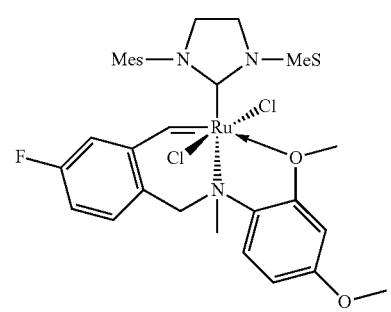
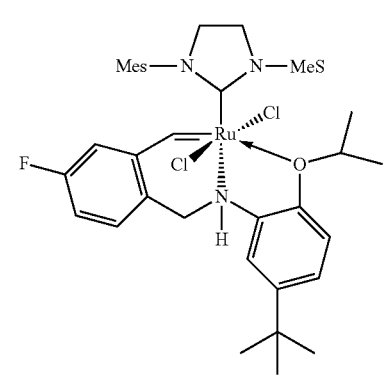

107
-continued
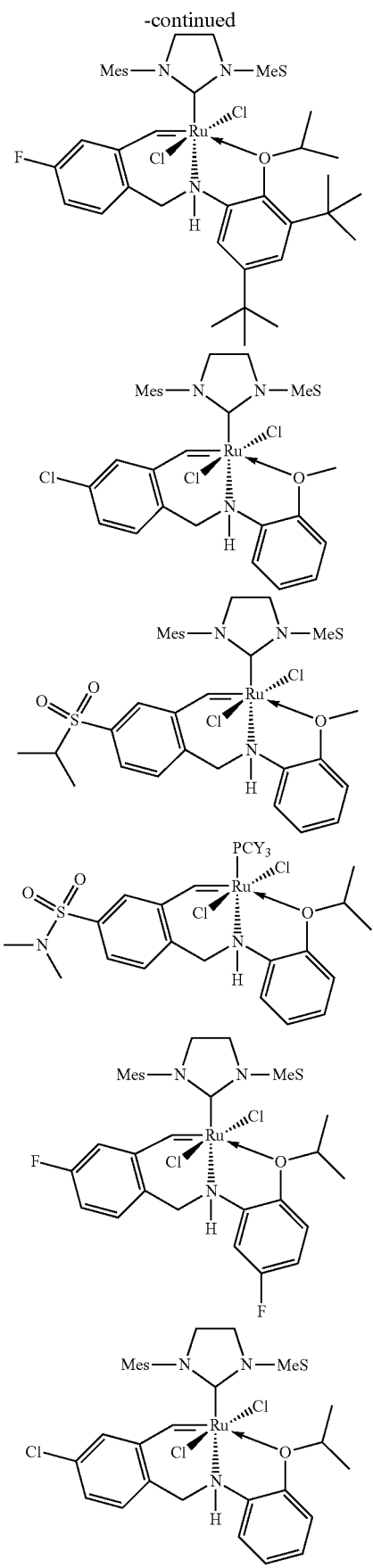
108
-continued
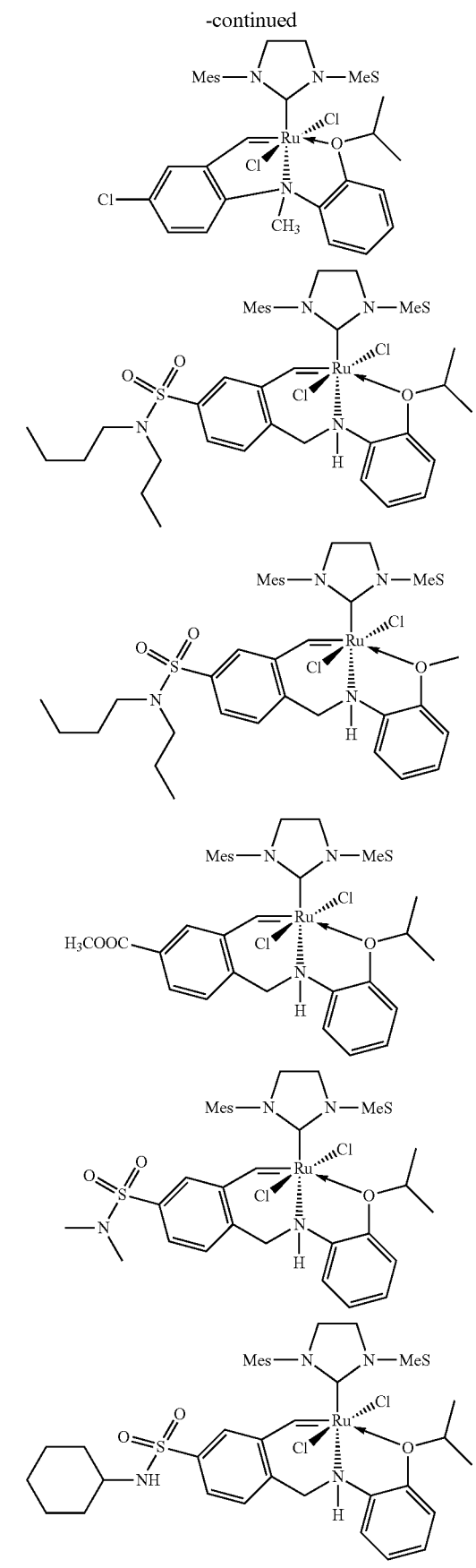

-continued
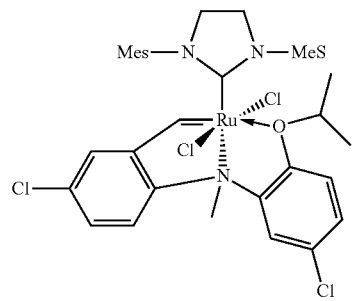
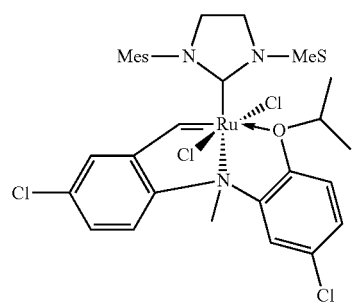
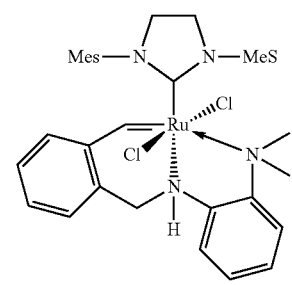
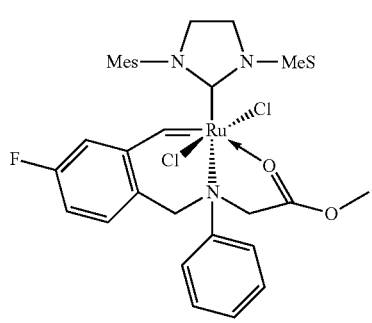
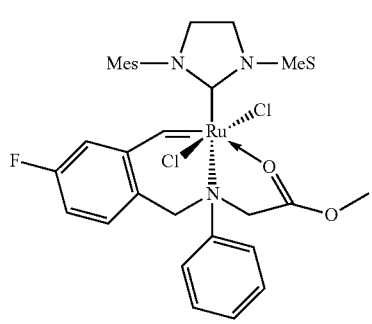
-continued
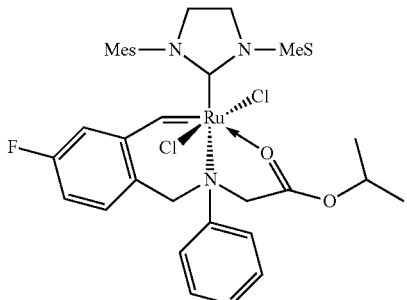
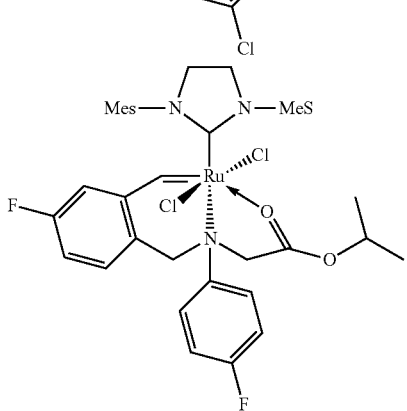
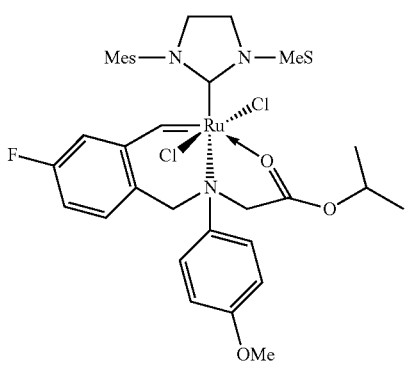
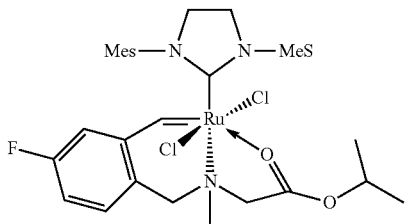
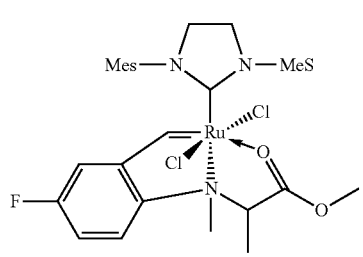

111
-continued

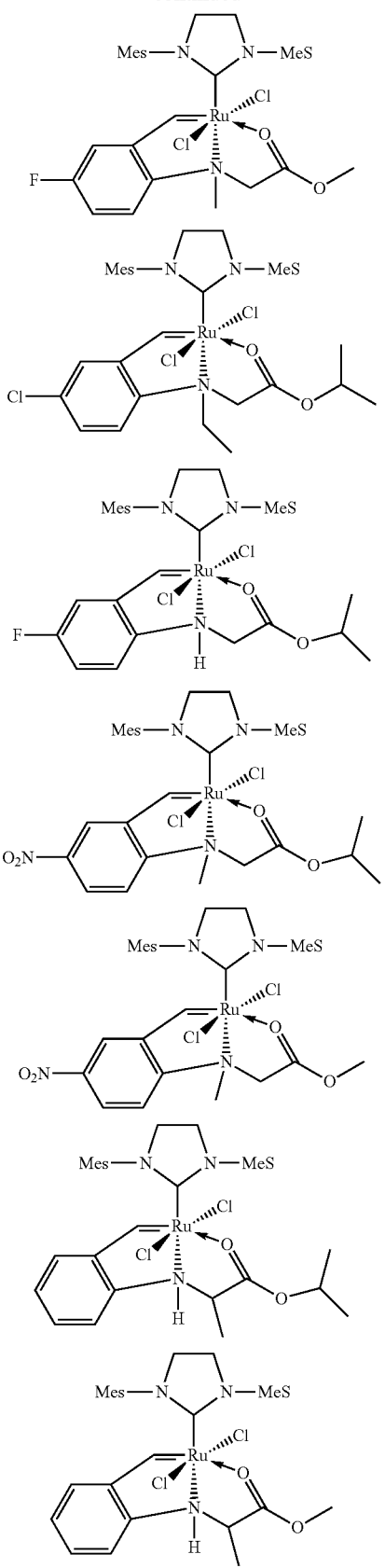

112
-continued

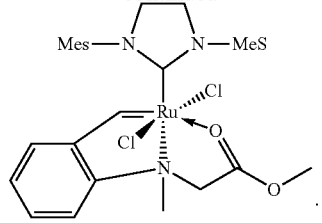

16. A selective hydrogenation of nitrile rubber in the presence of a catalyst composition obtained by contacting a complex catalyst with at least one co-catalyst in a molar ratio of the complex catalyst to the co-catalyst of 1:30 to 1:100, wherein:

the complex catalyst has the general formula (A)

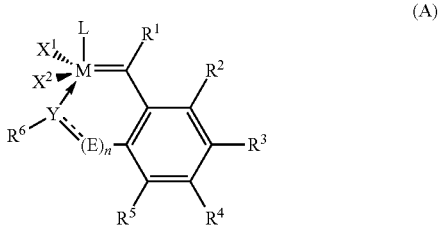

(A)

where
M is ruthenium or osmium,
$X^1$ and $X^2$ are identical or different ligands,
L is an electron donating ligand, which can be linked or not linked with $X^1$ to form a cyclic structure,
$R^1$ is hydrogen, alkyl, cycloalkyl, alkenyl, alkynyl, aryl or heteroaryl,
$R^2$, $R^3$, $R^4$ and $R^5$ are identical or different and are each hydrogen or an organic or inorganic substituent,
$R^6$ is H, alkyl, cycloalkyl, alkenyl, alkynyl, aryl, heteroaryl, —C(=O)R, —C(=O)OR, —C(=O)N(R)$_2$, —C(=S)R, —C(=S)SR, —C(=S)OR, —C(=S)N(R)$_2$, —S(=O)$_2$N(R)$_2$, —S(=O)$_2$R, —S(=O)R, or a group containing either a C=O or a C=S structural element adjacent to a carbon atom which is bound to Y,
n is 0 or 1,
wherein if n=1, then the element $$Y \text{---} (E)_n$$

shall mean that Y and $(E)_n$ are linked either by a single bond or by a double bond, wherein
(i) if Y and $(E)_n$ are linked by a single bond, then Y is oxygen (O), sulfur (S), N—R or P—R, and E is CH$_2$, or
(ii) if Y and $(E)_n$ are linked by a double bond, then Y is N or P, and
E is CH and
wherein if n=0, then
Y is oxygen (O), sulfur (S), N—R or P—R, and is directly linked by a single bond to the phenyl moiety depicted above in formula (A), and
wherein in all above occurrences of general formula (A), R is hydrogen or alkyl, cycloalkyl, alkenyl, alkynyl, aryl or heteroaryl; and wherein the co-catalyst is of formula (cocat-32)
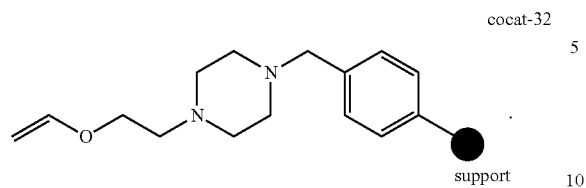
* * * * *